United States Patent
Sano et al.

(10) Patent No.: US 7,164,696 B2
(45) Date of Patent: Jan. 16, 2007

(54) MULTI-CARRIER CDMA COMMUNICATION DEVICE, MULTI-CARRIER CDMA TRANSMITTING DEVICE, AND MULTI-CARRIER CDMA RECEIVING DEVICE

(75) Inventors: Hiroyasu Sano, Tokyo (JP); Nobuhisa Kataoka, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1009 days.

(21) Appl. No.: 10/089,107

(22) PCT Filed: Jul. 23, 2001

(86) PCT No.: PCT/JP01/06344
§ 371 (c)(1),
(2), (4) Date: Mar. 26, 2002

(87) PCT Pub. No.: WO02/09334
PCT Pub. Date: Jan. 31, 2002

(65) Prior Publication Data
US 2002/0181421 A1 Dec. 5, 2002

(30) Foreign Application Priority Data
Jul. 26, 2000 (JP) ............... 2000-226027
Aug. 29, 2000 (JP) ............... 2000-259858

(51) Int. Cl.
*H04J 4/00* (2006.01)
(52) U.S. Cl. ...................... 370/478; 370/436
(58) Field of Classification Search ........ 370/330, 370/329, 208, 481, 342, 335, 430, 343, 345, 370/436, 478; 375/131, 225, 130, 140, 142, 375/220–222; 455/452; 348/21
See application file for complete search history.

(56) References Cited

U.S. PATENT DOCUMENTS 6,005,605 A * 12/1999 Kostreski et al. ............. 348/21

(Continued)

FOREIGN PATENT DOCUMENTS

CN 1324159 A 11/2001

(Continued)

OTHER PUBLICATIONS

Vandendorpe, "Multitone Spread Spectrum Multiple Access Communications System in a Multipath Rician Fading Channel", 1995, IEEE, pp. 327-337.*

(Continued)

*Primary Examiner*—John Pezzlo
(74) *Attorney, Agent, or Firm*—Oblon, Spivak, McClelland, Maier & Neustadt, P.C.

(57) ABSTRACT

The transmitter comprises a data/modulation control section (4) which sets predetermined parameters necessary for demodulation processing, sub-carrier group modulation processing sections (6a to 8c) which perform frequency spreading for each sub-carrier signal in the sub-carrier group, and time spreading sections (10a to 10c) which multiplex all signals after the modulation processing and the frequency spreading for each sub-carrier signal, and perform time spreading with respect to the multiplexed signals. The receiver comprises time despreading sections (35a to 35c) which perform time despreading for each sub-carrier signal, and sub-carrier group demodulation processing sections (36a to 38c) which perform frequency despreading for each sub-carrier signal after the time despreading.

37 Claims, 33 Drawing Sheets

U.S. PATENT DOCUMENTS

| | | | |
|---|---|---|---|
| 6,215,810 B1 * | 4/2001 | Park | 375/131 |
| 6,226,320 B1 * | 5/2001 | Hakkinen et al. | 375/225 |
| 2001/0028637 A1 | 10/2001 | Abeta et al. | 370/335 |

FOREIGN PATENT DOCUMENTS

| | | |
|---|---|---|
| JP | 7-202758 | 8/1995 |
| JP | 2000-332724 | 11/2000 |
| JP | 2001-237803 | 8/2001 |

OTHER PUBLICATIONS

Hideyuki Matsutani et al.: "Shuuhasuu bunsan fugou-ka wo mochiita multi-carrier DS-CDMS" Denshi Joho Tsushin Gakkai Gijutsu Kenkyuu Houkoku RCS98-159, pp. 49-54 Nov. 27, 1998.

H. Matsutani et al.: "Multi-carrier DS-CDMA using frequency spread coding" IEEE ICPWC'99, pp. 244-248 Feb. 1999.

Jun Sumasu et al.: "Jikan-teki shuuhasuu ryouiki douji kakusan wo mochiita OFDM-CDMA" Denshi Joho Tsuushin Gakkai Gijutsu Kenkyuu Houkoku RCS2000-3 pp. 13-18 Apr. 21, 2000.

Satayuki Abeta et al.: "Kudari link broad band musen packet densou nl okeru SC/DS-CDMA, MC/DS-CDMA, MC-CDMA houshiki no tokuchou hikaku" Denshi Joho Tsuushin Gakkai Gijutsu Kenkyuu Houkoku RCS99-130, pp. 63-70 Oct. 15, 1999.

S. Hara et al.: "Overview of multicarrier CDMA" IEEE Commun. Mag., vol. 35, No. 12, pp. 126-133 Dec. 1997.

S.P.W. Jarot et al.: "Each carrier transmission power control for the reverse link of OFDM-DS-CDMA system" IEICE Trans. Commun., vol. E82-B, No. 11, pp. 1851-1857 Nov. 1999.

Hyunsoo Cheon, et al., "Adaptive Multicarrier System with Reduced Feedback Information in Wideband Radio Channels" IEEE VTC, 1999, pp. 2880-2884.

F. Adachi, et al., "Wideband Multi-rate DS-CDMA for Next Generation Mobile Communications Systems", IEEE, Wireless Communications Conference, 1997, pp. 57-62.

* cited by examiner

READOUT DIRECTION →

WRITE DIRECTION ↓

| (1,1) | (2,1) | (3,1) | ····· | $(N_c,1)$ |
|---|---|---|---|---|
| (1,2) | (2,2) | (3,2) | ····· | $(N_c,2)$ |
| (1,3) | (2,3) | (3,3) | ····· | $(N_c,3)$ |
| ⋮ | ⋮ | ⋮ | ⋮ | ⋮ |
| $(1,N_r)$ | $(2,N_r)$ | $(3,N_r)$ | ····· | $(N_c,N_r)$ |

SUB-CARRIER GROUP (1) DATA → [61 DATA DIVIDING SECTION FOR EACH SLOT] → [62 FRAME INFORMATION ADDING SECTION] → [63 KNOWN SEQUENCE ADDING SECTION] → SUB-CARRIER GROUP (1) DATA AFTER FRAME SETUP

FIG.10

(a) $C_1^h = 1, h = 1 \sim 32$ (b) $C_2^i = [C_{2,1}^i \quad C_{2,2}^i] = \begin{bmatrix} ① & ② \\ 1 & 1 \\ \hline 1 & 0 \end{bmatrix}, i = 1 \sim 16$ (c) $C_4^j = \begin{bmatrix} C_{4,1}^j \\ C_{4,2}^j \\ C_{4,3}^j \\ C_{4,4}^j \end{bmatrix} = \begin{bmatrix} ① & ② & ③ & ④ \\ 1 & 1 & 1 & 1 \\ 1 & 1 & 0 & 0 \\ \hline 1 & 0 & 1 & 0 \\ 1 & 0 & 0 & 1 \end{bmatrix}, j = 1 \sim 8$ (d) $C_8^k = \begin{bmatrix} C_{8,1}^k \\ C_{8,2}^k \\ C_{8,3}^k \\ C_{8,4}^k \\ C_{8,5}^k \\ C_{8,6}^k \\ C_{8,7}^k \\ C_{8,8}^k \end{bmatrix} = \begin{bmatrix} ① & ② & ③ & ④ & ⑤ & ⑥ & ⑦ & ⑧ \\ 1 & 1 & 1 & 1 & 1 & 1 & 1 & 1 \\ 1 & 1 & 1 & 1 & 0 & 0 & 0 & 0 \\ 1 & 1 & 0 & 0 & 1 & 1 & 0 & 0 \\ 1 & 1 & 0 & 0 & 0 & 0 & 1 & 1 \\ \hline 1 & 0 & 1 & 0 & 1 & 0 & 1 & 0 \\ 1 & 0 & 1 & 0 & 0 & 1 & 0 & 1 \\ 1 & 0 & 0 & 1 & 1 & 0 & 0 & 1 \\ 1 & 0 & 0 & 1 & 0 & 1 & 1 & 0 \end{bmatrix}, k = 1 \sim 4$ (e) $C_{16}^m = \begin{bmatrix} C_{16,1}^m \\ C_{16,2}^m \\ C_{16,3}^m \\ C_{16,4}^m \\ C_{16,5}^m \\ C_{16,6}^m \\ C_{16,7}^m \\ C_{16,8}^m \\ C_{16,9}^m \\ C_{16,10}^m \\ C_{16,11}^m \\ C_{16,12}^m \\ C_{16,13}^m \\ C_{16,14}^m \\ C_{16,15}^m \\ C_{16,16}^m \end{bmatrix} = \begin{bmatrix} C_{8,1}^k & C_{8,1}^{k'} \\ C_{8,1}^k & (C_{8,1}^{k'})' \\ C_{8,2}^k & C_{8,2}^{k'} \\ C_{8,2}^k & (C_{8,2}^{k'})' \\ C_{8,3}^k & C_{8,3}^{k'} \\ C_{8,3}^k & (C_{8,3}^{k'})' \\ C_{8,4}^k & C_{8,4}^{k'} \\ C_{8,4}^k & (C_{8,4}^{k'})' \\ C_{8,5}^k & C_{8,5}^{k'} \\ C_{8,5}^k & (C_{8,5}^{k'})' \\ C_{8,6}^k & C_{8,6}^{k'} \\ C_{8,6}^k & (C_{8,6}^{k'})' \\ C_{8,7}^k & C_{8,7}^{k'} \\ C_{8,7}^k & (C_{8,7}^{k'})' \\ C_{8,8}^k & C_{8,8}^{k'} \\ C_{8,8}^k & (C_{8,8}^{k'})' \end{bmatrix}, m = 1 \sim 2, k = 1 \sim 4$

MULTI-CARRIER CDMA COMMUNICATION DEVICE, MULTI-CARRIER CDMA TRANSMITTING DEVICE, AND MULTI-CARRIER CDMA RECEIVING DEVICE

TECHNICAL FIELD

The present invention relates to a communication apparatus in a mobile communication system which adopts a multiple access scheme, using a multi-carrier CDMA method. More particularly, the present invention relates to a multi-carrier CDMA communication apparatus, a multi-carrier CDMA transmitting apparatus and a multi-carrier CDMA receiving apparatus, which can obtain excellent bit error rate characteristic even in a communication environment affected by frequency selective fading.

BACKGROUND ART

A conventional multi-carrier CDMA communication apparatus will now be explained. As a communication apparatus in a mobile communication system which adopts the multiple access scheme, using the multi-carrier CDMA method, there can be mentioned for example the one described in the literatures "Performance comparisons of coherent SC/DS-CDMA, MC/DS-CDMA, MC-CDMA on down-link broadband radio packet transmission", The Institute of Electronics, Information and Communication Engineers, Technical Report IEICE RCS99-130 p. 63–70, October 1999, and "Overview of Multi-carrier CDMA", IEEE Communications Magazine, p. 126–133, December 1997.

The construction and operation of the conventional multi-carrier CDMA communication apparatus will now be explained with reference to the drawings. FIG. 34 is a diagram which shows the construction of a conventional multi-carrier CDMA transmitting apparatus ("transmitter"), and FIG. 35 is a diagram which shows the construction of a conventional multi-carrier CDMA receiving apparatus ("receiver").

In FIG. 34, reference symbol 501 denotes a convolutional coder, 502 denotes an interleaver, 503 denotes a serial/parallel conversion section (hereinafter, referred to as S/P), 510a, 510b and 510c respectively denote first, second, and the Nscg-th sub-carrier group modulation processing sections, 511 denotes a frame creation section, 512 denotes a copy section, 513 denotes an information modulation section, 514 denotes a frequency spreading section, 504a, 504b and 504c denote multiplexing sections, 505 denotes an inverse Fourier transform section, 506 denotes a guard interval (GI) adding section, 507 denotes a frequency transform section and 508 denotes an antenna.

On the other hand, in FIG. 35, reference symbol 601 denotes a frequency transform section, 602 denotes a frequency transform section, 603 denotes a guard interval (GI) removal section, 604 denotes a Fourier transform section, 610a, 610b and 610c respectively denote first, second, and the Nscg-th sub-carrier group demodulation processing sections, 611 denotes a frequency despreading section, 612 is a synchronization detector, 613 denotes a combining section, 605 denotes a parallel/serial conversion section (hereinafter referred to as P/S), 606 denotes a deinterleaver, and 607 denotes a Viterbi decoder.

FIG. 36 is a diagram which shows the format of a transmission slot for each sub-carrier. The transmission slot comprises a pilot symbol portion (known sequence) and a data portion.

FIG. 37 is a diagram which shows one example of impulse response of a frequency selective fading transmission line. For example, in the mobile communication system, radio wave reflects, diffracts and scatters due to surrounding buildings and geographical features, and incoming waves (multi-path waves) through a plurality of transmission lines interfere with each other, and hence an impulse response of the frequency selective fading transmission line occurs.

The operation of the conventional multi-carrier CDMA communication apparatus will be explained with reference to FIG. 34 and FIG. 35. It is assumed here that data transfer is performed between a base station and a plurality of terminals. At first, the operation of the transmitter will be explained.

For example, the convolutional coder 501 having received transmission data for an optional terminal generates coded data in accordance with a predetermined code rate. This coded data is written in the vertical direction in the interleaver 502 comprising a block, for example, having a longitudinal size of Nr (predetermined integer) and a lateral size of Nc (predetermined integer), and read out in the lateral direction. That is, the interleaver 502 outputs the rearranged signal as coded data.

The S/P 503 having received the coded data converts the data to parallel data for the number of Nscg (predetermined integer), and outputs the converted output to the sub-carrier group modulation processing sections 510a, 510b, . . . , and 510c, respectively. Since the same signal processing is performed in the first to the Nscg-th sub-carrier group modulation processing sections which perform modulation processing for each sub-carrier group, the operation of the first sub-carrier group modulation processing section 510a will be explained here, and explanation for other sub-carrier group modulation processing sections is omitted.

The sub-carrier group modulation processing section 510a receives the first data sequence in the parallel output from the S/P 503. The frame creation section 511 first divides the data sequence into a unit of Ndata, and adds the known sequence (pilot symbol) at the top thereof, to thereby generate the data frame of a sub-carrier group (1). The copy section 512 copies the received data frame by the number of a predetermined sub-carrier number Nsub, to generate data frames for sub-carriers (1, 1) to (1, Nsub). The information modulation section 513 executes QPSK modulation individually with respect to the data frames by the received number of sub-carriers to thereby generate modulation signals for the sub-carriers (1, 1) to (1, Nsub). The frequency spreading section 514 performs frequency spreading for each terminal or for each other channel to be transmitted, using modulation signals by the received number of sub-carriers and frequency spreading codes orthogonal to each other which has been given beforehand. This frequency spreading is realized by multiplying the modulation signals of the received number of sub-carriers by frequency spreading codes C (1, 1) to C(1, Nsub) ach code is expressed by ±1). As the frequency spreading code, a Walsch code, being an orthogonal code, is normally used.

The multiplexing section 504a generates a multiplexing signal by multiplexing similar signals by the number of sub-carriers from other users, with respect to the received signals by the number of sub-carriers after the frequency spreading.

The inverse Fourier transform section 505 uses sub-carrier signals of the number of Nscg×Nsub obtained by the multiplexing sections 504a, 504b and 504c, to perform inverse Fourier transform processing.

The guard interval adding section 506 copies the rear part of the symbol in the signal after inverse Fourier transform by the time $\tau_{GI}$, and sticks the copied part to the top of the symbol. FIG. 38 is a diagram which shows the processing in the guard interval adding section 506. $\tau_{GI}$ is normally set so as to become larger than the delayed wave expanse $\tau_d$ on the transmission line shown in FIG. 37.

Finally, the frequency transform section 507 multiplies the signal after adding the guard interval by a carrier wave signal in the output of a frequency oscillator (not shown), and executes bandwidth limiting, using a band-pass filter (not shown), to thereby generate a transmission signal. The transmission signal is then output to the transmission line via the antenna 508. FIG. 39 is a diagram which shows the transmission signal expressed on a frequency axis.

On the other hand, the receiver receives the transmission signal affected by the frequency selective fading or the like, via the antenna 601. The frequency transform section 602 performs bandwidth limiting by means of a band-pass filter (not shown) with respect to the input signal, and then multiplies the signal after performing the bandwidth limiting by a signal synchronous to the carrier wave frequency output by the frequency synthesizer (not shown). The multiplied signal is subjected to wave filtering by a low-pass filter (not shown) so that only a low frequency component is output as a signal after frequency translation.

The guard interval (GI) removal section 603 outputs a signal in which the guard interval is removed and each symbol is continuously connected to each other. The Fourier transform section 604 having received the signal in which the guard interval has been removed performs the Fourier transform processing, to thereby output sub-carrier signals by the number of Nscg×Nsub. Each sub-carrier signal is transmitted to the first, the second, . . . , and the Nscg-th sub-carrier group modulation processing sections 610a, 610b and 610c, respectively, in order to perform demodulation processing for each sub-carrier group. In the first, the second and the Nscg-th sub-carrier group demodulation processing sections 610a, 610b and 610c, the same signal processing is performed. Therefore, only the operation of the first sub-carrier group demodulation processing section 610a will be explained herein, and explanation for the other sub-carrier group demodulation processing sections is omitted.

The sub-carrier group demodulation processing section 610a receives the first sub-carrier signals by the number of Nsub, and the frequency despreading section 611 multiplies the sub-carrier signals by the number of Nsub by an individually allocated spreading code, to thereby perform inverse spreading.

The synchronization detector 612 which has received each sub-carrier signal after frequency despreading uses the known sequence symbol added for each frame to estimate the transmission line to thereby perform synchronization detection. That is to say, the synchronization detector 612 synchronously adds the known sequence symbols by the number of Npilot in the frame, to thereby calculate a transmission line estimate value for each sub-carrier. The synchronization detector 612 then calculates a complex conjugate and an absolute value of the calculation results, and divides the complex conjugate by the absolute value, to thereby extract a phase component for each sub-carrier. Finally, the synchronization detector 612 multiplies the sub-carrier signal after the frequency despreading by the phase component for each sub-carrier, to perform synchronization detection.

The combining section 613 adds all the received sub-carrier signals after the synchronization detection to calculate the first sub-carrier group signal.

The P/S 605 receives the sub-carrier group signals from all the sub-carrier group demodulation processing sections, and converts these signals to serial signals. The serial signals are written in the lateral direction in the deinterleaver 606 which has blocks having a longitudinal size of Nr (predetermined integer) and a lateral size of Nc (predetermined integer), and read out in the longitudinal direction.

Finally, the Viterbi decoder 607 performs known Viterbi decoding with respect to the received signal after rearrangement.

As described above, in the conventional multi-carrier CDMA communication apparatus, even if the amplitude and the phase of the receiving wave is affected by the frequency selective fading which varies at random, an excellent bit error rate characteristic is obtained by setting the guard interval so that the expanse of the delayed wave is fitted therein and further by allocating the frequency spreading code for each user or for each channel.

In the conventional multi-carrier CDMA communication apparatus, however, the expanse of the delayed wave is large depending on the situation of the transmission line, and sometimes the expanse of the delayed wave may not be fitted in the guard interval. In such an instance, there is a problem in that the apparatus is affected by the frequency selective fading, thereby the influence of interference increases in the symbol, and an excellent bit error rate characteristic cannot be obtained.

There is another problem in that when the level of the delayed wave is larger than the preceding wave, the delayed wave is not utilized for increasing the quality of the input signal (for example, a signal power to interference power ratio (SIR)).

In the multi-media mobile communication, it is considered to be necessary to change the information rate adaptively, depending on the application to be handled. In other words, when the frequency spreading code is allocated for each user or for each channel to be used, it is necessary to allocate a channel depending on the information transmission rate. In the conventional multi-carrier CDMA communication apparatus, however, it is necessary that the frequency spreading codes are orthogonal to each other, and since the frequency spreading rate is fixed, there is a problem in that the information rate cannot be changed adaptively.

When hand-over is performed between sectors and between cells, so that communication is not broken off at the time of reception by a mobile station (terminal), it is necessary to change the frequency to be used on the transmission line, thereby causing a problem in that the frequency efficiency decreases.

Moreover, transmission power control is necessary on the base station side, in order to solve a problem in that the reception quality of the mobile station must be kept constant regardless of the distance from the base station. In the land mobile communication, however, the degree of influence by the frequency selective fading differs largely for each sub-carrier. Therefore, with the conventional method in which the input signal power is kept constant in the mobile station, there is a problem in that the input signal quality cannot be kept constant, while suppressing the influence with respect to other mobile stations (terminals).

SUMMARY OF THE INVENTION

It is an object of the present invention to provide a multi-carrier CDMA communication apparatus capable of realizing an excellent bit error rate characteristic, even when the expanse of the delayed wave is not fitted in the guard interval, and the transmission signal from the base station is affected by the frequency selective fading on the transmission line.

It is another object of the present invention to provide a multi-carrier CDMA communication apparatus capable of realizing improvement of the input signal quality, by using a delayed wave, when the level of the delayed wave is larger than the preceding wave.

It is still another object of the present invention to provide a multi-carrier CDMA communication apparatus capable of changing the frequency spreading rate, while maintaining the condition that the frequency spreading codes allocated for each user or for each channel to be used are orthogonal to each other.

It is still another object of the present invention to provide a multi-carrier CDMA communication apparatus capable of executing soft hand-over between sectors or between cells, without breaking off the communication at the time of reception, and without changing the frequency to be used on the transmission line.

It is a still another object of the present invention to provide a multi-carrier CDMA communication apparatus capable of keeping the input signal quality constant, while suppressing the influence with respect to other mobile stations (terminals), that is, while reducing the interference quantity, even when the degree of influence of the frequency selective fading differs largely in each sub-carrier.

In a multi-carrier CDMA communication apparatus according to this invention, the transmitter comprises signal modulation units for the number of sub-carrier groups (corresponding to sub-carrier group processing sections 6a to 8c), which performs frequency spreading for each sub-carrier signal of each channel constituting a sub-carrier group, based on a predetermined condition, and time spread units for the number of sub-carrier groups (corresponding to multiplexing sections 9a to 9c, and time spreading sections 10a to 10c), which multiplex all the signals after the modulation processing and the frequency spreading for each sub-carrier signal, and perform time spreading with respect to the multiplexed signals for each sub-carrier signal. The receiver comprises time despreading units for the number of sub-carrier groups (corresponding to time despreading sections 35a to 35c), which perform time despreading for each sub-carrier signal, and signal demodulation units for the number of sub-carrier groups (corresponding to sub-carrier group demodulation processing sections 36a to 38c), which perform frequency despreading for each sub-carrier signal after the time despreading.

In a multi-carrier CDMA communication apparatus according to a next invention, the transmitter comprises a setting unit (corresponding to a data/modulation control section 4 in an embodiment described later) which sets a code rate of error correction, number of sub-carrier groups, frequency spreading rate, number of code multiplexes of a frequency spreading code, frequency spreading code, time spreading rate, number of code multiplexes of a time spreading code and time spreading code, signal modulation units for the number of sub-carrier groups (corresponding to sub-carrier group modulation processing sections 6a to 8c) which perform frequency spreading for each sub-carrier signal of each channel constituting a sub-carrier group, based on the set conditions, and time spread units for the number of sub-carrier groups (corresponding to multiplexing sections 9a to 9c, and time spreading sections 10a to 10c), which multiplex all the signals after the modulation processing and the frequency spreading for each sub-carrier signal, and perform time spreading with respect to the multiplexed signals for each sub-carrier signal. The receiver comprises time despreading units for the number of sub-carrier groups (corresponding to time despreading sections 35a to 35c), which perform time despreading for each sub-carrier signal; and signal demodulation units for the number of sub-carrier groups (corresponding to sub-carrier group demodulation processing sections 36a to 38c), which perform frequency despreading for each sub-carrier signal after the time despreading.

In the multi-carrier CDMA communication apparatus according to a next invention, signal modulation unit comprises a frame creation unit (corresponding to a frame creation section 21) which creates data frames comprising a known sequence, frame information and data, for each sub-carrier group based on the conditions, a copy unit (corresponding to a copy section 22) which generates data frames for the number of sub-carriers, by copying the data frame, an information modulation unit (corresponding to an information modulation section 23) which performs modulation processing with respect to each data frame, a frequency spreading unit (corresponding to a frequency spreading section 24) which performs frequency spreading with respect to each sub-carrier signal after modulation, based on the conditions; and a power control unit (corresponding to a power control section 25) which performs transmission power control with respect to each sub-carrier signal after the frequency spreading.

In the multi-carrier CDMA communication apparatus according to a next invention, the setting unit sets the code rate of error correction, based on an input signal power to interference power ratio transmitted from the receiver. When there is no frequency spreading code to be allocated, at the time of setting the frequency spreading code, the setting unit ensures an allocatable frequency spreading code by reducing the frequency spreading rate.

In the multi-carrier CDMA communication apparatus according to a next invention, the setting unit sets the code rate of error correction, based on an input signal power to interference power ratio transmitted from the receiver. When there is no frequency spreading code to be allocated, at the time of setting the frequency spreading code, the setting unit ensures an allocatable frequency spreading code by reducing the frequency spreading rate. When the code rate can be set in this condition, the setting unit ensures an allocatable frequency spreading code, by ensuring a plurality of frequency spreading codes in the same sub-carrier group.

In the multi-carrier CDMA communication apparatus according to a next invention, the setting unit allocates the frequency spreading code, by leaving a predetermined frequency interval, while keeping the orthogonality and hierarchical relationship between frequency spreading codes.

In the multi-carrier CDMA communication apparatus according to a next invention, the signal demodulation unit comprises, a frequency despreading unit (corresponding to a frequency despreading section 54) which performs frequency despreading for each sub-carrier signal; a synchronization detector (corresponding to a synchronization detector 55) which performs transmission line estimation for each sub-carrier signal after the frequency inverse conversion, based on the known sequence added to the data frame, calculates an absolute value and a complex conjugate of the transmission line estimation results, normalizes the complex conjugate by the absolute value, weights the sub-carrier signal by the normalization result, and outputs the absolute value and the sub-carrier signal after weighting as an output; a synthesizing unit (corresponding to a combining section 56) which generates a signal for the sub-carrier group by adding all the sub-carrier signals after weighting, and synthesizes an absolute value for the sub-carrier group by adding all the absolute values; and a path synthesizing unit (corresponding to a path combining section 57) which multiplies the sub-carrier group signal corresponding to each path by the absolute value of the respectively corresponding sub-carrier group, to thereby generate a sub-carrier group signal after path combining, by adding all the multiplication results.

In the multi-carrier CDMA communication apparatus according to a next invention, the signal demodulation unit comprises, a frequency despreading unit which performs frequency despreading for each sub-carrier signal; a synchronization detector which performs transmission line estimation for each sub-carrier signal after the frequency inverse conversion, based on the known sequence added to the data frame, calculates a complex conjugate of the transmission line estimation results, weights the sub-carrier signal by the complex conjugate, and outputs the sub-carrier signal after weighting as an output; a synthesizing unit which generates a signal for the sub-carrier group by adding all the sub-carrier signals after weighting; and a path synthesizing unit which adds all the sub-carrier group signals corresponding to each path, to thereby generate a sub-carrier group signal after path combining.

In the multi-carrier CDMA communication apparatus according to a next invention, the signal demodulation unit comprises, a frequency despreading unit which performs frequency despreading in a unit of the sub-carrier signal; a synchronization detector which performs transmission line estimation for each sub-carrier signal after the frequency inverse conversion, based on the known sequence added to the data frame, calculates an absolute value and a complex conjugate of the transmission line estimation results, normalizes the complex conjugate by the absolute value, weights the sub-carrier signal by the normalization result, and on the other hand, estimates an interference power for each sub-carrier signal after the frequency inverse conversion based on the known sequence, and divides the sub-carrier signal after weighting by the interference power; a synthesizing unit which generates a signal for the sub-carrier group by adding all the sub-carrier signals after synchronization detection, and generates an absolute value for the sub-carrier group by adding all the absolute values; and a path synthesizing unit which multiplies the sub-carrier group signal corresponding to each path by the absolute value of the respectively corresponding sub-carrier group, to thereby generate a sub-carrier group signal after path combining, by adding all the multiplication results.

In the multi-carrier CDMA communication apparatus according to a next invention, the signal demodulation unit comprises, a frequency despreading unit which performs frequency despreading in a unit of the sub-carrier signal; a synchronization detector which performs transmission line estimation for each sub-carrier signal after the frequency inverse conversion, based on the known sequence added to the data frame, calculates a complex conjugate of the transmission line estimation results, weights the sub-carrier signal by the complex conjugate, and lastly removes an interference component from the sub-carrier signal after weighting; a synthesizing unit which generates a signal for the sub-carrier group by adding all the sub-carrier signals after removing the interference; and a path synthesizing unit which adds all the sub-carrier group signals corresponding to each path, to thereby generate a sub-carrier group signal after the path combining.

In the multi-carrier CDMA communication apparatus according to a next invention, the transmitter comprises signal modulation units (corresponding to sub-carrier group modulation processing sections 282a to 284c) for the number of sub-carrier groups, which perform frequency spreading and time spreading for each sub-carrier signal of each channel constituting a sub-carrier group, based on a predetermined condition, and the receiver comprises signal demodulation units (corresponding to sub-carrier group demodulation processing sections 301a to 303c) for the number of sub-carrier groups, which perform time despreading and frequency despreading for each sub-carrier signal.

In the multi-carrier CDMA communication apparatus according to a next invention, the transmitter comprises, a setting unit (corresponding to a data/modulation control section 281) which sets a code rate of error correction, number of sub-carrier groups, frequency spreading rate, number of code multiplexes of frequency spreading code, frequency spreading code, time spreading rate, number of code multiplexes of time spreading code and time spreading code; and signal modulation units (corresponding to sub-carrier group modulation processing sections 282a to 284c) for the number of sub-carrier groups which perform frequency spreading and time spreading for each sub-carrier signal of each channel constituting a sub-carrier group, based on the setting; and the receiver comprises signal demodulation units (corresponding to sub-carrier group demodulation processing sections 301a to 303c) for the number of sub-carrier groups, which perform time despreading and frequency despreading for each sub-carrier signal.

In the multi-carrier CDMA communication apparatus according to a next invention, the signal modulation unit comprises, a frame creation unit which creates data frames comprising a known sequence, frame information and data, for each sub-carrier group based on the conditions, a copy unit which generates data frames for the number of sub-carriers, by copying the data frame, an information modulation unit which performs modulation processing with respect to the each data frame, a frequency spreading unit which performs frequency spreading with respect to each sub-carrier signal after modulation, based on the conditions, a power control unit which performs transmission power control with respect to each sub-carrier signal after the frequency spreading, and a time spread unit (corresponding to a time spreading section 291) which performs time spreading with respect to each sub-carrier signal after the frequency spreading.

In the multi-carrier CDMA communication apparatus according to a next invention, the setting unit sets the code rate of error correction, based on an input signal power to interference power ratio transmitted from the receiver, and when there is no frequency spreading code nor time spreading code to be allocated, at the time of setting the frequency spreading code and time spreading code, the setting unit ensures an allocatable frequency spreading code by reducing the frequency spreading rate.

In the multi-carrier CDMA communication apparatus according to a next invention, the setting unit sets the code rate of error correction, based on an input signal power to interference power ratio transmitted from the receiver, and when there is no frequency spreading code nor time spreading code to be allocated, at the time of setting the frequency spreading code and time spreading code, the setting unit ensures an allocatable frequency spreading code by reducing the frequency spreading rate, and even in this condition, when there is still no frequency spreading code nor time spreading code to be allocated, the setting unit ensures an allocatable frequency spreading code, by ensuring a plurality of frequency spreading codes in the same sub-carrier group.

In the multi-carrier CDMA communication apparatus according to a next invention, the setting unit sets the code rate of error correction, based on an input signal power to interference power ratio transmitted from the receiver, and when there is no frequency spreading code nor time spreading code to be allocated, at the time of setting the frequency spreading code and time spreading code, the setting unit ensures an allocatable frequency spreading code by reducing the frequency spreading rate, and even in this condition, when there is still no frequency spreading code nor time spreading code to be allocated, the setting unit ensures an allocatable frequency spreading code, by ensuring a plurality of frequency spreading codes in the same sub-carrier group, and even in this condition, when there is still no frequency spreading code nor time spreading code to be allocated, the setting unit ensures an allocatable frequency spreading code and time spreading code, by ensuring a plurality of frequency spreading codes in the same sub-carrier group, and increasing the number of multiplexes of the time spreading code.

In the multi-carrier CDMA communication apparatus according to a next invention, the setting unit sets the code rate of error correction, based on an input signal power to interference power ratio transmitted from the receiver, and when there is no frequency spreading code nor time spreading code to be allocated, at the time of setting the frequency spreading code and time spreading code, the setting unit ensures an allocatable frequency spreading code by reducing the frequency spreading rate, and even in this condition, when there is still no frequency spreading code nor time spreading code to be allocated, the setting unit ensures an allocatable frequency spreading code, by ensuring a plurality of frequency spreading codes in the same sub-carrier group, and even in this condition, when there is still no frequency spreading code nor time spreading code to be allocated, the setting unit ensures an allocatable frequency spreading code and time spreading code, by ensuring a plurality of frequency spreading codes in the same sub-carrier group, and decreasing the time spreading rate.

In the multi-carrier CDMA communication apparatus according to a next invention, the signal demodulation unit comprises, a time despreading unit (corresponding to a time despreading section 311) which performs time despreading for each sub-carrier signal; a frequency despreading unit which performs frequency despreading for each sub-carrier signal; a synchronization detector which performs transmission line estimation for each sub-carrier signal after the frequency inverse conversion, based on the known sequence added to the data frame, calculates an absolute value and a complex conjugate of the transmission line estimation results, normalizes the complex conjugate by the absolute value, weights the sub-carrier signal by the normalization result, and outputs the absolute value and the sub-carrier signal after weighting as an output; a synthesizing unit which generates a signal for the sub-carrier group by adding all the sub-carrier signals after weighting, and synthesizes an absolute value for the sub-carrier group by adding all the absolute values; and a path synthesizing unit which multiplies the sub-carrier group signal corresponding to each path by the absolute value of the respectively corresponding sub-carrier group, to thereby generate a sub-carrier group signal after path combining, by adding all the multiplication results.

In the multi-carrier CDMA communication apparatus according to a next invention, the signal demodulation unit comprises, a time despreading unit which performs time despreading for each sub-carrier signal; a frequency despreading unit which performs frequency despreading for each sub-carrier signal; a synchronization detector which performs transmission line estimation for each sub-carrier signal after the frequency inverse conversion, based on the known sequence added to the data frame, calculates a complex conjugate of the transmission line estimation results, weights the sub-carrier signal by the complex conjugate, and outputs the sub-carrier signal after weighting as an output; a synthesizing unit which generates a signal for the sub-carrier group by adding all the sub-carrier signals after weighting; and a path synthesizing unit which adds all the sub-carrier group signals corresponding to each path, to thereby generate a sub-carrier group signal after path combining.

In the multi-carrier CDMA communication apparatus according to a next invention, the signal demodulation unit comprises, a time despreading unit which performs time despreading for each sub-carrier signal; a frequency despreading unit which performs frequency despreading in a unit of the sub-carrier signal; a synchronization detector which performs transmission line estimation for each sub-carrier signal after the frequency inverse conversion, based on the known sequence added to the data frame, calculates an absolute value and a complex conjugate of the transmission line estimation results, normalizes the complex conjugate by the absolute value, weights the sub-carrier signal by the normalization result, and on the other hand, estimates an interference power for each sub-carrier signal after the frequency inverse conversion based on the known sequence, and divides the sub-carrier signal after weighting by the interference power; a synthesizing unit which generates a signal for the sub-carrier group by adding all the sub-carrier signals after synchronization detection, and generates an absolute value for the sub-carrier group by adding all the absolute values; and a path synthesizing unit which multiplies the sub-carrier group signal corresponding to each path by the absolute value of the respectively corresponding sub-carrier group, to thereby generate a sub-carrier group signal after path combining, by adding all the multiplication results.

In the multi-carrier CDMA communication apparatus according to a next invention, the signal demodulation unit comprises, a time despreading unit which performs time despreading for each sub-carrier signal; a frequency despreading unit which performs frequency despreading in a unit of the sub-carrier signal; a synchronization detector which performs transmission line estimation for each sub-carrier signal after the frequency inverse conversion, based on the known sequence added to the data frame, calculates a complex conjugate of the transmission line estimation results, weights the sub-carrier signal by the complex conjugate, and on the other hand, estimates an interference power for each sub-carrier signal after the frequency inverse conversion based on the known sequence, and divides the sub-carrier signal after weighting by the interference power; a synthesizing unit which generates a signal for the sub-carrier group by adding all the sub-carrier signals after synchronization detection; and a path synthesizing unit which adds all the sub-carrier group signals corresponding to each path, to thereby generate a sub-carrier group signal after the path combining.

A multi-carrier CDMA transmitter according to a next invention comprises signal modulation units for the number of sub-carrier groups, which perform frequency spreading for each sub-carrier signal of each channel constituting a sub-carrier group, based on a predetermined condition, and time spread units for the number of sub-carrier groups, which multiplex all the signals after the modulation processing and the frequency spreading for each sub-carrier signal, and perform time spreading with respect to the multiplexed signals for each sub-carrier signal.

A multi-carrier CDMA transmitter according to a next invention comprises a setting unit which sets a code rate of error correction, number of sub-carrier groups, frequency spreading rate, number of code multiplexes of frequency spreading code, frequency spreading code, time spreading rate, number of code multiplexes of time spreading code and time spreading code, signal modulation units for the number of sub-carrier groups which perform frequency spreading for each sub-carrier signal of each channel constituting a sub-carrier group, based on the set conditions, and time spread units for the number of sub-carrier groups, which multiplex all the signals after the modulation processing and the frequency spreading for each sub-carrier signal, and perform time spreading with respect to the multiplexed signals for each sub-carrier signal.

A multi-carrier CDMA transmitter according to a next invention comprises signal modulation units for the number of sub-carrier groups, which perform frequency spreading and time spreading for each sub-carrier signal of each channel constituting a sub-carrier group, based on a predetermined condition.

A multi-carrier CDMA transmitter according to a next invention comprises a setting unit which sets a code rate of error correction, number of sub-carrier groups, frequency spreading rate, number of code multiplexes of frequency spreading code, frequency spreading code, time spreading rate, number of code multiplexes of time spreading code and time spreading code, and signal modulation units for the number of sub-carrier groups which perform frequency spreading and time spreading for each sub-carrier signal of each channel constituting a sub-carrier group, based on the set conditions.

A multi-carrier CDMA receiver according to a next invention comprises time despreading units for the number of sub-carrier groups, which perform time despreading for each sub-carrier signal, and signal demodulation units for the number of sub-carrier groups, which perform frequency despreading for each sub-carrier signal after the time despreading.

A multi-carrier CDMA receiver according to a next invention comprises signal demodulation units for the number of sub-carrier groups, which perform time despreading and frequency despreading for each sub-carrier signal.

BRIEF DESCRIPTION OF THE DRAWINGS

FIG. 10 is a diagram which shows one example of construction of frequency spreading code group;

BEST MODE FOR CARRYING OUT THE INVENTION

Embodiments of the multi-carrier CDMA communication apparatus according to this invention will now be explained with reference to the accompanying drawings. It is a matter of course that this invention is not limited by those embodiments.

First Embodiment

Figure 1:
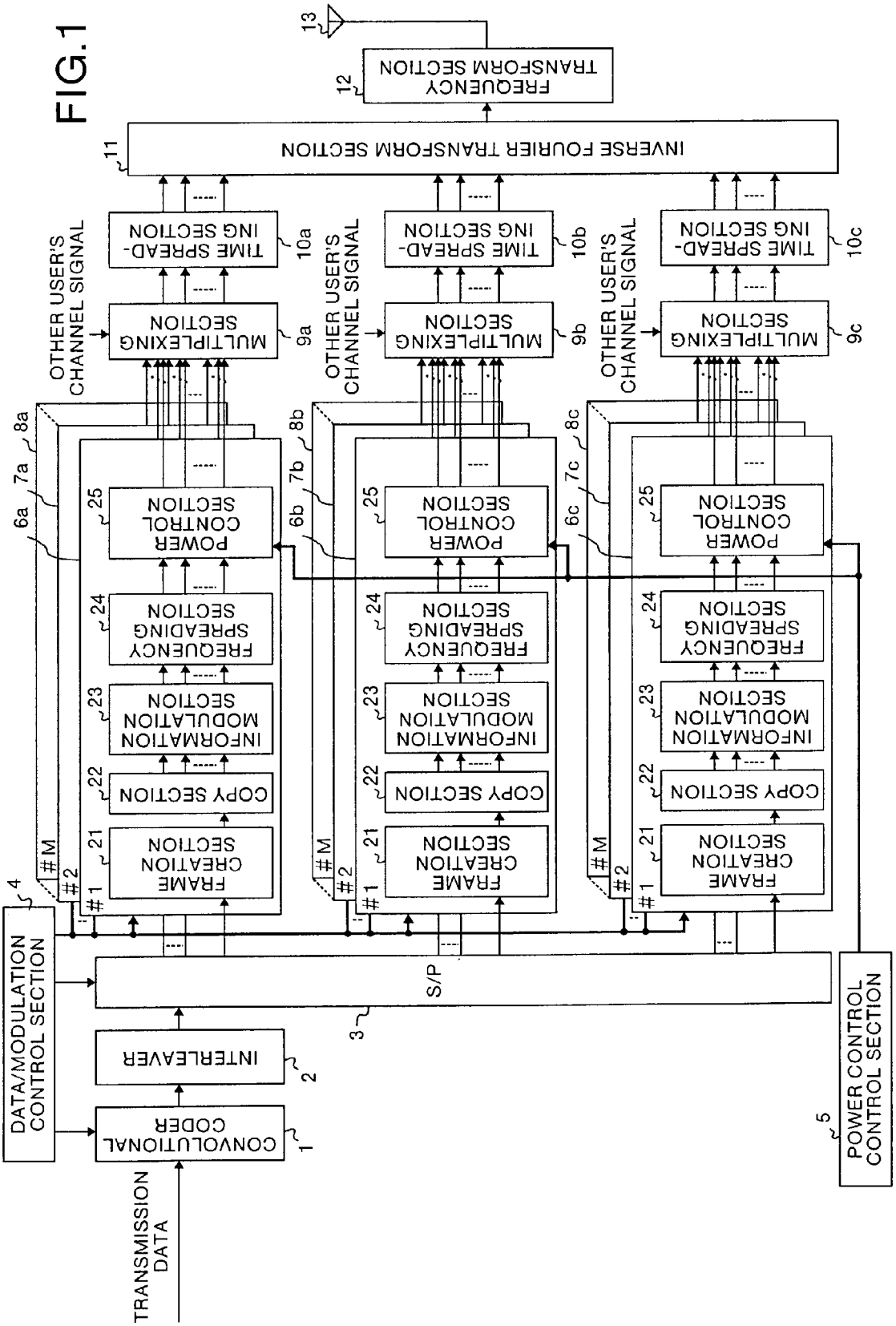
FIG. 1 is a diagram which shows the construction of a multi-carrier CDMA transmitter in a first embodiment.
Figure 2:
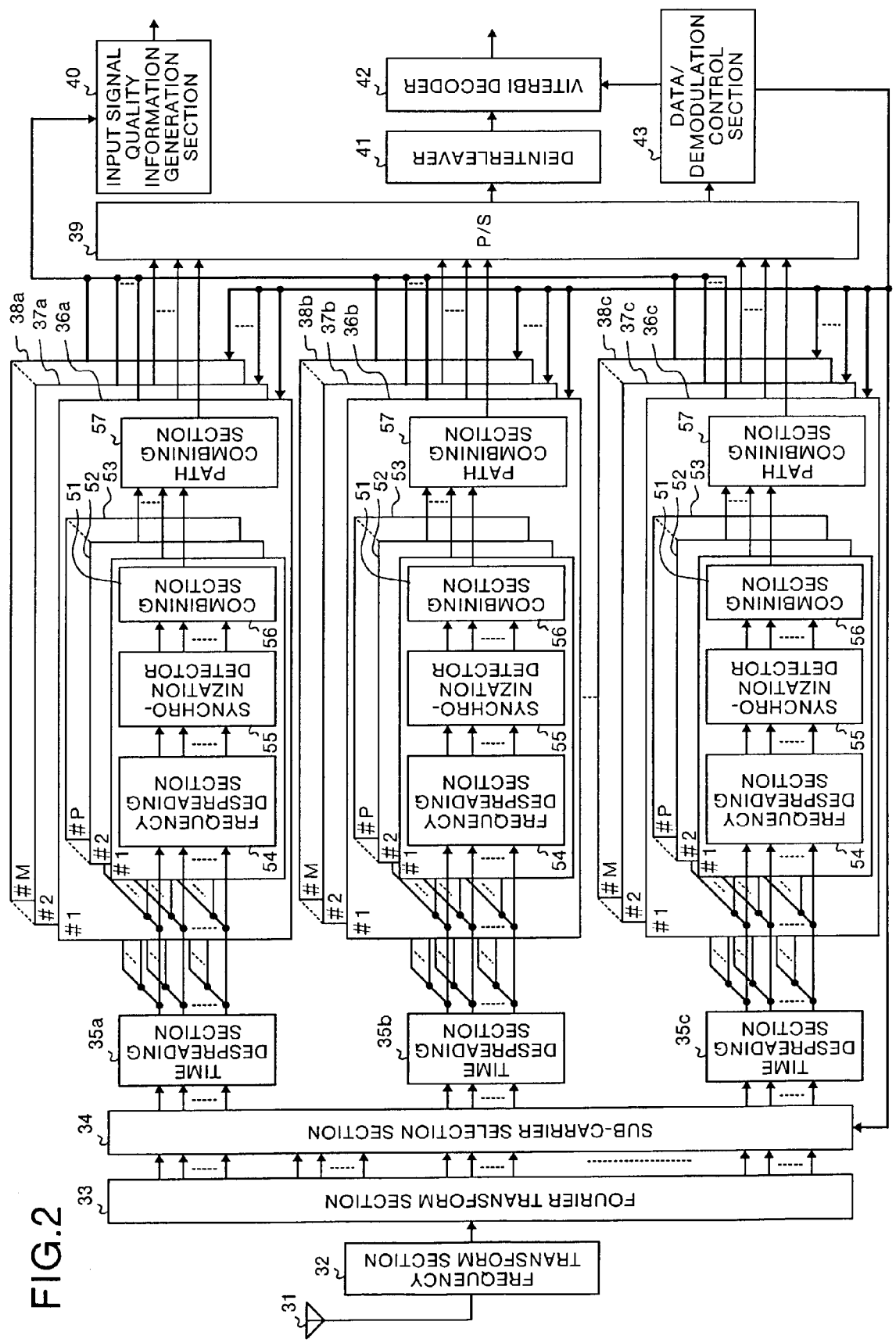
FIG. 2 is a diagram which shows the construction of a multi-carrier CDMA receiver in a first embodiment.

FIG. 1 and FIG. 2 are diagrams which show the construction of a multi-carrier CDMA communication apparatus of the present invention in the first embodiment. FIG. 1 is a diagram which shows the construction of a multi-carrier CDMA transmitter and FIG. 2 is a diagram which shows the construction of a multi-carrier CDMA receiver in this embodiment.

In FIG. 1, reference symbol 1 denotes a convolutional coder, 2 denotes an interleaver, 3 denotes a serial/parallel conversion section (hereinafter, referred to as S/P), 4 denotes a data/modulation control section, 5 denotes a power control control section, 6a, 6b, 6c, 7a, 7b, 7c, . . . , 8a, 8b and 8c denote first, second, and Nscg-th sub-carrier group modulation processing sections provided for each channel, 9a, 9b and 9c denote multiplexing sections, 10a, 10b and 10c denote time spreading sections, 11 denotes an inverse Fourier transform section, 12 denotes a frequency transform section, 13 denotes an antenna, 21 denotes a frame creation section, 22 denotes a copy section, 23 denotes an information modulation section, 24 denotes a frequency spreading section, and 25 denotes a power control section.

On the other hand, in FIG. 2, reference symbol 31 denotes an antenna, 32 denotes a frequency transform section, 33 denotes a Fourier transform section, 34 denotes a sub-carrier selection section, 35a, 35b and 35c denote first, second, and Nscg-th sub-carrier group time despreading sections, 36a, 36b, 36c, 37a, 37b, 37c, . . . , 38a, 38b and 38c denote first, second, and Nscg-th sub-carrier group demodulation processing sections provided for each multiplex channel, 39 denotes a parallel/serial conversion section ("P/S"), 40 denotes an input signal quality information generation section, 41 denotes a deinterleaver, 42 denotes a Viterbi decoder, 43 denotes a data/demodulation control section, 51, 52 and 53 denote path demodulation processing sections for each path, 54 denotes a frequency despreading section, 55 denotes a synchronization detector, 56 denotes a combining section and 57 denotes a path combining section.

Figure 3:
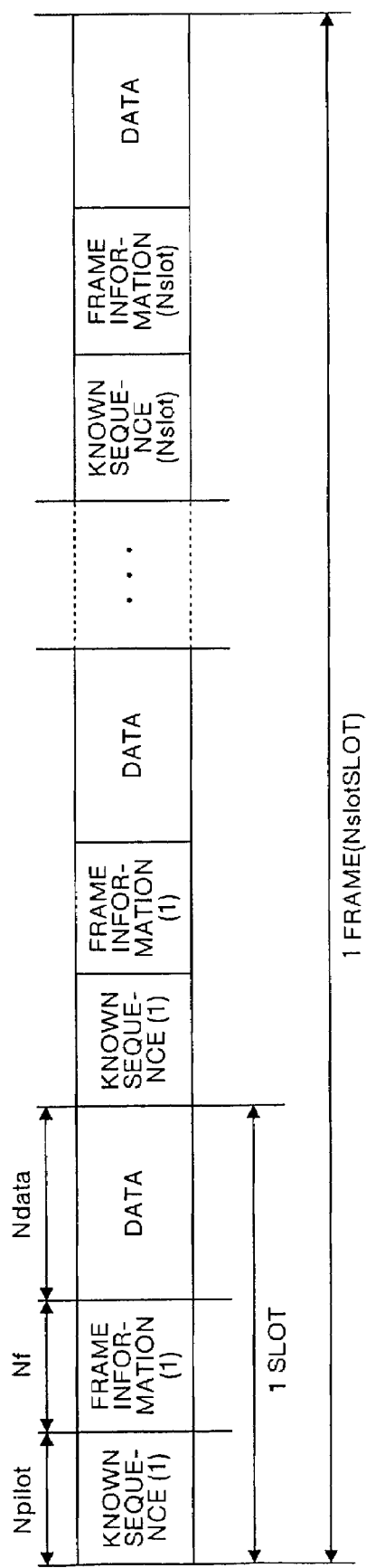
FIG. 3 is a diagram which shows a format of a transmission slot for each sub-carrier.

FIG. 3 is a diagram which shows a format of a transmission slot for each sub-carrier. Thus, the transmission slot comprises a pilot symbol portion (known sequence), a frame information portion and a data portion.

The operation of the transmitter and the receiver will now be explained. It is assumed here that data transfer is performed between a base station and a plurality of terminals. At first, the operation of the transmitter will be explained.

At first, the convolutional coder 1 having received the transmission data with respect to an optional terminal performs convolutional coding of the transmission signal, based on a "code rate set-point signal" for setting the code rate of error correction according to the desired communication quality, which is transmitted from the data/modulation control section 4.

Figures 4, 5:
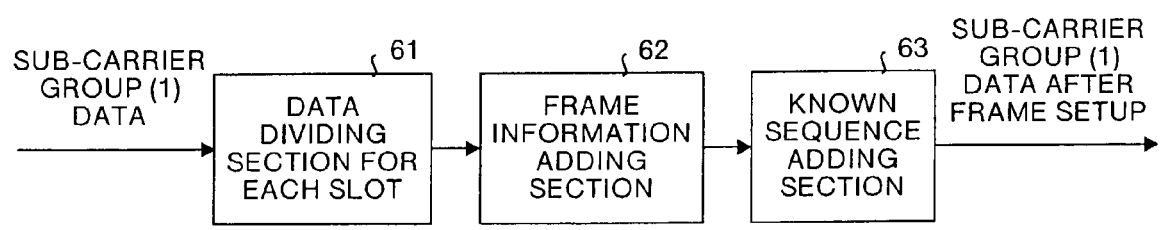
FIG. 4 is a diagram which shows the construction of an interleaver.
FIG. 5 is a diagram which shows the construction of a frame creation section.

The interleaver 2 rearranges the convolutional coding data. FIG. 4 is a diagram which shows the construction of the interleaver 2. In this embodiment, for example, there are provided blocks having a longitudinal size of Nr (predetermined integer) and a lateral size of Nc (predetermined integer), and as shown in FIG. 4, the coded data is written in the longitudinal direction, and then read out in the lateral direction. As a result, the coded data is rearranged for each frame.

The S/P 3 receives the rearranged coded data, and a "set-point signal" for setting the number of sub-carrier groups Nscg, the frequency spreading rate Nsub, and the number of code multiplexes M on the frequency axis, which is transmitted from the data/modulation control section 4. The number of sub-carrier groups Nscg and the frequency spreading rate Nsub take a value of not less than 1 and not larger than the number of all sub-carriers on the frequency band. The S/P 3 converts the rearranged coded data (serial signal) to a parallel signal corresponding to all channels in each sub-carrier group.

The sub-carrier group modulation processing sections 6a to 8c, which individually correspond to M channels for the number of code multiplexes in each sub-carrier group, receive the parallel signal and the set-point signal to thereby perform modulation processing for each channel. In the M sub-carrier group modulation processing sections 6a to 8c in the first to the Nscg-th sub-carrier groups, the same signal processing is performed. Hence, the operation of only the sub-carrier group modulation processing section 6a in the first channel will be explained herein, and the explanation of other sub-carrier group modulation processing sections is omitted. The number of sub-carrier groups Nscg and the number of code multiplexes M for each sub-carrier group are variables determined in the data/modulation control section 4.

The sub-carrier group modulation processing section 6a receives the first data sequence in the parallel signal, to perform predetermined processing shown below. FIG. 5 is a diagram which shows the construction of the frame creation section 21. In FIG. 5, reference symbol 61 denotes a data dividing section for each slot, 62 denotes a frame information adding section and 63 denotes a known sequence adding section. The data dividing section for each slot in the frame creation section 21 divides the data sequence into units of Nslot which includes a plurality of data for one slot (number of data bit Ndata). The frame information adding section 62 having received the data divided into a plurality of slots adds information necessary for demodulation, such as code rate, number of sub-carrier groups Nscg, frequency spreading rate Nsub, frequency spreading code and number of code multiplexes, to the leading part of each data as the frame information for each mobile station (terminal). The known sequence adding section 63 further adds a known sequence (pilot symbol) to the head of each slot, to thereby generate a data frame in which slots continues time-wise, as shown in FIG. 3. The data frame is then output to the copy section 22.

Figure 6:
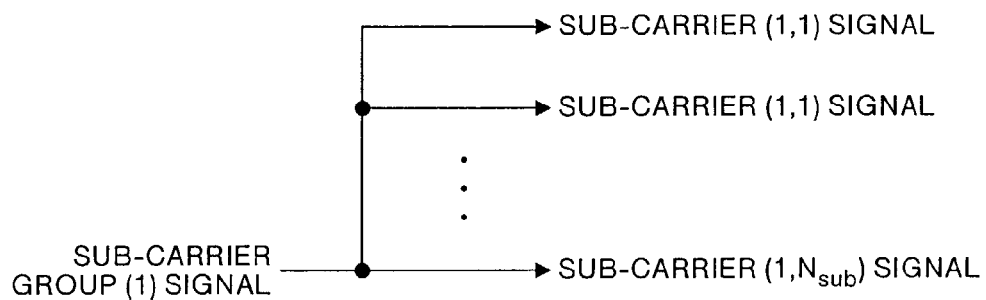
FIG. 6 is a diagram which shows the construction of a copy section.

FIG. 6 is a diagram which shows the construction of the copy section 22. The copy section 22 copies the received data frame by the number of sub-carriers Nsub, according to the set-point signal having the frequency spreading rate output from the data/modulation control section 4, to thereby generate data frames for the sub-carrier signals (1, 1) to (1, Nsub). These data frames are output to the information modulation section 23.

Figure 7:
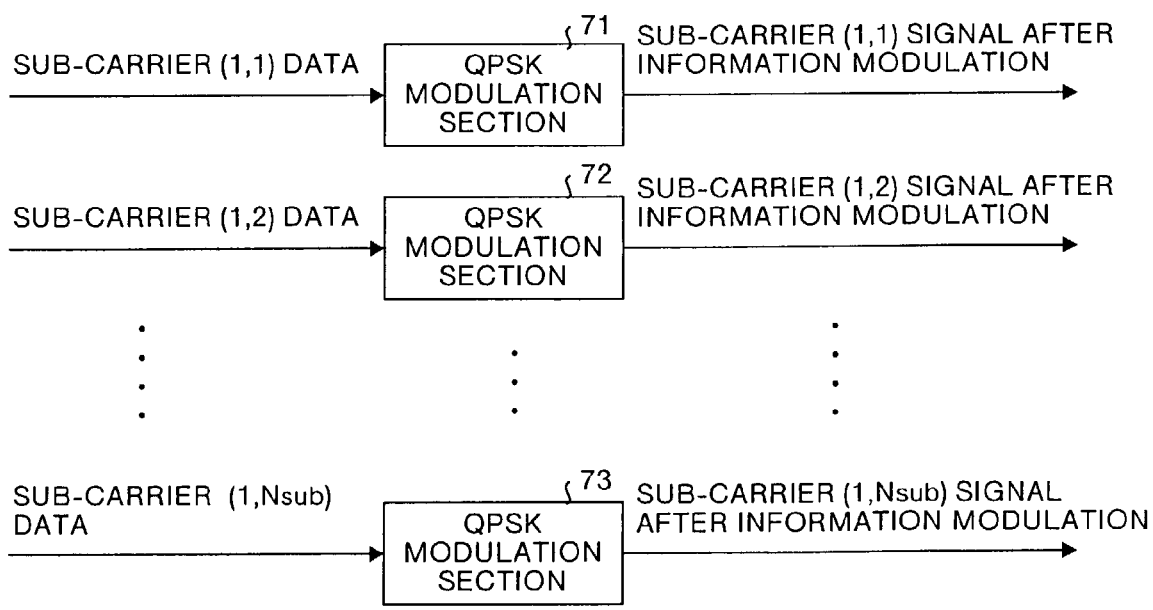
FIG. 7 is a diagram which shows the construction of an information modulation section.

FIG. 7 is a diagram which shows the construction of the information modulation section 23. In FIG. 7, reference symbols 71, 72 and 73 denote QPSK modulation sections. Each QPSK modulation section performs QPSK modulation with respect to the frame data for the received number of sub-carriers, to thereby generate modulation signals for the sub-carrier (1, 1) to the sub-carrier (1, Nsub). These modulation signals are output to the frequency spreading section 24.

Figure 8:
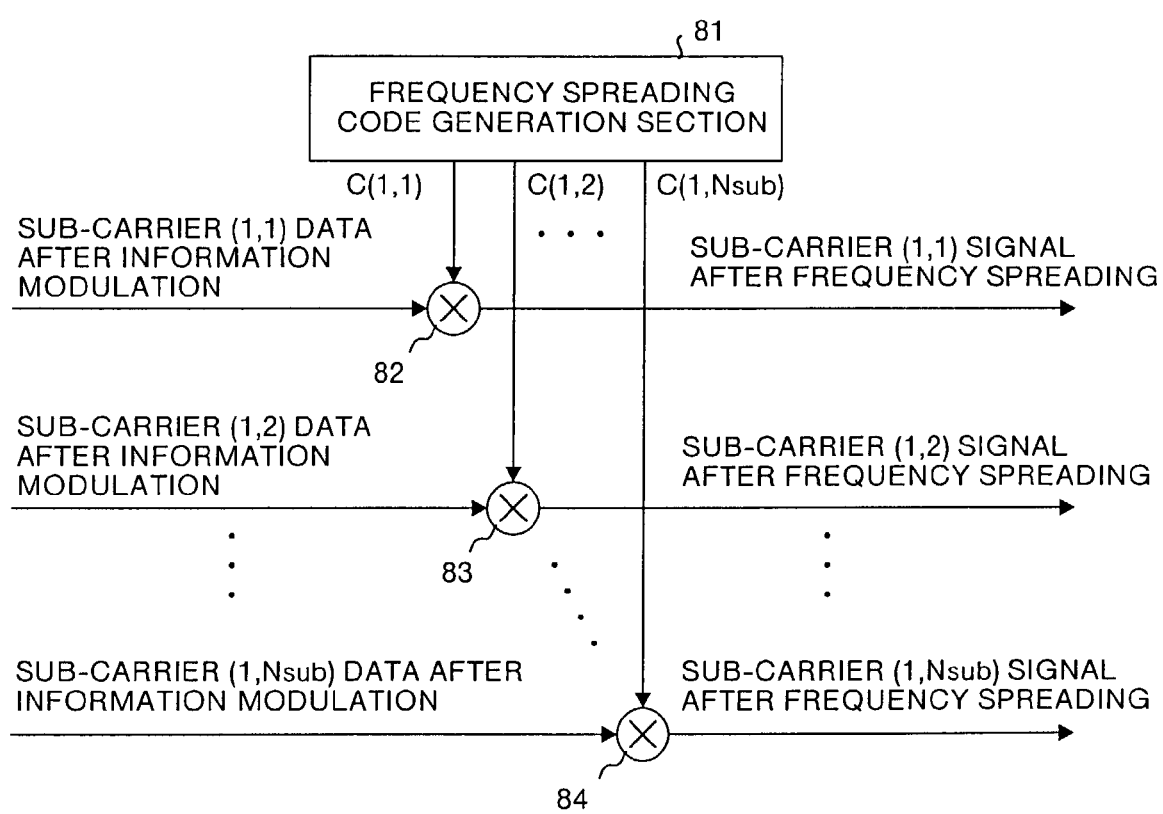
FIG. 8 is a diagram which shows the construction of a frequency spreading section.

FIG. 8 is a diagram which shows the construction of the frequency spreading section 24. In FIG. 8, reference symbol 81 denotes a frequency spreading code generation section, and 82, 83 and 84 denote multipliers. The frequency spreading section 24 uses the modulation signals by the received number of sub-carriers and frequency spreading codes, to perform frequency spreading. This frequency spreading is realized by multiplying the modulation signals for the received number of sub-carriers by frequency spreading codes C(1, 1) to C(1, Nsub) (each code is represented by ±1). As the frequency spreading code, the Walsch code, being an orthogonal code, is generally used. A sub-carrier signal after the spread modulation is output herein to the power control section 25.

Figure 9:
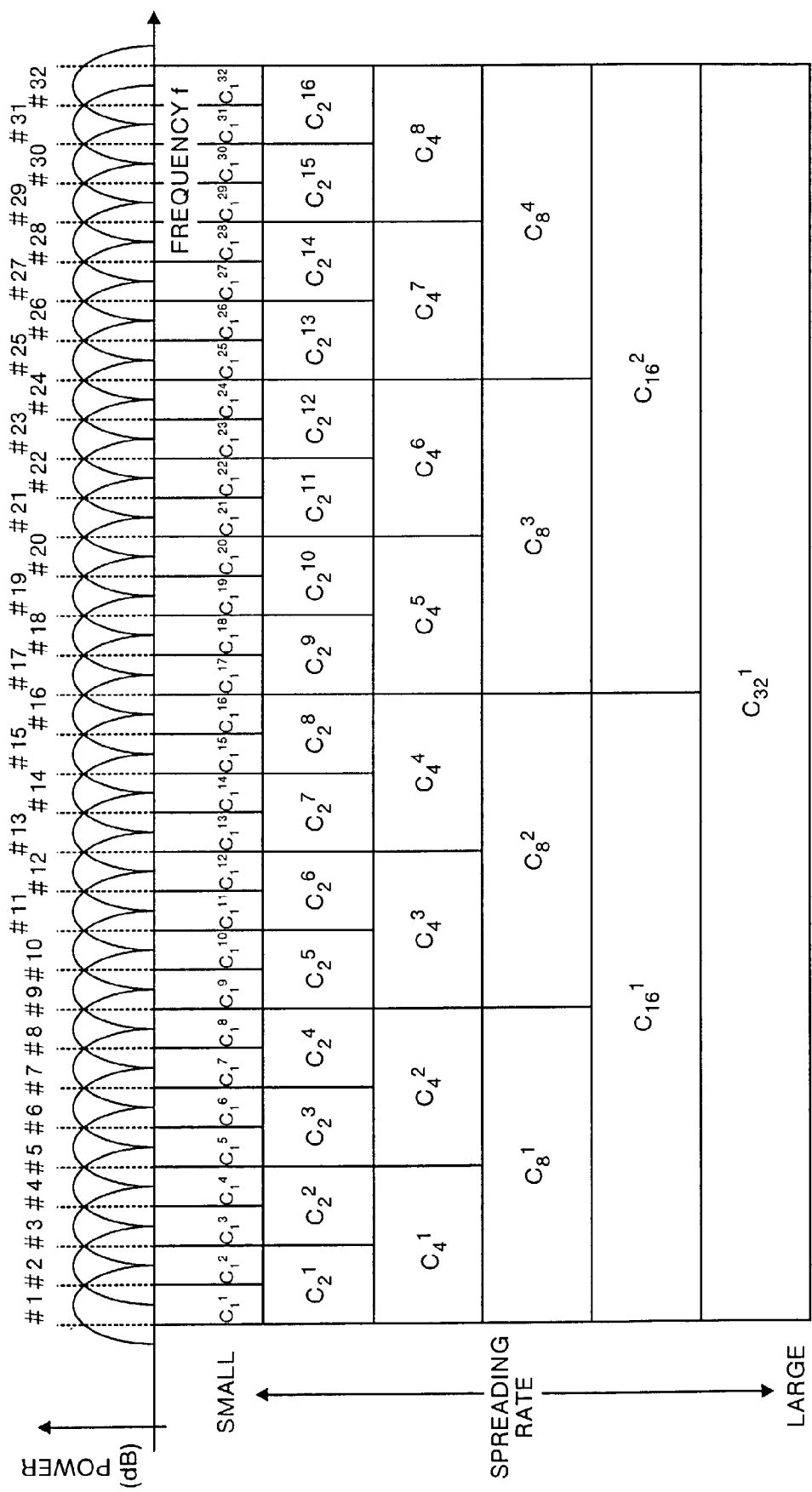
FIG. 9 is a diagram which shows the relation between a sub-carrier and a frequency spreading code group allocated for each sub-carrier.

The frequency spreading code used in this embodiment will now be explained. FIG. 9 is a diagram which shows the relation between a sub-carrier and a frequency spreading code group allocated for each sub-carrier, and FIG. 10 is a diagram which shows one example of construction of a frequency spreading code group. In FIG. 9, there is assumed that the number of all sub-carriers that can be used on the frequency axis is 32, and there is shown such a relation that as the number of frequency spreading codes increases, the spreading rate of the frequency spreading code decreases. More specifically, frequency spreading codes $C_1^1$, $C_1^2, \ldots, C_1^{32}$ represent a frequency spreading code group which the frequency spreading rate is 1 (smallest case), and is expressed as $C_1^1, C_1^2, \ldots, C_1^{32}=1$, as shown in FIG. 10(a) Frequency spreading codes $C_2^1, C_2^2, \ldots, C_2^{32}$ represent a frequency spreading code group which the frequency spreading rate is 2, and has two kinds of frequency spreading codes orthogonal to each other, such as $C_{2,1}{}^i=(1, 1)$ and $C_{2,2}{}^i=(1, 0)$, (i=1 to 16), as shown in FIG. 10(b). Frequency spreading codes $C_4^1, C_4^2, \ldots, C_4^8$ represent a frequency spreading code group in which the frequency spreading rate is 4, and has four kinds of frequency spreading codes orthogonal to each other, such as $C_{4,1}{}^j=(1, 1, 1, 1)$, $C_{4,2}{}^j=(1, 1, 0, 0)$, $C_{4,3}{}^j=(1, 0, 1, 0)$, and $C_{4,4}{}^j=(1, 0, 0, 1)$, (j=1 to 8), as shown in FIG. 10(c). Frequency spreading codes $C_8^1, C_8^2, \ldots, C_8^4$ represent a frequency spreading code group in which the frequency spreading rate is 8, and has eight kinds of frequency spreading codes orthogonal to each other, as shown in FIG. 10(d). Frequency spreading codes $C_{16}^1$ and $C_{16}^2$ represent a frequency spreading code group in which the frequency spreading rate is 16, and has 16 kinds of frequency spreading codes orthogonal to each other, as shown in FIG. 10(e). (C)' in FIG. 10(e) represents a complement of C.

As for the frequency spreading codes, the code itself is expressed by Hadamard-Walsch code, which is one of the orthogonal codes. The generation method of the frequency spreading codes can be expressed by the following equation (1), in the case of generalization.

$$C_2^n = \begin{bmatrix} C_{2,1}^n \\ C_{2,2}^n \\ C_{2,3}^n \\ C_{2,4}^n \\ \vdots \\ C_{2,2^{n-1}}^n \\ C_{2,2^n}^n \end{bmatrix} = \begin{bmatrix} C_2^{n-1}{}_{,1} & C_2^{n-1}{}_{,1} \\ C_2^{n-1}{}_{,1} & (C_2^{n-1}{}_{,1})' \\ C_2^{n-1}{}_{,2} & C_2^{n-1}{}_{,2} \\ C_2^{n-1}{}_{,2} & (C_2^{n-1}{}_{,1})' \\ \vdots & \vdots \\ C_2^{n-1}{}_{,2^{n-1}} & C_2^{n-1}{}_{,2^{n-1}} \\ C_2^{n-1}{}_{,2^{n-1}} & (C_2^{n-1}{}_{,2^{n-1}})' \end{bmatrix} \quad (1)$$

When the frequency spreading code is used at the time of frequency spreading, after each element has been converted, 1 to +1, 0 to −1, multiplication is performed with respect to the sub-carrier signal after information modulation. As is obvious from equation (1) that, in the frequency spreading code, hierarchical orthogonal relationship is established under a specific constrained condition.

Figure 11:
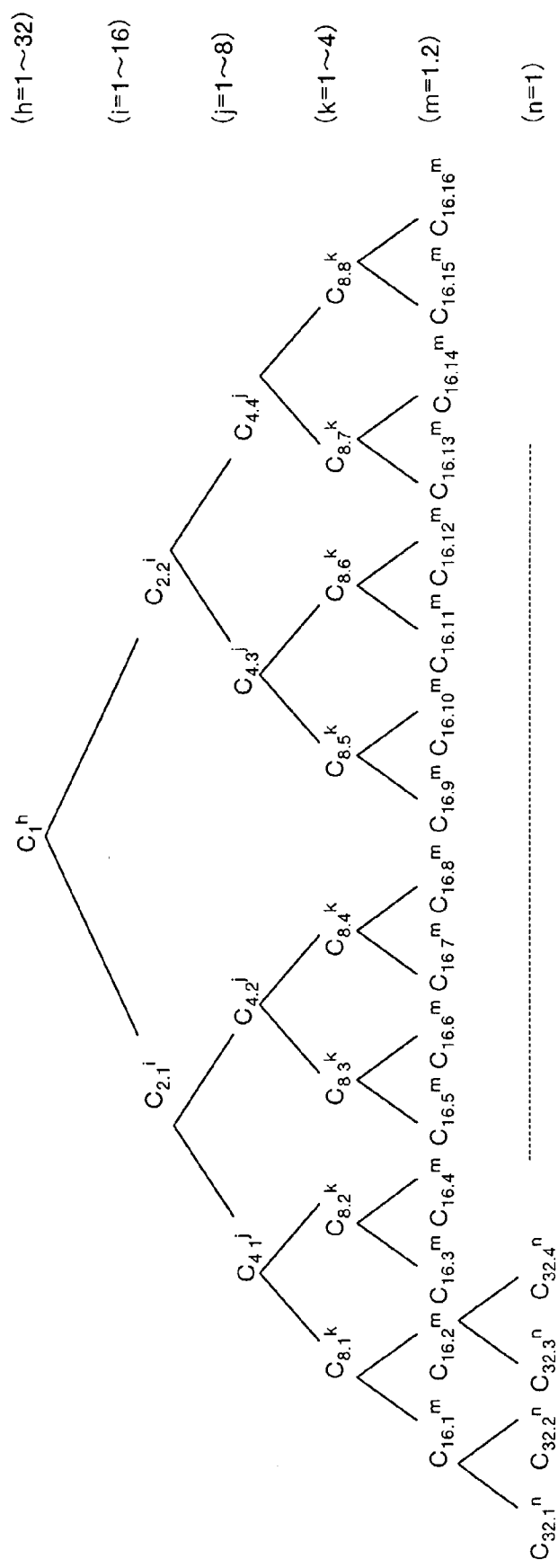
FIG. 11 is a diagram which shows the situation that the frequency spreading codes are hierarchically orthogonal to each other.

FIG. 11 is a diagram which shows the situation that the frequency spreading codes are hierarchically orthogonal to each other. The frequency spreading code in which the orthogonal condition is concluded hierarchically is used for the frequency spreading code, thereby channel data having a plurality of frequency spreading rate can be transmitted under the specific constrained condition shown in FIG. 11. When the frequency spreading rate is decreased, the number of sub-carrier groups increases, thereby enabling an increase in the transmission data speed.

Figure 12:
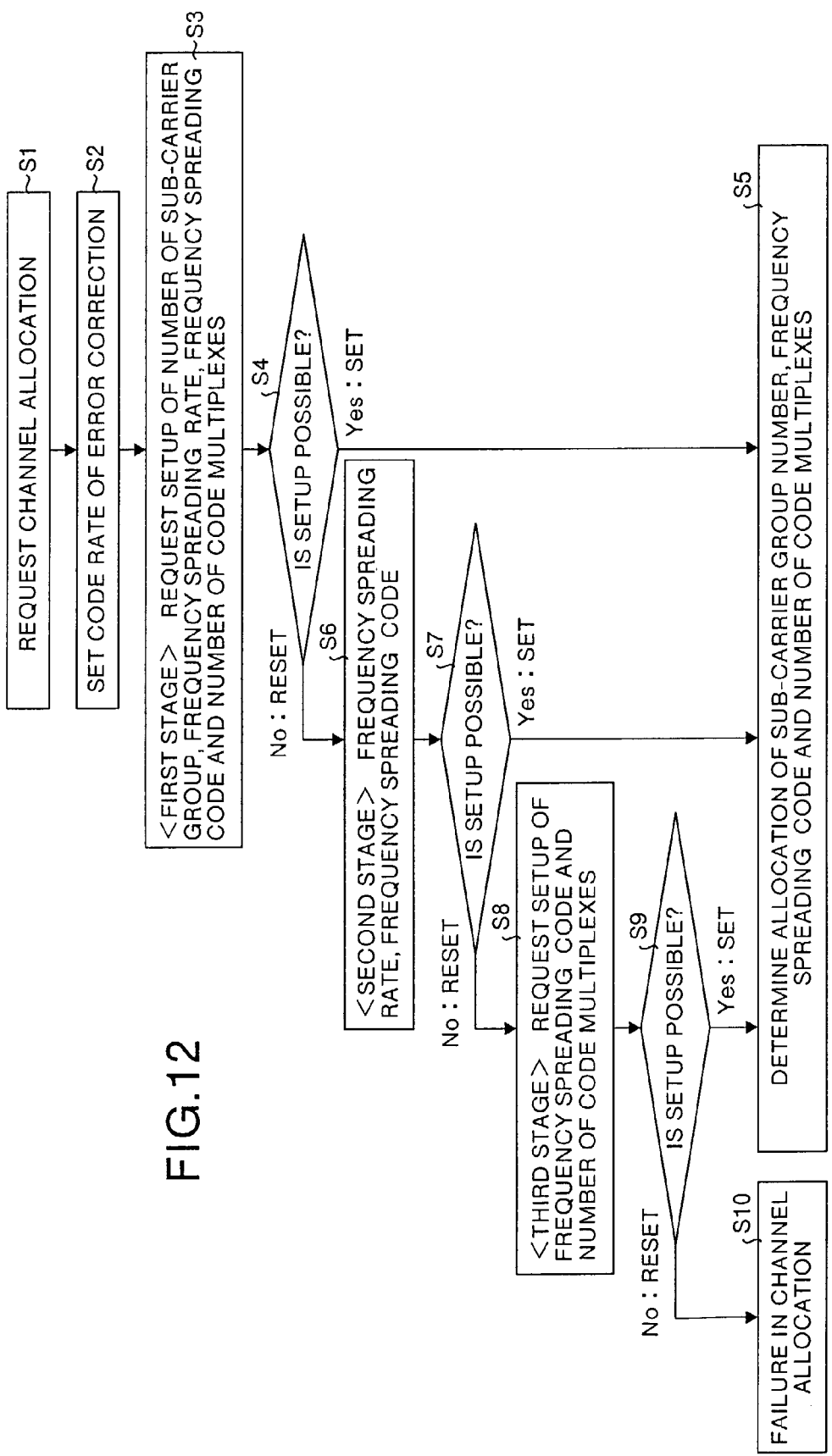
FIG. 12 is a flowchart which shows a method of allocating the frequency spreading code.

FIG. 12 is a flowchart which shows a method of allocating the frequency spreading code in the data/modulation control section 4. For example, in the mobile station, the "input signal quality information" generated by using the input signal power to interference power ratio (SIR) is inserted in the frame to be transmitted to the base station, in order to keep the required quality of the transmission data. This input signal quality information is for requesting channel allocation. Therefore, the data/modulation control section 4 having received the channel allocation request for ensuring a channel for transmission data from the mobile station (step S1) allocates a code rate based on this input signal quality information (step S2). That is, the data/modulation control section 4 sets a code rate of error correction by means of the convolutional code based on the input signal quality information. When the reception condition of the mobile station is poor based on the input signal quality information, the code rate is set small, and when the reception condition thereof is excellent, the code rate is set large.

The data/modulation control section 4 then allocates the same number of sub-carrier groups as the reciprocal of the code rate (step S3) as the first stage. For example, when the code rate is ½ and the frequency spreading rate is 4, two frequency spreading codes are selected one each from two frequency spreading code groups in the eight frequency spreading code groups $C_4^1, C_4^2, \ldots, C_4^8$ in FIG. 9. The frequency spreading code is selected so as not to be the same as the frequency spreading code occupied by another user and another channel. At this time, when the frequency spreading code can be ensured (step S4, Yes), the data/modulation control section 4 judges that setup is possible and determines allocation of the number of sub-carrier groups, the number of code multiplexes and the frequency spreading code (step S5).

On the other hand, when the frequency spreading code cannot be ensured by the setting in the first stage (step S4, No), the data/modulation control section 4 allocates the frequency spreading code, while maintaining the transmission rate of the transmission data, as the second stage, and resets the frequency spreading rate in order to increase the usable number of sub-carrier groups. The frequency spreading rate of one or a plurality of sub-carrier groups which is set to be 4 is changed to 2, to double the number of sub-carrier groups which can be used in the same band, thereby ensuring the allocatable frequency spreading code (step S6). At this time, when the frequency spreading code can be ensured (step S7, Yes), the data/modulation control section 4 judges that setup is possible and determines allocation of the number of sub-carrier groups, the number of code multiplexes and the frequency spreading code (step S5).

When the frequency spreading code cannot be ensured by the setting in the second stage (step S7, No), the data/modulation control section 4 allows to ensure a plurality of frequency spreading codes in the same sub-carrier group having the frequency spreading rate of 4, as the third stage, and sets a frequency spreading code for multiplexing in the same, sub-carrier group (step S8). At this time, when the frequency spreading code can be ensured (step S9, Yes), the data/modulation control section 4 judges that setup is possible and determines allocation of the number of sub-carrier groups, the number of code multiplexes and the frequency spreading code (step S5). On the other hand, if the frequency spreading code cannot be ensured (step S9, No), the data/modulation control section 4 has failed in channel allocation (step S10). In the allocation method of the frequency spreading code described above, the number of code multiplexes in the first stage is set to be 1, but the number of code multiplexes may be set to be one or larger from the first stage.

The frequency spreading code set in this manner is transmitted as the information notified to the mobile station by means of the frame information (1) to (Nslot) in FIG. 3.

Figure 13:
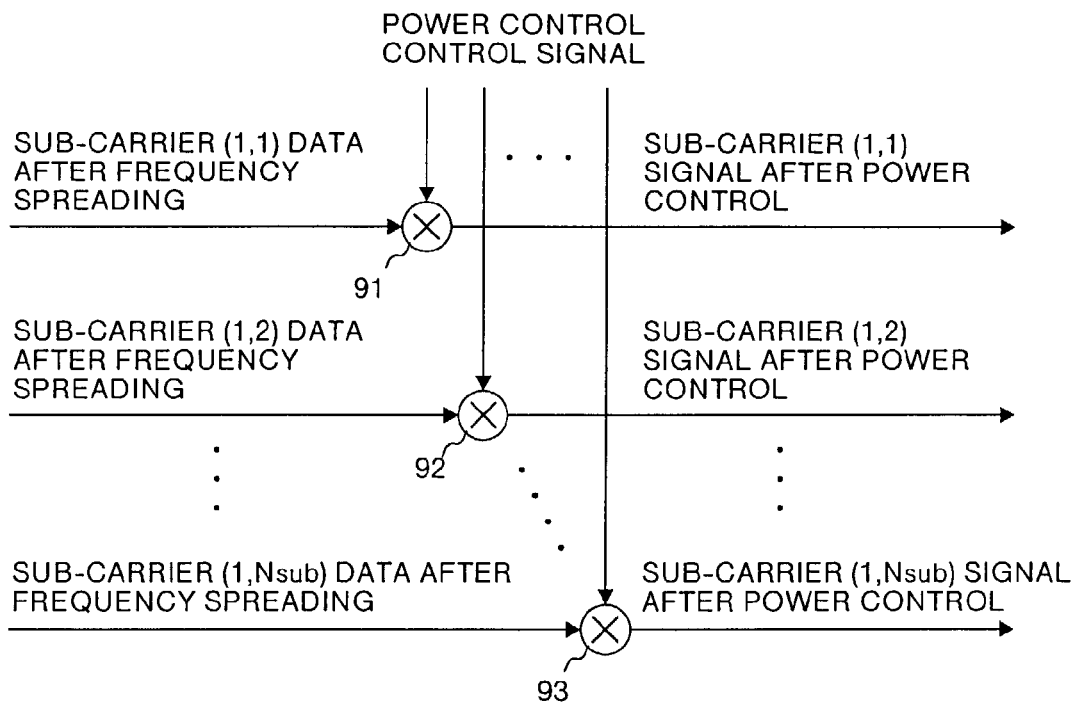
FIG. 13 is a diagram which shows the construction of a power control section.

FIG. 13 is a diagram which shows the construction of the power control section 25. In FIG. 13, reference symbols 91, 92, . . . , 93 denote multipliers. The power control section 25 uses these multipliers 91, 92, 93 to multiply the power control signal for each sub-carrier group transmitted from the power control control section 5 by the sub-carrier signals (1, 1) to (1, Nsub) after frequency spreading, to thereby control the amplification level of each sub-carrier signal. The power control control section 5 generates a power control control signal based on the input signal quality information inserted in the frame transmitted from the mobile station. The details of the generation method of input signal quality information will be explained later.

The multiplexing section 9a multiplexes the received sub-carrier signals (1, 1) to (1, Nsub) after power control in the first channel, and the received sub-carrier signals (1, 1) to (1, Nsub) after power control in the second to the M-th channels, respectively, to thereby generate multiplexed signals with respect to the plurality of terminals. These multiplexed signals are then output to the time spreading section 11a.

Figure 14:
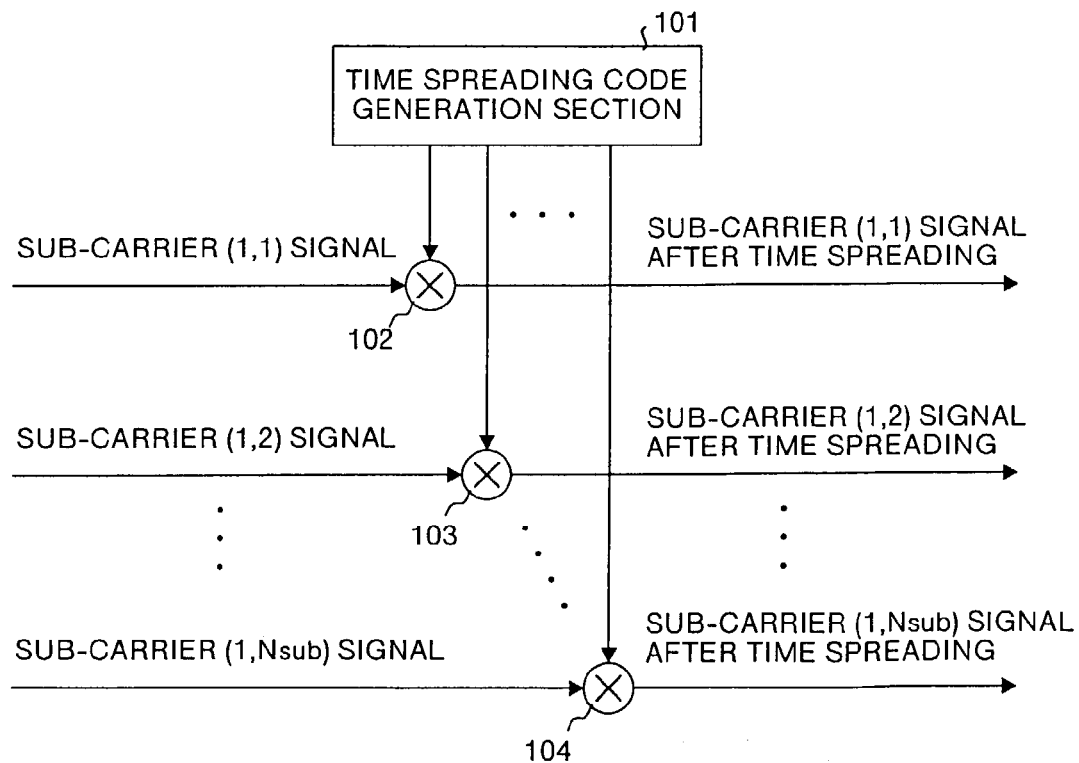
FIG. 14 is a diagram which shows the construction of a time spreading section.

FIG. 14 is a diagram which shows the construction of the time spreading section 10a. In FIG. 14, reference symbol 101 denotes a time spreading code generation section, and 102, 103 and 104 denote multipliers. The time spreading section 10a multiplies the time spreading code identical between sub-carriers transmitted from the time spreading code generation section 101 by the multiplexed signal, using the multipliers 102, 103 and 104, respectively, to thereby perform time spreading for each sub-carrier. As for the time spreading code, it is assumed that a peculiar code is allocated for each area to which the base station is going to transmit, and the one having an excellent correlation characteristic such as PN sequence is used. The area referred to herein is a sector generally used in communication, or a transmission beam formed at the time of transmission from the base station, which can be spatially separated.

The inverse Fourier transform section 11 uses sub-carrier signals for the number of Nscg×Nsub, obtained in the time spreading sections 10a, 10b and 10c, to perform inverse Fourier transform processing. The inverse Fourier transform section 11 then outputs a signal after inverse Fourier transform to the frequency transform section 12. The inverse Fourier transform section 11 has the number of inputs which makes it possible to perform the inverse Fourier transform processing with respect to the total number of sub-carriers on the preset frequency band.

Figure 15:
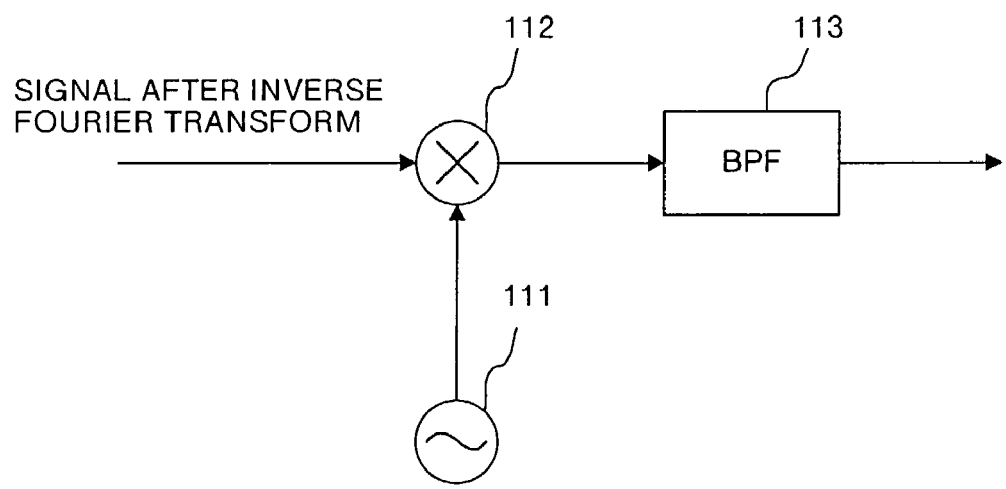
FIG. 15 is a diagram which shows the construction of a frequency transform section.

FIG. 15 is a diagram which shows the construction of the frequency transform section 12. In FIG. 15, reference symbol 111 denotes a frequency oscillator, 112 denotes a multiplier, and 113 denotes a band-pass filter. The frequency transform section 12 multiplies the signal after inverse Fourier transform by a carrier signal in the output of the frequency oscillator 111, and performs bandwidth limiting, using the band-pass filter 113, to there by generate a transmission signal. The frequency transform section 12 then outputs the transmission signal onto the transmission line via the antenna 13.

Figure 16:
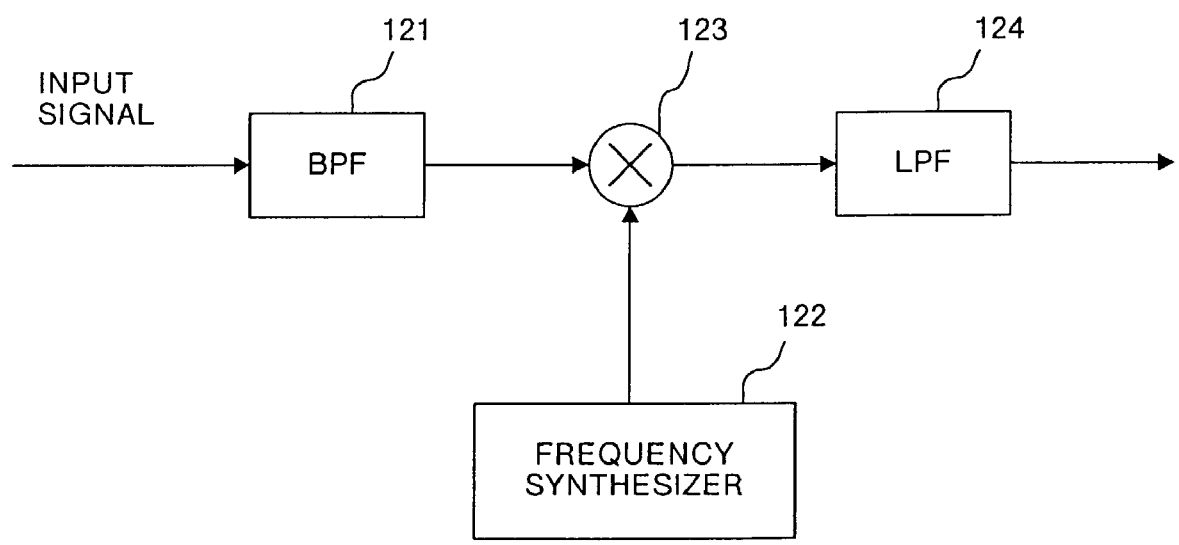
FIG. 16 is a diagram which shows the construction of a frequency transform section.

The operation of the receiver will now be explained. At first, in the receiver, the frequency transform section 32 receives the transmission signal affected by frequency selective fading or the like, via the antenna 31. FIG. 16 is a diagram which shows the construction of the frequency transform section 32. In FIG. 16, reference symbol 121 denotes a band-pass filter, 122 denotes a frequency synthesizer, 123 denotes a multiplier, and 124 denotes a low-pass filter. The frequency transform section 32 performs bandwidth limiting by means of the band-pass filter 121 with respect to the input signal, and then multiplies the signal after bandwidth limiting by a signal synchronous to the carrier frequency output from the frequency synthesizer 122. The multiplied signal is output as a signal after frequency translation, with only the low frequency component being wave-filtered by the low-pass filter 124.

The Fourier transform section 33 performs Fourier transform processing with respect to the received signal after waveform shaping, and outputs sub-carrier signals for the number of Nscg×Nsub to the sub-carrier selection section 34. The Fourier transform section 33 has the number of outputs which makes it possible to perform the Fourier transform processing with respect to the total number of sub-carriers on the preset frequency band.

The sub-carrier selection section 34 selects a sub-carrier signal in a sub-carrier group to be used for demodulation from all sub-carrier signals. Selection of the sub-carrier signal is performed based on the information of the number of sub-carrier groups Nscg, the frequency spreading rate Nsub and the frequency spreading code transmitted from the data/modulation control section 4. The selection result by the sub-carrier selection section 34 is output to the time despreading sections 35a, 35b and 35c.

Figure 17:
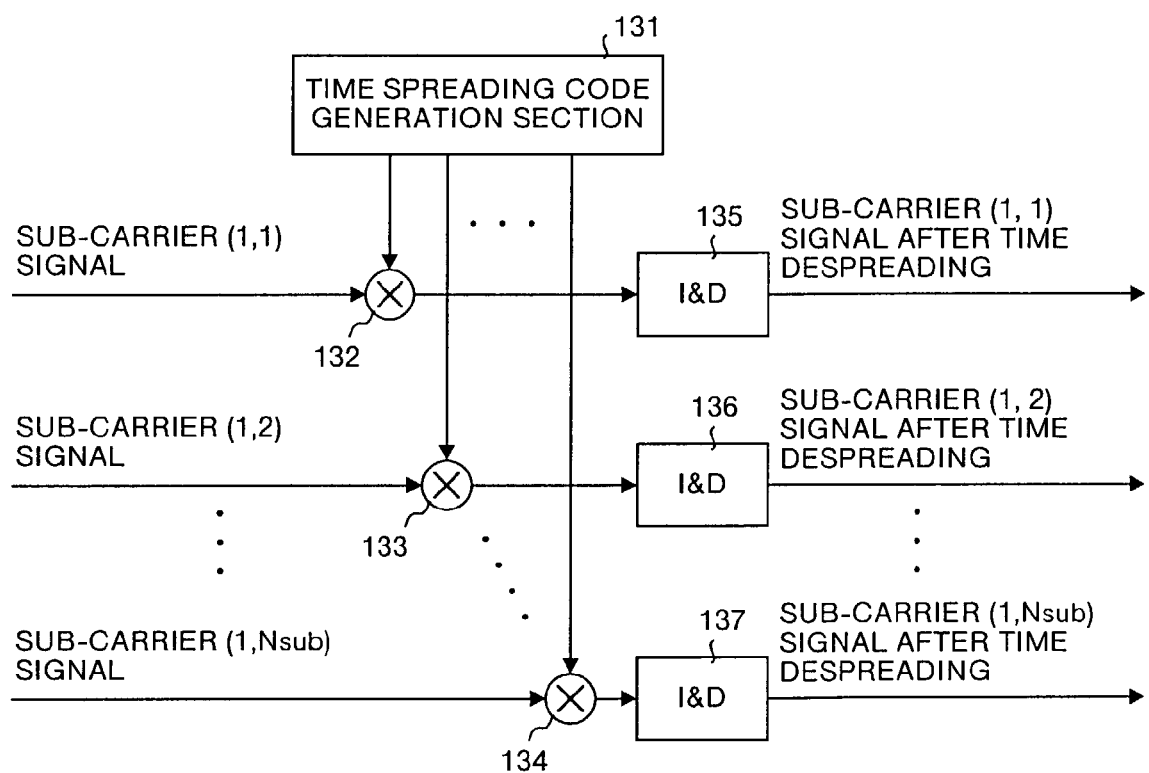
FIG. 17 is a diagram which shows the construction of a time despreading section.

FIG. 17 is a diagram which shows the construction of the time despreading sections 35a, 35b and 35c. In FIG. 17, reference symbol 131 denotes a time spreading code generation section, 132, 133 and 134 denote multipliers, and 135, 136 and 137 denote integrate & dump ("I & D") sections. Each time despreading section provided for each sub-carrier group has the same construction and perform similar operation. Hence, only the operation of the time despreading section 35*a* in the first sub-carrier group will be explained herein. The time despreading section 35*a* multiplies Nsub sub-carrier signals in the first sub-carrier group by the time spreading code individually generated in the time spreading code generation section 131. At this time, the time spreading code takes a value of ±1. After multiplication, each I & D integrates the outputs of multipliers for each sub-carrier, respectively, by a symbol period, to thereby generate sub-carrier signals (1, 1) to (1, Nsub) after the time despreading, while clearing the integral value. The sub-carrier signals after the time despreading are then output to the sub-carrier group demodulation processing sections 36*a* to 38*a* for the number of M code multiplexes. The information indicating that the number of code multiplexes is M is transmitted from the data/demodulation control section 34.

The sub-carrier signals (1, 1) to (1, Nsub) after the time despreading are changed to multi-path waves due to the influence of delayed waves on the transmission line. For example, if the multi-path waves can be separated into P paths by the time despreading, the demodulation processing is performed in a unit of each path demodulation processing section 51, 52, 53 for the number of P. The each path demodulation processing section performs the same demodulation processing, respectively. Hence, only the operation of the each path demodulation section 51 with respect to the first path will be explained herein, and explanation for the operation of other each path demodulation processing sections with respect to the second to the P-th path is omitted.

At first, the frequency despreading section 54 multiplies sub-carrier signals (1, 1) to (1, Nsub) for the first path by the frequency spreading code, to thereby perform frequency despreading. The sub-carrier signals (1, 1) to (1, Nsub) after the frequency despreading are output to the synchronization detector 55. The frequency spreading code is set by the data/demodulation control section 34.

Figure 18:
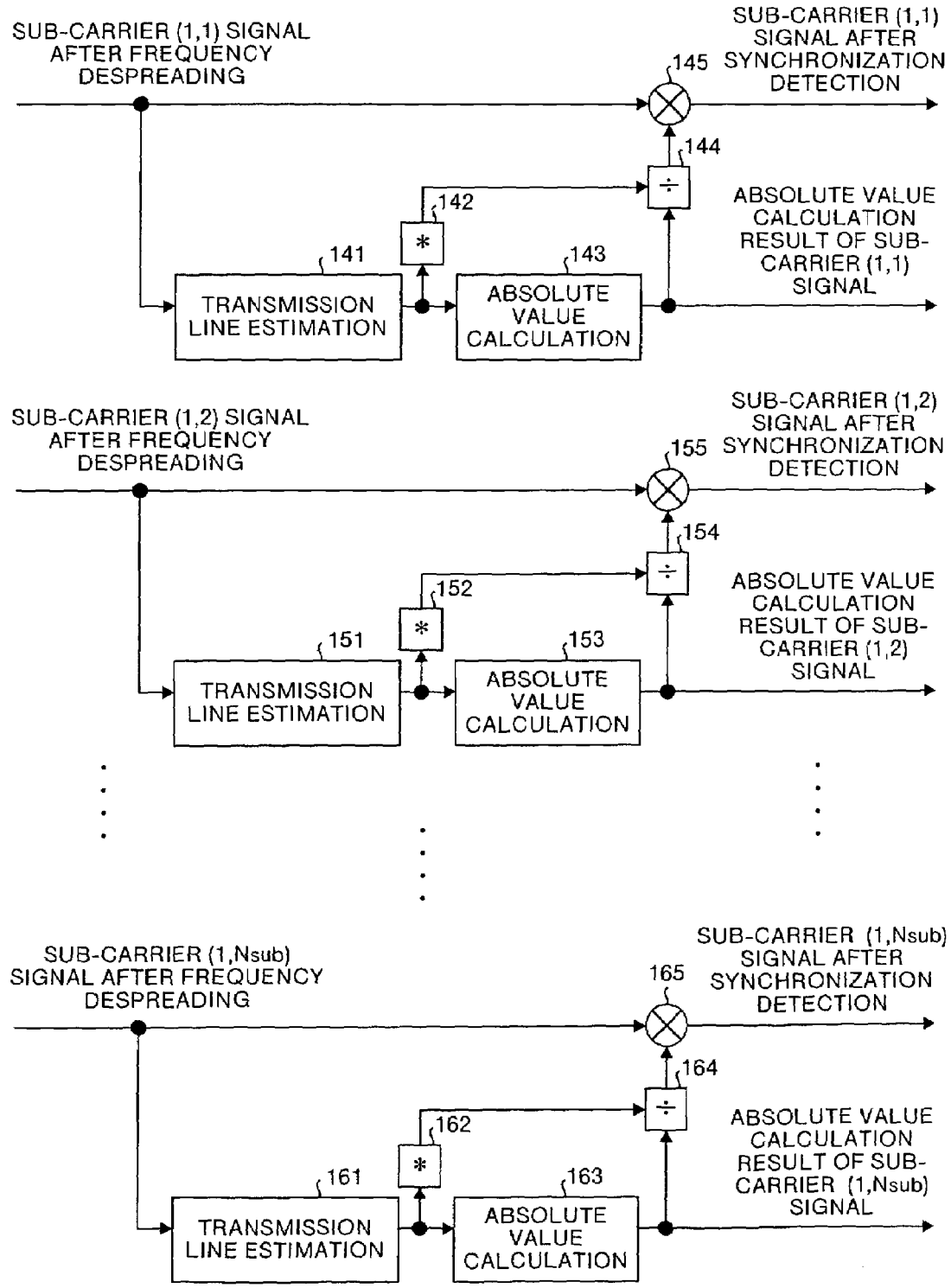
FIG. 18 is a diagram which shows the construction of a synchronization detector.

FIG. 18 is a diagram which shows the construction of the synchronization detector 55. In FIG. 18, reference symbols 141, 151 and 161 denote transmission line estimation sections, 143, 153 and 163 denote absolute value calculation sections, 144, 154 and 164 denote analog dividers, and 145, 155 and 165 denote multipliers. The synchronization detector 55 receives sub-carrier signals (1, 1) to (1, Nsub) after the frequency despreading, and performs synchronization detection, using the known sequence added for each slot in the frame. The synchronization detector outputs the sub-carrier signals (1, 1) to (1, Nsub) after synchronization detection and the absolute value calculation result of the sub-carrier signals (1, 1) to (1, Nsub) to the combining section 56.

The transmission line estimation sections 141, 151 and 161 synchronously adds the known sequence symbols for the number of Npilot's added for each slot in the frame, to calculate the transmission line estimate value individually. These transmission line estimation results are then output to the complex conjugate calculation sections 142, 152 and 162, and the absolute value calculation sections 143, 153 and 163, respectively. Each complex conjugate calculation section calculates the complex conjugate of the transmission line estimation result, respectively, and each absolute value calculation section calculates the absolute value of the transmission line estimation result, respectively. The analog dividers 144, 154 and 164 divide the individually received complex conjugate by the corresponding absolute value, to extract a phase component necessary for performing synchronization detection for each sub-carrier. The multipliers 145, 155 and 165 then multiply the sub-carrier signals (1, 1) to (1, Nsub) after the frequency despreading by the phase component.

Figure 19:
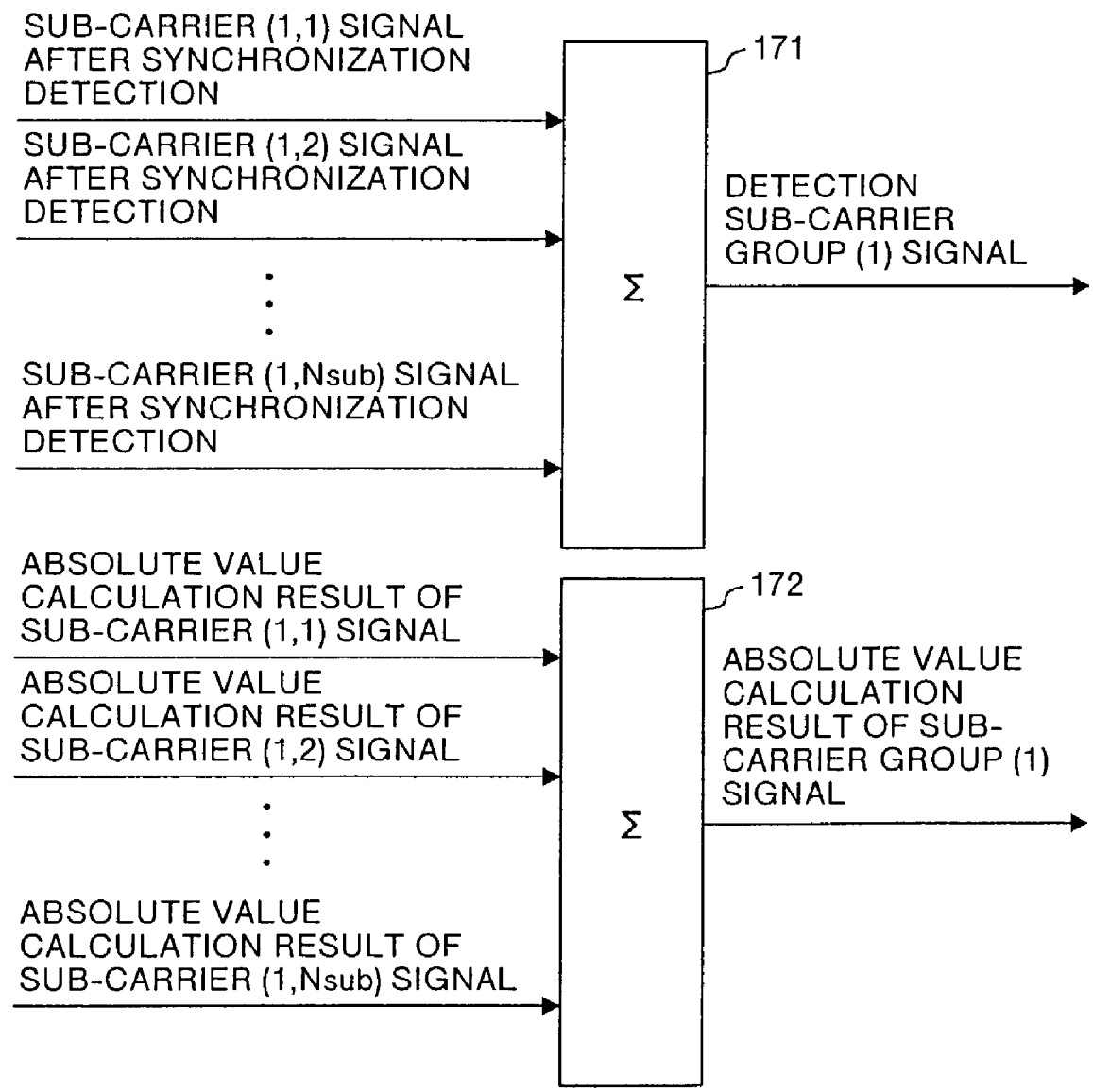
FIG. 19 is a diagram which shows the construction of a combining section.

FIG. 19 is a diagram which shows the construction of the combining section 56. In FIG. 19, reference symbols 171 and 172 denote adders. In the combining section 56, the adder 171 adds all sub-carrier signals (1, 1) to (1, Nsub) after synchronization detection, to calculate a sub-carrier group (1) signal corresponding to the first path. On the other hand, the adder 172 adds all absolute value calculation results of each sub-carrier signal, to calculate the absolute value of the sub-carrier group (1) signal corresponding to the first path. Thereafter, the sub-carrier group (1) signal corresponding to the first path and the absolute value calculation result of the sub-carrier group (1) signal corresponding to the first path are output to the path combining section 57, together with the output of the each path demodulation processing section corresponding to other (P-1) paths.

Figure 20:
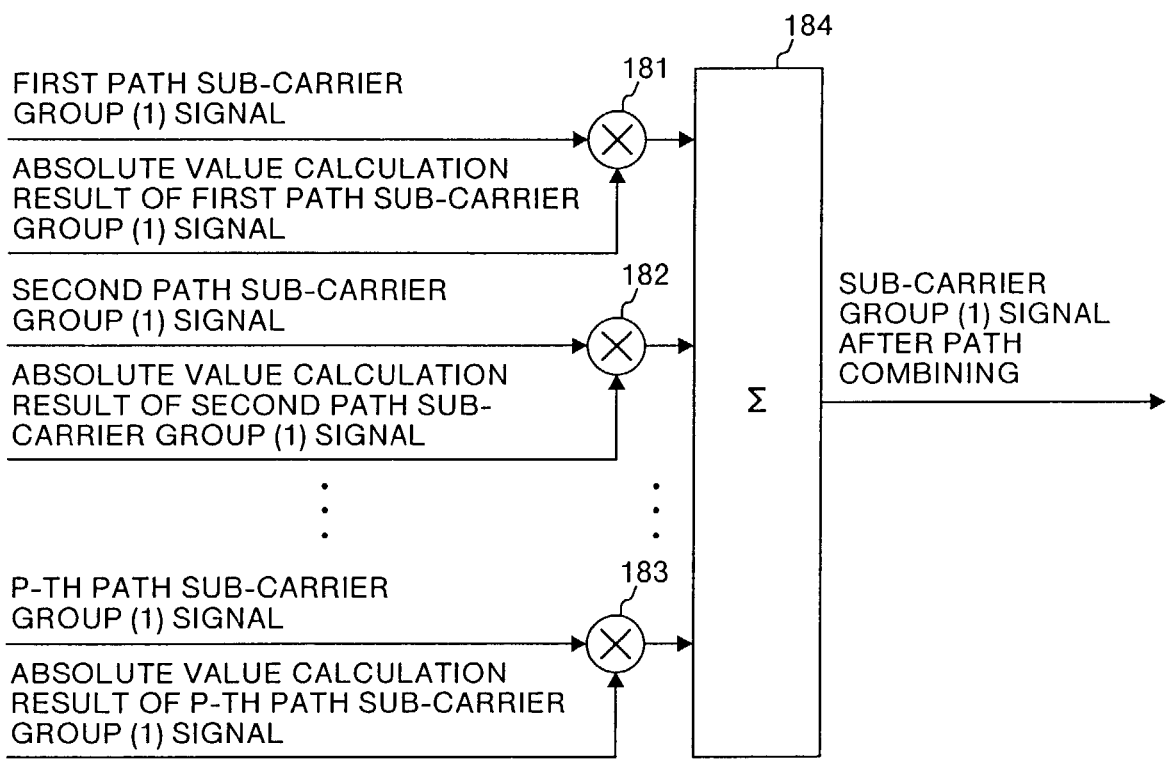
FIG. 20 is a diagram which shows the construction of a path combining section.

FIG. 20 is a diagram which shows the construction of the path combining section 57. In FIG. 20, reference symbols 181, 182 and 183 denote multipliers, and 184 denotes an adder. The path combining section 57 multiplies the sub-carrier group (1) signal corresponding to P paths by the absolute value calculation result of the sub-carrier group (1) signal corresponding to the first path. The adder 184 then adds P multiplication results, and outputs the sub-carrier group (1) signal after path combining. The output of the path combining section 57 becomes the output of the sub-carrier group demodulation processing section 36*a* corresponding to the first channel in the first sub-carrier group, and is output to the P/S 39 together with the outputs of the sub-carrier group demodulation processing sections 37*a* and 38*a* corresponding to the other second to M-th channels in the first sub-carrier group. Similarly, the outputs of the sub-carrier group demodulation processing sections corresponding to the second to the M-th channels in the second to the Nscg-th sub-carrier groups are output to the P/S 39.

Figure 21:
FIG. 21 is a diagram which shows the construction of a deinterleaver.

The P/S 39 receives the sub-carrier group signals from all the sub-carrier group demodulation processing sections, and converts these signals to serial signals. Thereafter, these serial signals are written in the lateral direction in the deinterleaver 41 having blocks with a longitudinal size of Nr (where Nr is a predetermined integer) and a lateral size of Nc (where Nc is a predetermined integer), and read out in the longitudinal direction, as shown in FIG. 21. The Viterbi decoder 42 performs known Viterbi decoding with respect to the received rearranged signal, based on the set-point signal having a code rate transmitted from the data/demodulation control section 43.

The output of the P/S 39 is input to the data/demodulation control section 43, and the data/demodulation control section 43 judges the frame information portion in FIG. 3 from the output of the P/S 39 to thereby obtain the frame information. The data/demodulation control section 43 then extracts, from the frame information, the code rate necessary for decoding control, the number of sub-carrier groups Nscg, the frequency spreading rate Nsub, the frequency spreading code and the number of code multiplexes on the frequency axis as the information. This information is output as the information for setting the sub-carrier selection section 34, the first, the second to the Nscg-th sub-carrier group demodulation processing sections 36*a* to 38*a* and the Viterbi decoder 42.

Finally, the operation of the input signal quality information generation section 40 will be explained. The input signal quality information generation section 40 extracts a signal corresponding to the known sequence portion in the frame in the sub-carrier signal, from each of the P path demodulation processing sections in all the sub-carrier group demodulation processing sections. Further, the input signal quality information generation section 40 calculates an input signal power to interference power ratio (SIR) for each sub-carrier, using the signal of the known sequence portion. The obtained input signal power to interference power ratio is synthesized for each sub-carrier group and between all channels, paths and sub-carriers. The SIR for each sub-carrier group is compared with the target SIR set as a reference value which can maintain the input signal quality, based on the frame information (1) to (Nslot) from the base station, respectively. At this time, when the SIR for each sub-carrier group is larger than the target SIR, it is judged as "1", and when the SIR for each sub-carrier group is smaller than the target SIR, it is judged as "0". This judgment result is inserted in the transmission frame to be transmitted from the mobile station to the base station, so as to be notified to the base station, and be used for generating a power control control signal in the power control control section 5.

In this embodiment, the construction and the operation in which M channels are multiplexed for each sub-carrier group have been explained. However, it is not always necessary that the number of channel multiplexes in all sub-carrier groups is M, and a different number of channel multiplexes may be used for each sub-carrier group.

As described above, in this embodiment, even if the transmission signal from the base station is affected by frequency selective fading on the transmission line, and the expanse of the delayed wave is large, spreading in the time direction is effected by allocating a spreading code, together with spreading in the frequency direction. Further, path diversity in which paths are separated by using the path cracking ability of the delayed wave to effectively utilize the delayed wave is used. Therefore, the input signal quality (input signal power to interference power ratio (SIR)) can be increased. Further, influence of interference in the symbol can be suppressed, and excellent bit error rate characteristic can be obtained.

After synchronization detection, in which phase compensation is performed for each sub-carrier signal has been performed using a known pilot sequence, path combining is performed according to the signal level of the sub-carrier signal in the sub-carrier group. Therefore, path diversity combining according to the input signal quality of each sub-carrier signal can be performed.

Channels are allocated according to the information transmission speed and code rate, the number of sub-carrier groups and the number of sub-carriers in the sub-carrier group are made variable depending on the information transmission speed, and the frequency spreading code is hierarchically allocated for each sub-carrier group. Therefore, the frequency spreading rate is made variable, while maintaining the state that the frequency spreading code allocated for each user or for each channel to be used is orthogonal to each other. Thereby, the frequency efficiency can be increased.

At the time of reception, spreading is performed both in the frequency direction and the time direction, and spreading codes different in sectors or cells can be used. As a result, soft hand-over can be executed between sectors or cells, without interrupting the communication and without changing the frequency used on the transmission line.

Even when the degree of influence of frequency selective fading differs largely in each sub-carrier, the transmission power control information inserted in the frame is used to control the transmission signal power on the base station side, so that the input signal quality becomes the same in each sub-carrier group. As a result, the input signal quality can be kept constant in each sub-carrier group, while reducing the interference quantity.

Second Embodiment:

A multi-carrier CDMA communication apparatus in the second embodiment has the same construction as that in the first embodiment, with the exception that the relation between the sub-carrier and the frequency spreading code arranged on the frequency axis is different. Only the portion different from that of the first embodiment will be explained herein.

Figure 22:
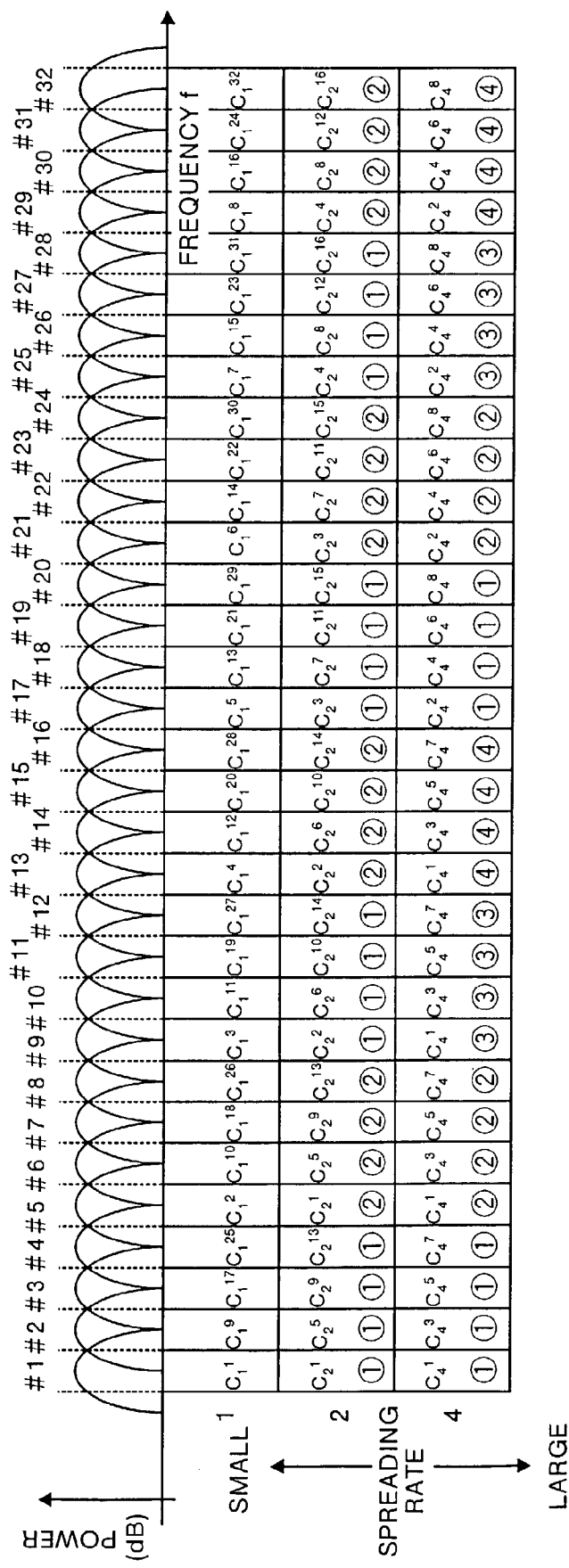
FIG. 22 is a diagram which shows the relation between a sub-carrier and a frequency spreading code group in a second embodiment.

FIG. 22 is a diagram which shows the relation between a sub-carrier and a frequency spreading code group allocated for each sub-carrier. In this second embodiment, differing from the first embodiment, the frequency spreading code is allocated, with a certain frequency interval (sub-carrier interval), while keeping the orthogonality and hierarchical relationship between the frequency spreading codes. Sequence elements shown in FIG. 10 are periodically allocated, while keeping the orthogonality and hierarchical relationship between the frequency spreading codes shown in FIG. 9.

Thus, in the second embodiment, the same effects as those of the first embodiment can be obtained, and further, since the frequency spreading code is allocated, with a certain frequency interval (sub-carrier interval), even if the sub-carrier signal power drops due to the frequency selective fading, a drop of the signal power in each sub-carrier group can be suppressed, thereby enabling an increase of the frequency diversity effect.

In the above example, the frequency interval is made constant, but the present invention is not limited thereto. For example, two different time intervals may be used alternately, or three different time intervals may be used in an order determined beforehand.

Third Embodiment

A multi-carrier CDMA communication apparatus in the third embodiment has the same construction as that of the first embodiment, with the exception that the internal construction and the operation of the synchronization detector 55, the combining section 56 and the path combining section 57 of the receiver are different. Only the portion different from that of the first embodiment will be explained herein.

Figure 23:
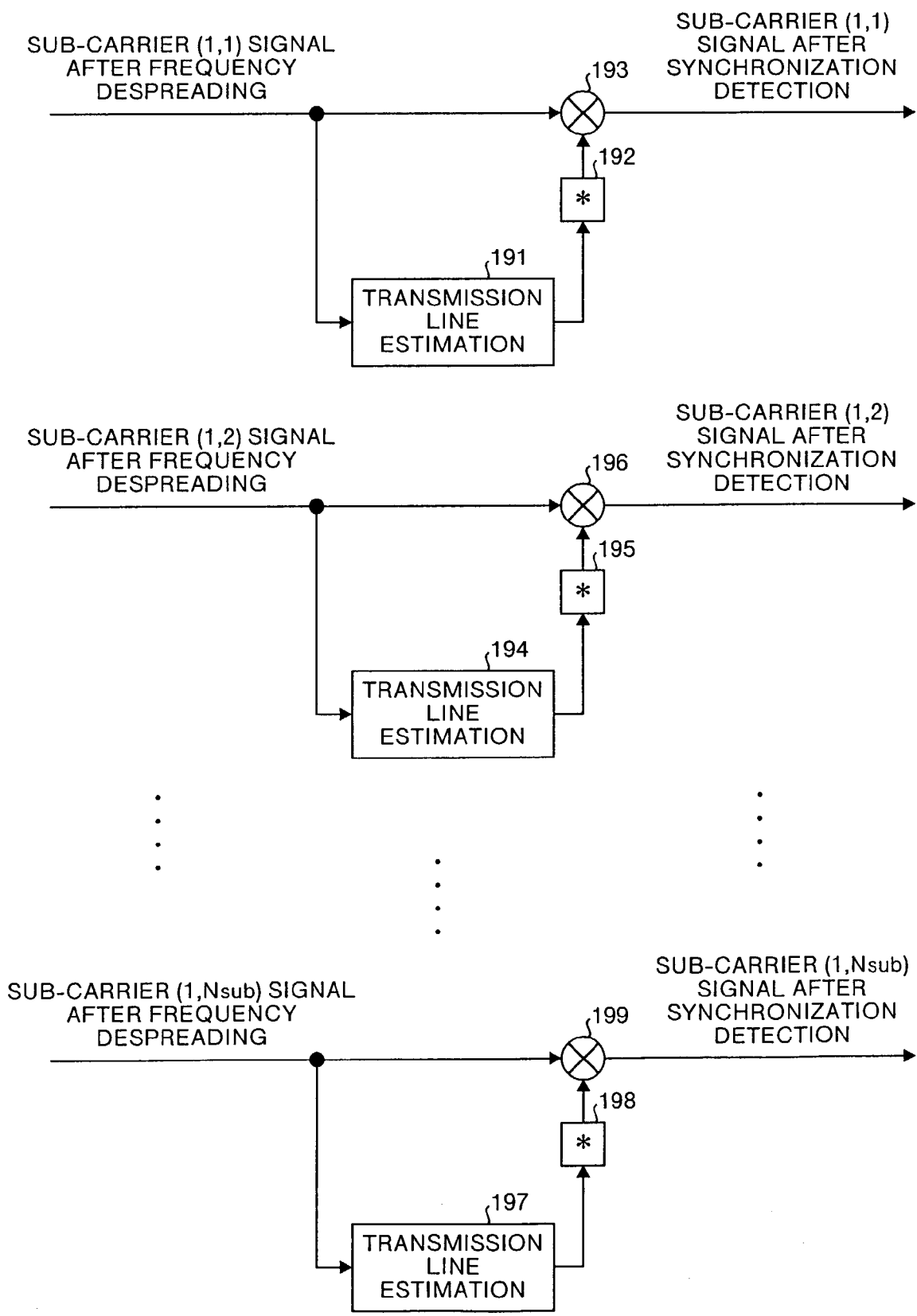
FIG. 23 is a diagram which shows the construction of a synchronization detector in a third embodiment.

FIG. 23 is a diagram which shows the construction of the synchronization detector 55 in the third embodiment. In FIG. 23, reference symbols 191, 194 and 197 denote transmission line estimation sections, 192, 195 and 198 denote complex conjugate calculation sections, and 193, 196 and 199 denote multipliers. The synchronization detector 55 receives sub-carrier signals (1, 1) to (1, Nsub) after the inverse spreading, and performs synchronization detection, using the known sequence added for each slot in the frame. The synchronization detector 55 outputs the sub-carrier signals (1, 1) to (1, Nsub) after synchronization detection to the combining section 56.

Specifically, the transmission line estimation sections 191, 194 and 197 synchronously adds the known sequence symbols for the number of Npilot's added for each slot in the frame, to calculate the transmission line estimate value individually. These transmission line estimation results are then output to the complex conjugate calculation sections 192, 195 and 198, respectively. Each complex conjugate calculation section calculates the complex conjugate of the transmission line estimation result, respectively. The multipliers 193, 196 and 199 then multiply the sub-carrier signals (1, 1) to (1, Nsub) after the frequency despreading by the complex conjugate. This multiplication result is herein output to the combining section 56 as the sub-carrier signal output of the synchronization detector 55.

Figure 24:
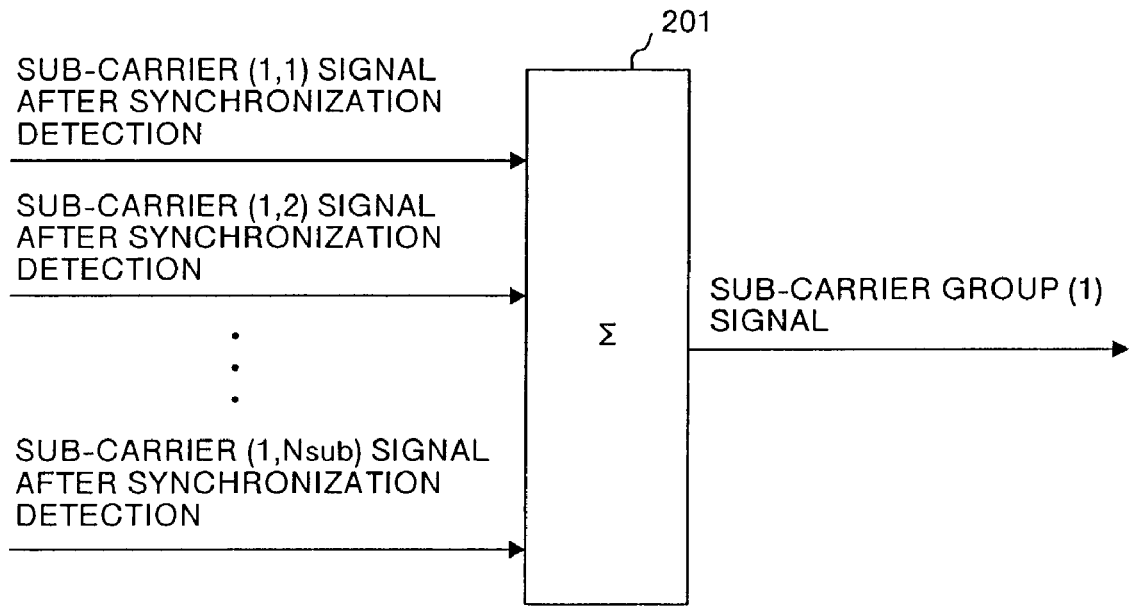
FIG. 24 is a diagram which shows the construction of a combining section in the third embodiment.

FIG. 24 is a diagram which shows the construction of the combining section 56 in the third embodiment. In FIG. 24, reference symbol 201 denotes an adder. In the combining section 56, the adder 201 adds all sub-carrier signals (1, 1) to (1, Nsub) after synchronization detection, to calculate a sub-carrier group (1) signal corresponding to the first path. Thereafter, the sub-carrier group (1) signal corresponding to the first path is output to the path combining section 57, together with the output of the each path demodulation processing section corresponding to other (P-1) paths.

Figure 25:
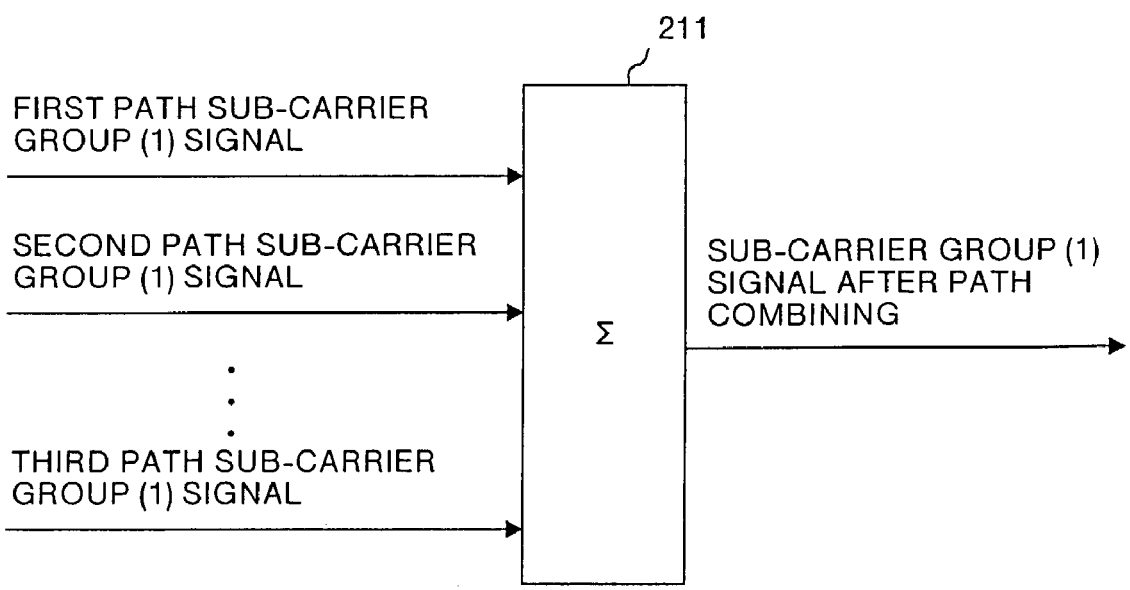
FIG. 25 is a diagram which shows the construction of a path combining section in the third embodiment.

FIG. 25 is a diagram which shows the construction of the path combining section 57 in the third embodiment. In FIG. 25, reference symbol 211 denotes an adder. In the path combining section 57, the adder 211 adds the sub-carrier group (1) signals corresponding to P paths and outputs the sub-carrier group (1) signal after path combining. The output of the path combining section 57 becomes the output of the sub-carrier group demodulation processing section 36a corresponding to the first channel in the first sub-carrier group, and is output to the P/S 39 together with the outputs of the sub-carrier group demodulation processing sections 37a and 38a corresponding to the other second to M-th channels in the first sub-carrier group. At the same time, the outputs of the sub-carrier group demodulation processing sections corresponding to the second to the M-th channels in the second to the Nscg-th sub-carrier groups are output to the P/S 39.

Thus, in the third embodiment, the same effects as those of the first embodiment can be obtained, and further, since the synthesizing processing of the sub-carrier signals in the sub-carrier group and the path combining are performed, after performing the synchronization detection based on the transmission line estimate value estimated by the known pilot sequence for each sub-carrier signal, path diversity combining corresponding to the input signal quality of each sub-carrier signal can be performed.

Fourth Embodiment

A multi-carrier CDMA communication apparatus in the fourth embodiment has the same construction as that of the first embodiment, with the exception that the internal construction and the operation of the synchronization detector 55 of the receiver are different. Only the portion different from that of the first embodiment will be explained herein.

Figure 26:
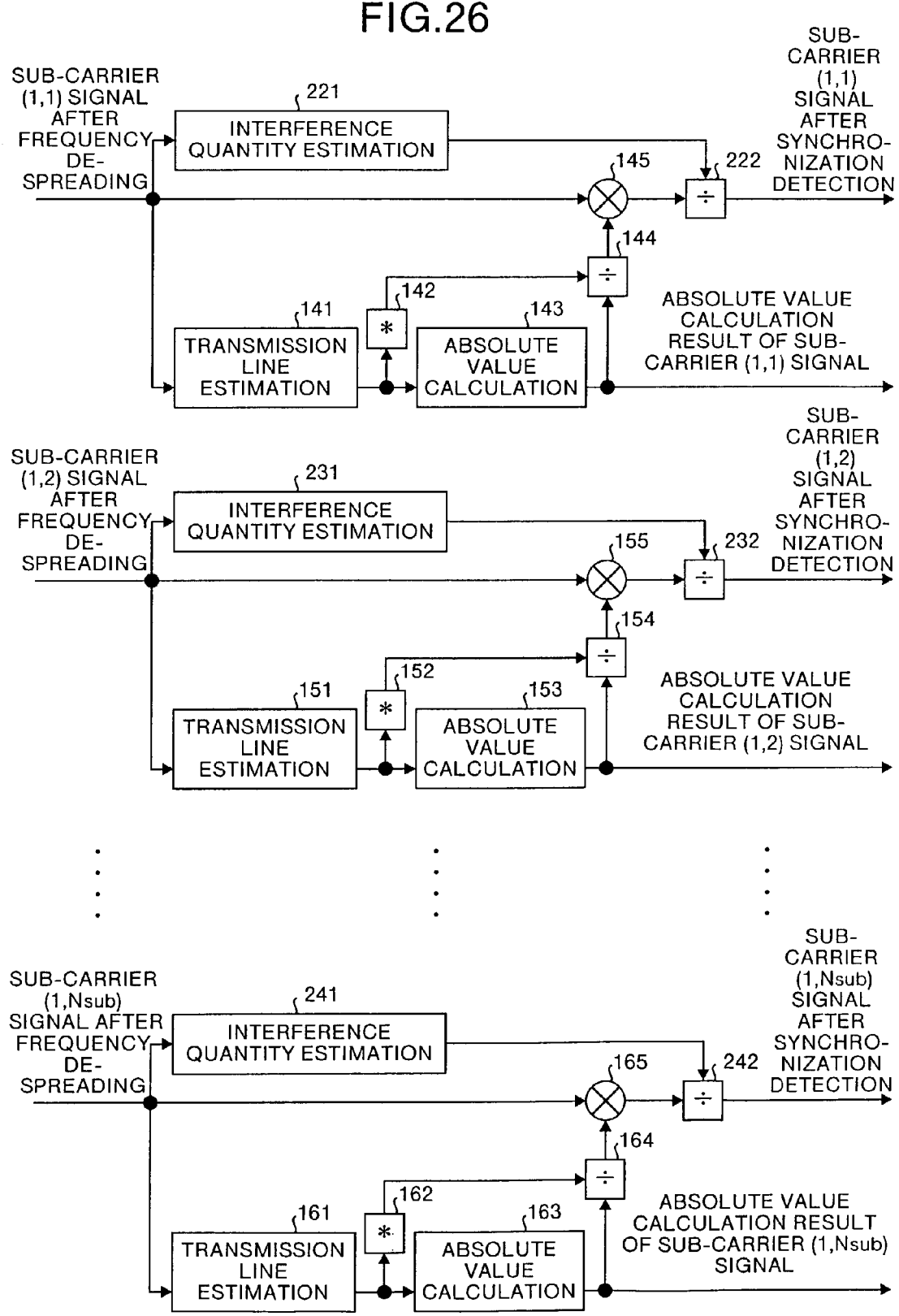
FIG. 26 is a diagram which shows the construction of a synchronization detector in a fourth embodiment.

FIG. 26 is a diagram which shows the construction of the synchronization detector 55 in the fourth embodiment. In FIG. 26, reference symbols 221, 231 and 241 denote interference quantity estimation sections, and 222, 232 and 242 denote analog dividers. The synchronization detector 55 receives sub-carrier signals (1, 1) to (1, Nsub) after the inverse spreading, and performs synchronization detection, using the known sequence added for each slot in the frame. The synchronization detector outputs the sub-carrier signals (1, 1) to (1, Nsub) after synchronization detection, and the absolute value calculation result of the sub-carrier signals (1, 1) to (1, Nsub) to the combining section 56.

Specifically, the transmission line estimation sections 141, 151 and 161 synchronously adds the known sequence symbols for the number of Npilot's added for each slot in the frame, for each sub-carrier signal (1, 1) to (1, Nsub), to calculate the transmission line estimate value individually.

The interference quantity estimation sections 221, 231 and 241 observe the known sequence symbols through several symbols or several slots, using the Npilot known sequence symbols added for each slot in the frame of the sub-carrier signals (1, 1) to (1, Nsub) after the frequency despreading, and calculates a distribution value to thereby calculate an interference power value.

These transmission line estimation results are then output to the complex conjugate calculation sections 142, 152 and 162, and the absolute value calculation sections 143, 153 and 163, respectively. Each complex conjugate calculation section calculates the complex conjugate of the transmission line estimation result, respectively, and each absolute value calculation section calculates the absolute value of the transmission line estimation result, respectively. The analog dividers 144, 154 and 164 divide the individually received complex conjugate by the corresponding absolute value, to extract a phase component necessary for performing synchronization detection for each sub-carrier. The multipliers 145, 155 and 165 then multiply the sub-carrier signals (1, 1) to (1, Nsub) after the frequency despreading by the phase component.

Finally, the analog dividers 222, 232 and 242 divide the outputs of the multipliers 145, 155 and 165 by the previously calculated interference power value, respectively.

Thus, in the fourth embodiment, the same effects as those of the first embodiment can be obtained, and further, since the synthesizing processing and the path combining are performed, based on the signal level and the interference quantity of the sub-carrier signal in the sub-carrier group, after performing the synchronization detection based on the transmission line estimate value estimated by the known pilot sequence for each sub-carrier signal, path diversity combining according to the input signal quality of each sub-carrier signal can be performed.

Fifth Embodiment

A multi-carrier CDMA communication apparatus in the fifth embodiment has the same construction as that of the first embodiment, with the exception that the internal construction and the operation of the synchronization detector 55 of the receive rare different. Only the portion different from that of the first embodiment will be explained herein.

Figure 27:
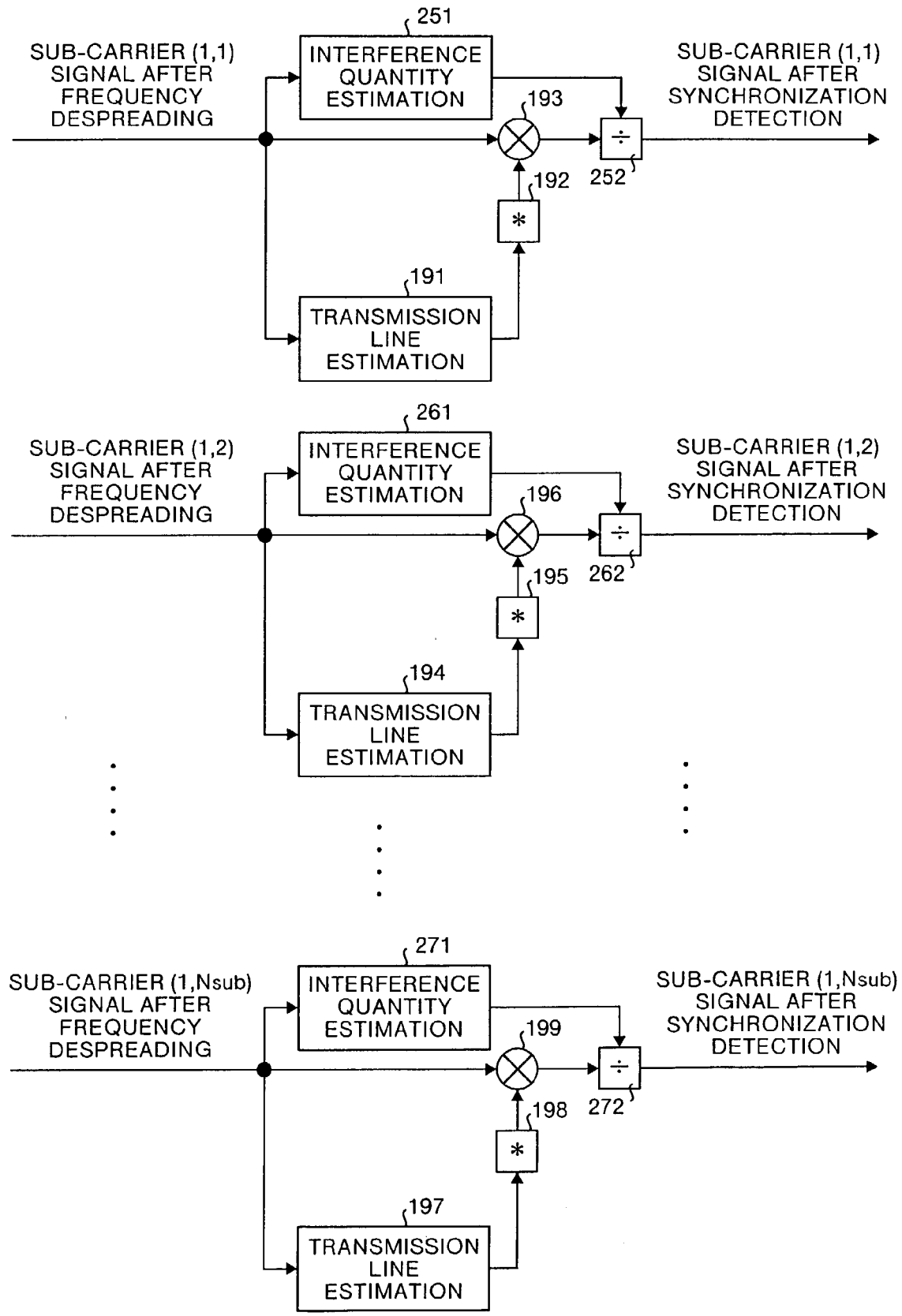
FIG. 27 is a diagram which shows the construction of a synchronization detector in a fifth embodiment.

FIG. 27 is a diagram which shows the construction of the synchronization detector 55 in the fifth embodiment. In FIG. 27, reference symbols 251, 261 and 271 denote interference quantity estimation sections, and 252, 262 and 272 denote analog dividers. The synchronization detector 55 receives sub-carrier signals (1, 1) to (1, Nsub) after the inverse spreading, and performs synchronization detection, using the known sequence added for each slot in the frame. The synchronization detector outputs the sub-carrier signals (1, 1) to (1, Nsub) after synchronization detection to the combining section 56.

Specifically, the transmission line estimation sections 191, 194 and 197 synchronously adds the known sequence symbols for the number of Npilot's added for each slot in the frame, for each sub-carrier signal (1, 1) to (1, Nsub), to calculate the transmission line estimate value individually.

The interference quantity estimation sections 251, 261 and 271 observe the known sequence symbols through several symbols or several slots, using the Npilot known sequence symbols added for each slot in the frame of the sub-carrier signals (1, 1) to (1, Nsub) after the frequency despreading, and calculates a distribution value to thereby calculate an interference power value.

These transmission line estimation results are then output to the complex conjugate calculation sections 192, 195 and 198, respectively. Each complex conjugate calculation section calculates the complex conjugate of the transmission line estimation result, respectively. The multipliers 193, 196 and 199 then multiply the sub-carrier signals (1, 1) to (1, Nsub) after the frequency despreading by the complex conjugate.

Finally, the analog dividers 252, 262 and 272 divide the outputs of the multipliers 193, 196 and 199 by the previously calculated interference power value, respectively.

Thus, in the fifth embodiment, the same effects as those of the first embodiment can be obtained, and further, since the synthesizing processing and the path combining are performed, based on the signal level and the interference quantity of the sub-carrier signal in the sub-carrier group, after performing the synchronization detection based on the transmission line estimate value estimated by the known pilot sequence for each sub-carrier signal, path diversity combining according to the input signal quality of each sub-carrier signal can be performed.

Sixth Embodiment

A multi-carrier CDMA communication apparatus in the sixth embodiment has the same construction as that of the first embodiment, with the exception that a time spreading section is provided in the sub-carrier group modulation processing section prior to the multiplexing sections 9a to 9c in the transmitter, and that a time despreading section is provided in the sub-carrier group demodulation processing section provided for each channel in the receiver. Only the portion different from that of the first embodiment will be explained herein.

Figure 28:
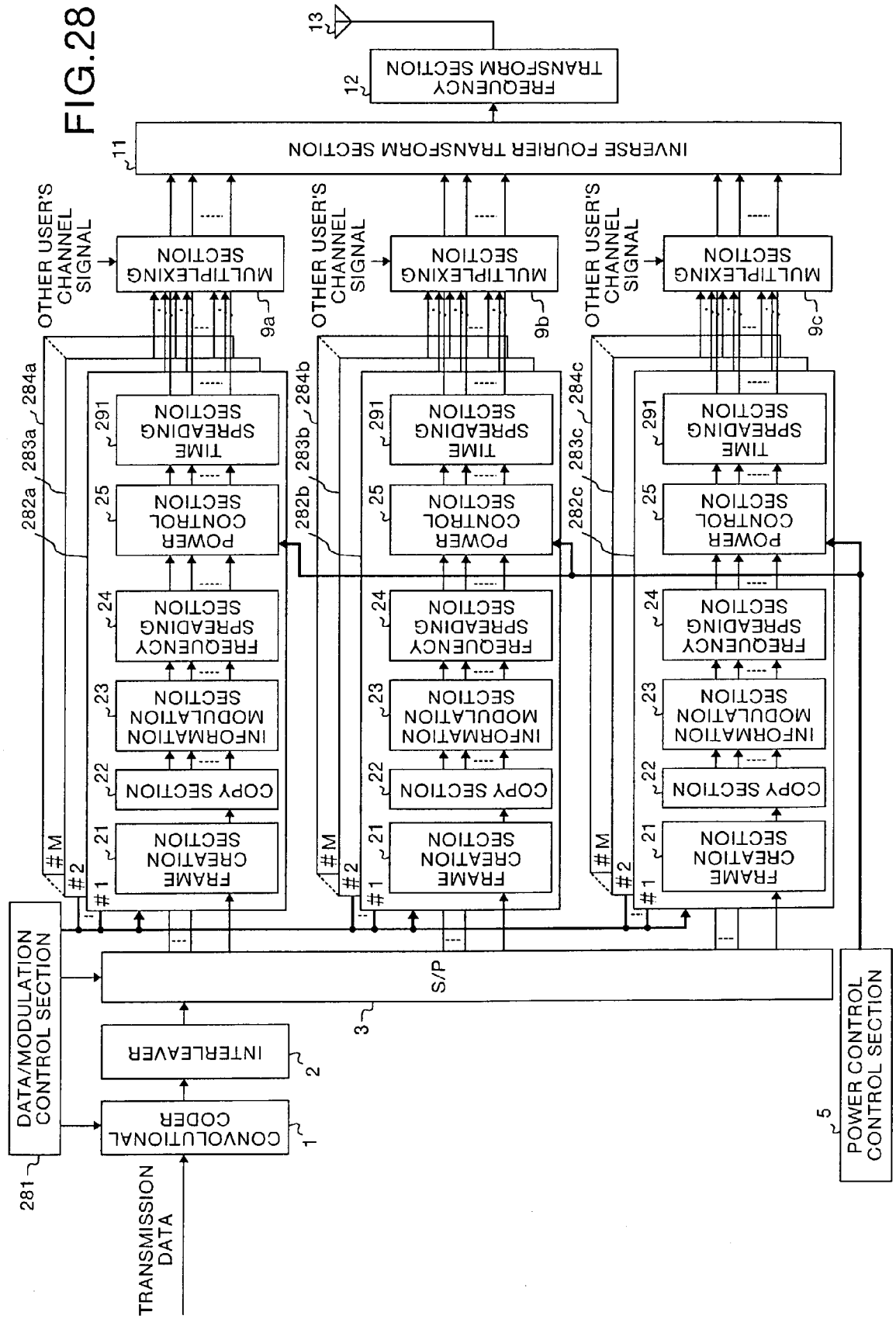
FIG. 28 is a diagram which shows the construction of a transmitter in a sixth embodiment.

FIG. 28 is a diagram which shows the construction of the transmitter in the sixth embodiment. In FIG. 28, reference symbol 281 denotes a data/modulation control section, and 282a, 282b, 282c, 283a, 283b, 283c, 284a, 284b and 284c denote first, second, and the Nscg-th sub-carrier group modulation processing sections provided for each channel, and 291 denote time spreading sections.

Figure 29:
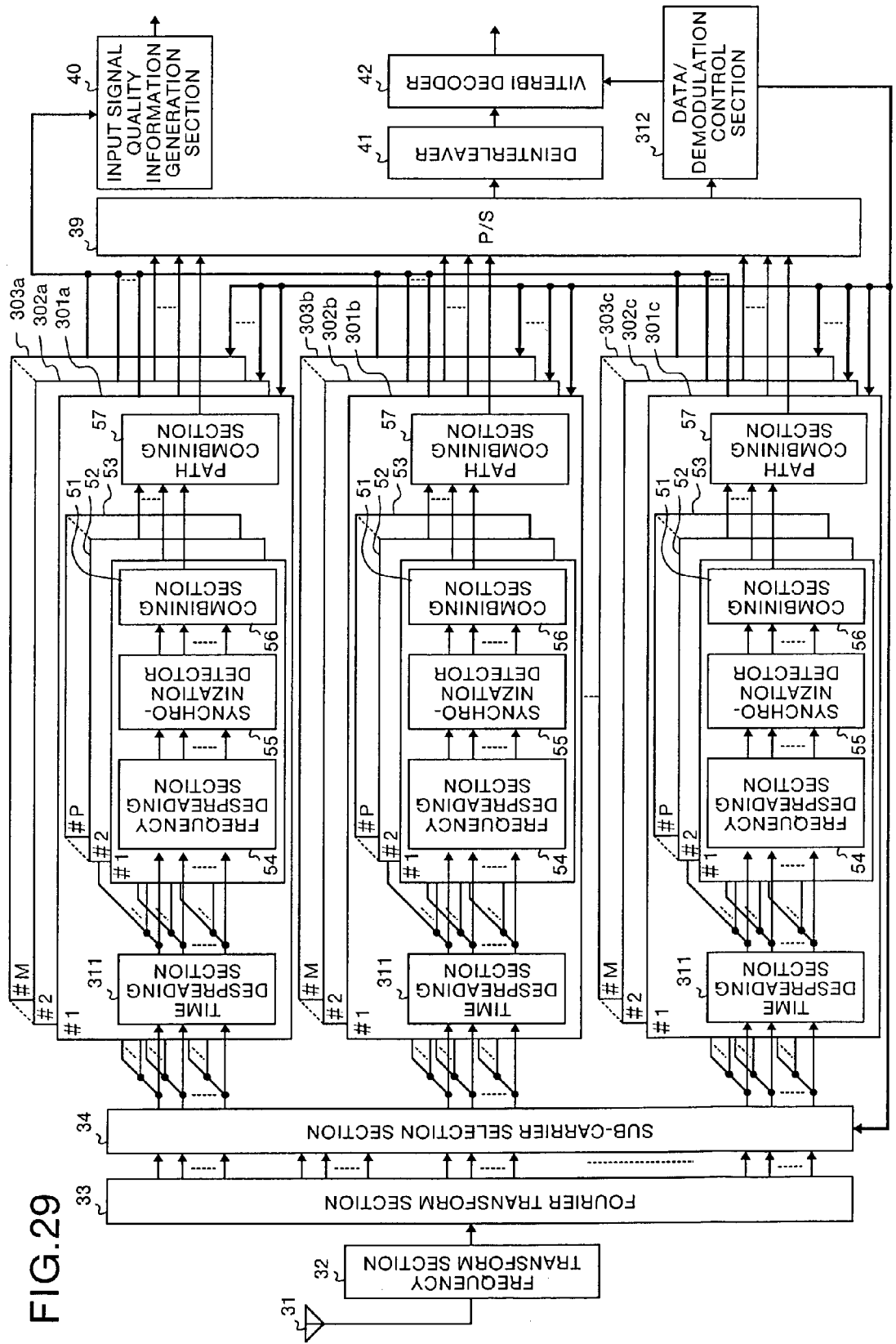
FIG. 29 is a diagram which shows the construction of a receiver in the sixth embodiment.

FIG. 29 is a diagram which shows the construction of the receiver in the sixth embodiment. In FIG. 29, reference symbols 301a, 301b, 301c, 302a, 302b, 302c, 303a, 303b and 303c denote first, second, and the Nscg-th sub-carrier group demodulation processing sections provided for each channel, 311 denote time despreading sections, and 312 denotes a data/demodulation control section.

The transmitter and the receiver in the sixth embodiment will be explained in detail, with reference to FIG. 28 and FIG. 29. The operation of the transmitter will be explained first.

Figure 30:
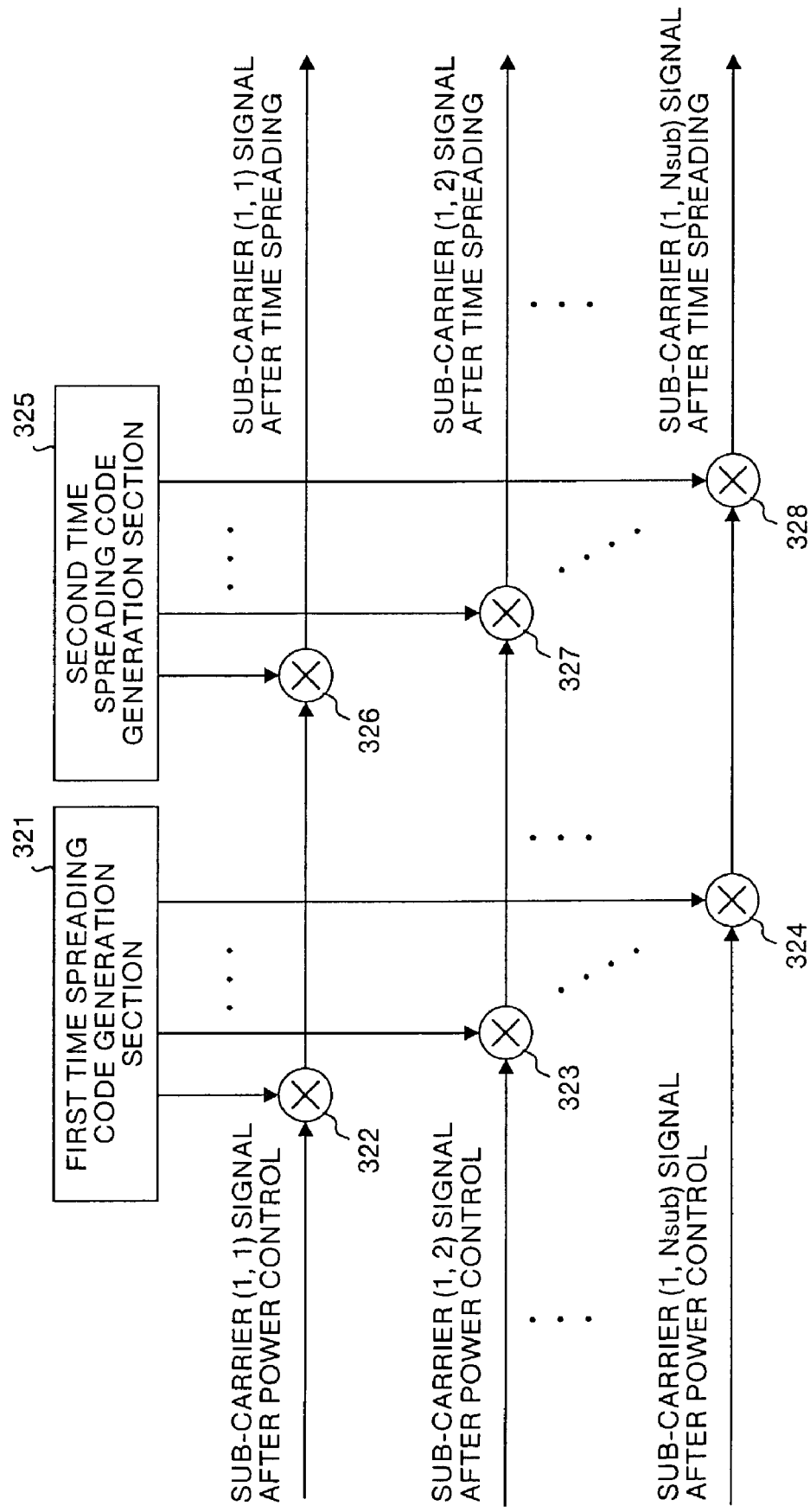
FIG. 30 is a diagram which shows the construction of a time spreading section in the sixth embodiment.

FIG. 30 is a diagram which shows the construction of the time spreading section 291 in the sixth embodiment. In FIG. 30, reference symbol 321 denotes a first time spreading code generation section, 322, 323 and 324 denote multipliers, 325 denotes a second time spreading code generation section, and 326, 327 and 328 denote multipliers. The time spreading section 291 multiplies the time spreading codes identical between sub-carriers transmitted from the first time spreading code generation section 321 by the sub-carrier signals (1, 1) to (1, Nsub) after power control, using the multipliers 322, 323 and 324, respectively, to thereby perform time spreading for each sub-carrier. As the first time spreading code, a peculiar code is allocated for each area to which the base station is going to transmit, and the one having an excellent correlation characteristic, such as PN sequence, is used.

The time spreading section 291 further multiplies the time spreading codes identical between sub-carriers and orthogonal to each other for each channel in the sub-carrier group, transmitted from the second time spreading code generation section 325 by the output of sub-carrier signals of the multipliers 322, 323 and 324, respectively, to thereby perform time spreading for each sub-carrier. As the second time spreading code, for example, Hadamard-Walsch code, being one of the orthogonal codes having excellent orthogonality, used as the frequency spreading code in the first embodiment, is used.

Figure 31:
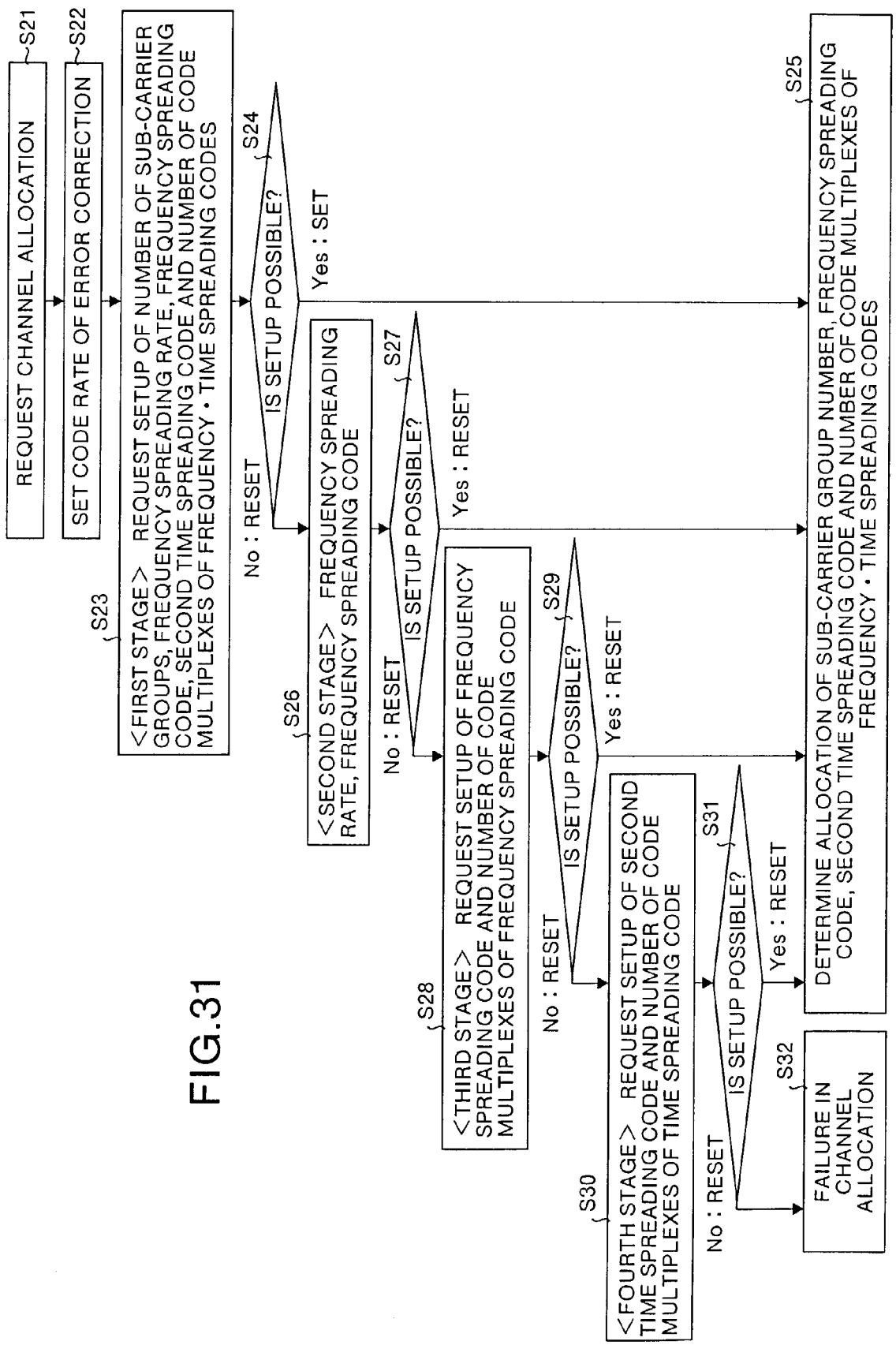
FIG. 31 is a flowchart which shows a method of allocating a frequency spreading code and a second time spreading code.

FIG. 31 is a flowchart which shows a method of allocating a frequency spreading code and a second time spreading code in the data/modulation control section 281. For example, in order to keep the required quality of the transmission data, the mobile station inserts the "input signal quality information" generated by using the input signal power to interference power ratio (SIR) at the time of reception, into the frame to be transmitted to the base station. Therefore, the data/modulation control section 281 having received the channel allocation request for ensuring a channel for transmission data (step S21) allocates a code rate based on this input signal quality information (step S22). That is to say, the data/modulation control section 281 sets a code rate of error correction by means of a convolutional code, based on the input signal quality information. When the reception condition of the mobile station is poor based on the input signal quality information, the code rate is set small, and when the reception condition thereof is excellent, the code rate is set large.

The data/modulation control section 281 then allocates the same number of sub-carrier groups as the reciprocal of the code rate (step S23) as the first stage. The frequency spreading code and the second time spreading code are selected so as not be the same as the frequency spreading code occupied by the other user and other channel. At this time, when the frequency spreading code and the second time spreading code can be ensured (step S24, Yes), the data/modulation control section 281 judges that setup is possible and determines allocation of the number of sub-carrier groups, the number of code multiplexes of the frequency spreading code and the second time spreading code, and the frequency spreading code and the second time spreading code (step S25).

On the other hand, when frequency spreading code and the second time spreading code cannot be ensured by the setting in the first stage (step S24, No), the data/modulation control section 281 allocates the frequency spreading code, while maintaining the transmission rate of the transmission data, as the second stage, and resets the frequency spreading rate in order to increase the usable number offer spreading codes. The frequency spreading rate is decreased to increase the number of sub-carrier groups which can be used in the same band, thereby ensuring the allocatable frequency spreading code (step S26) At this time, when the frequency spreading code can be ensured (step S27, Yes), the data/modulation control section 281 judges that setup is possible and determines allocation of the number of sub-carrier groups, the number of code multiplexes of the frequency spreading code and the second time spreading code, and the frequency spreading code and the second time spreading code (step S25).

When the frequency spreading code and the second time spreading code cannot be ensured by the setting in the second stage (step S27, No), the data/modulation control section 281 allows to ensure a plurality of frequency spreading codes in the same sub-carrier group, as the third stage, and resets the frequency spreading code for multiplexing in the same sub-carrier group (step S28) At this time, when the frequency spreading code can be ensured (step S29, Yes), the data/modulation control section 281 judges that setup is possible and determines allocation of the number of sub-carrier groups, the number of code multiplexes of the frequency spreading code and the second time spreading code, and the frequency spreading code and the second time spreading code (step S25).

If the frequency spreading code and the second time spreading code cannot be ensured in the third stage (step S29, No), the data/modulation control section 281 ensures a plurality of frequency spreading codes in the same sub-carrier group as the fourth stage, and further increases the number of multiplexes of the time spreading codes for multiplexing on the time axis (step S30). At this time, if the frequency spreading code and the second time spreading code can be ensured, (step S31, Yes), the data/modulation control section 281 judges that setup is possible and determines allocation of the number of sub-carrier groups, the number of code multiplexes of the frequency spreading code and the second time spreading code, and the frequency spreading code and the second time spreading code (step S25) On the other hand, if the frequency spreading code and the second time spreading code cannot be ensured (step S31, No), the data/modulation control section 281 has failed in channel allocation (step S32).

The frequency spreading code and the second time spreading code set in this manner are transmitted as the information to be notified to the mobile station, by the frame information (1) to (Nslot) in FIG. 3, in the same manner as in the first embodiment.

Figure 32:
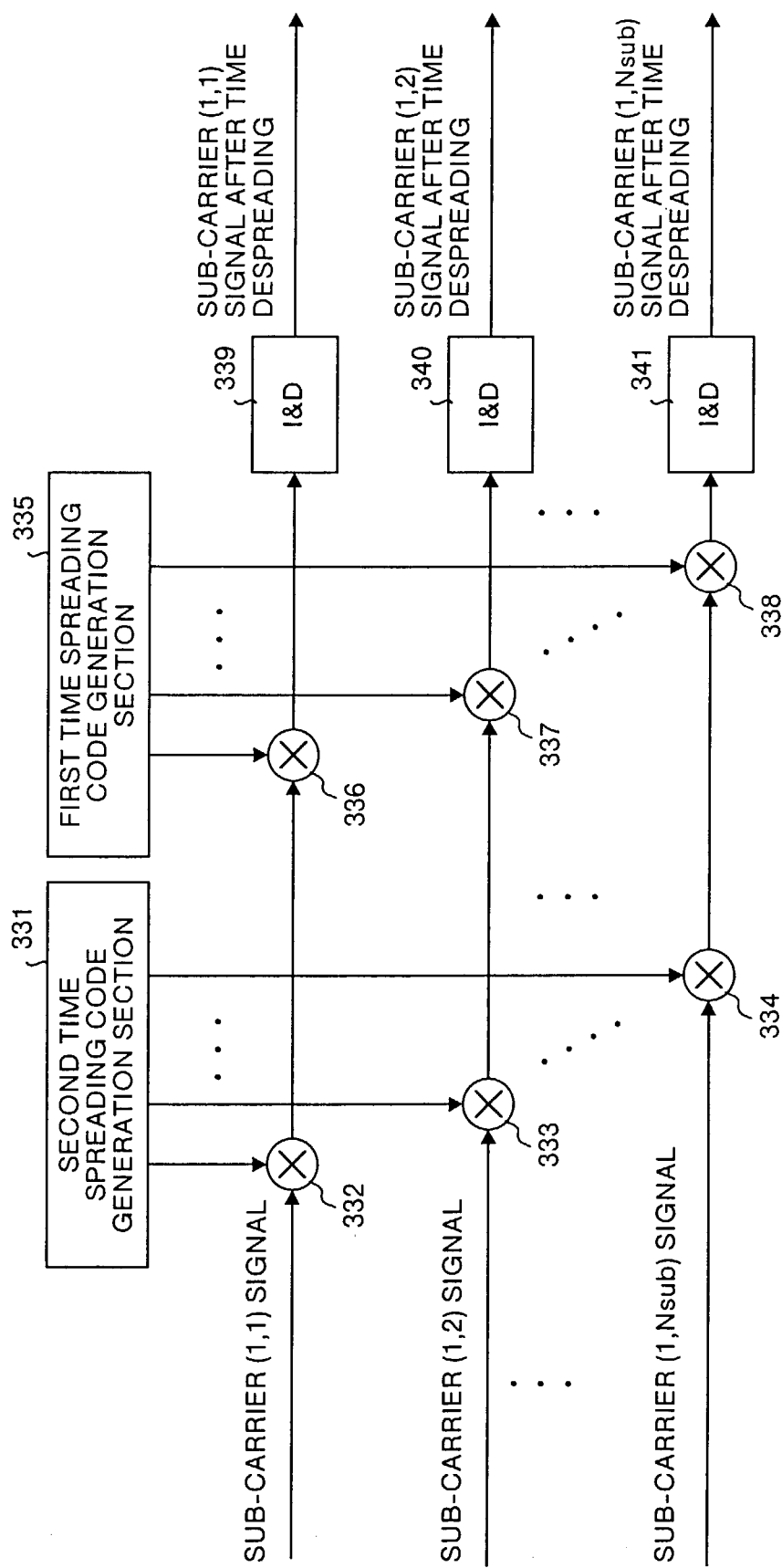
FIG. 32 is a diagram which shows the construction of a time despreading section in the sixth embodiment.

The operation of the receiver will be explained next. FIG. 32 is a diagram which shows the construction of the time despreading section 291 in the sixth embodiment. In FIG. 32, reference symbol 331 denotes a second time spreading code generation section, 332, 333, 334, 336, 337 and 338 denote multipliers, 335 denotes a first time spreading code generation section, and 339, 340 and 341 denote I & D's. The time despreading section 291 multiplies each sub-carrier signal by the second time spreading code individually generated in the second time spreading code generation section 331, based on the second time spreading code information transmitted from the data/demodulation control section 312. The time despreading section 291 then multiplies the outputs from the multipliers 332, 333 and 334 by the first time spreading code individually generated in the first time spreading code generation section 335, based on the first time spreading code information transmitted from the data/demodulation control section 312. After multiplication, each I & D integrates the output of the multiplier in each sub-carrier by a symbol period, respectively, to thereby generate sub-carrier signals (1, 1) to (1, Nsub) after time despreading, while clearing the integral value.

In the sixth embodiment, in FIG. 28, explanation is given for the case in which time spreading is performed by the time spreading section 291 after the transmission power control by means of the power control section 25. However, the transmission power control may be performed by the power control section 25 after the time spreading by the time spreading section 291.

Thus, in the sixth embodiment, the same effects as those of the first to the fifth embodiments can be obtained, and further, since the frequency spreading code and the time spreading code are allocated for each user or each channel to be used, the channel capacity can be increased, and as a result the frequency efficiency can be increased.

Seventh Embodiment

A multi-carrier CDMA communication apparatus in the seventh embodiment has the same construction as that of the sixth embodiment, with the exception that the method of allocating the frequency spreading code and the second time spreading code is different. Only the portion different from the first embodiment and the sixth embodiment will be explained.

Figure 33:
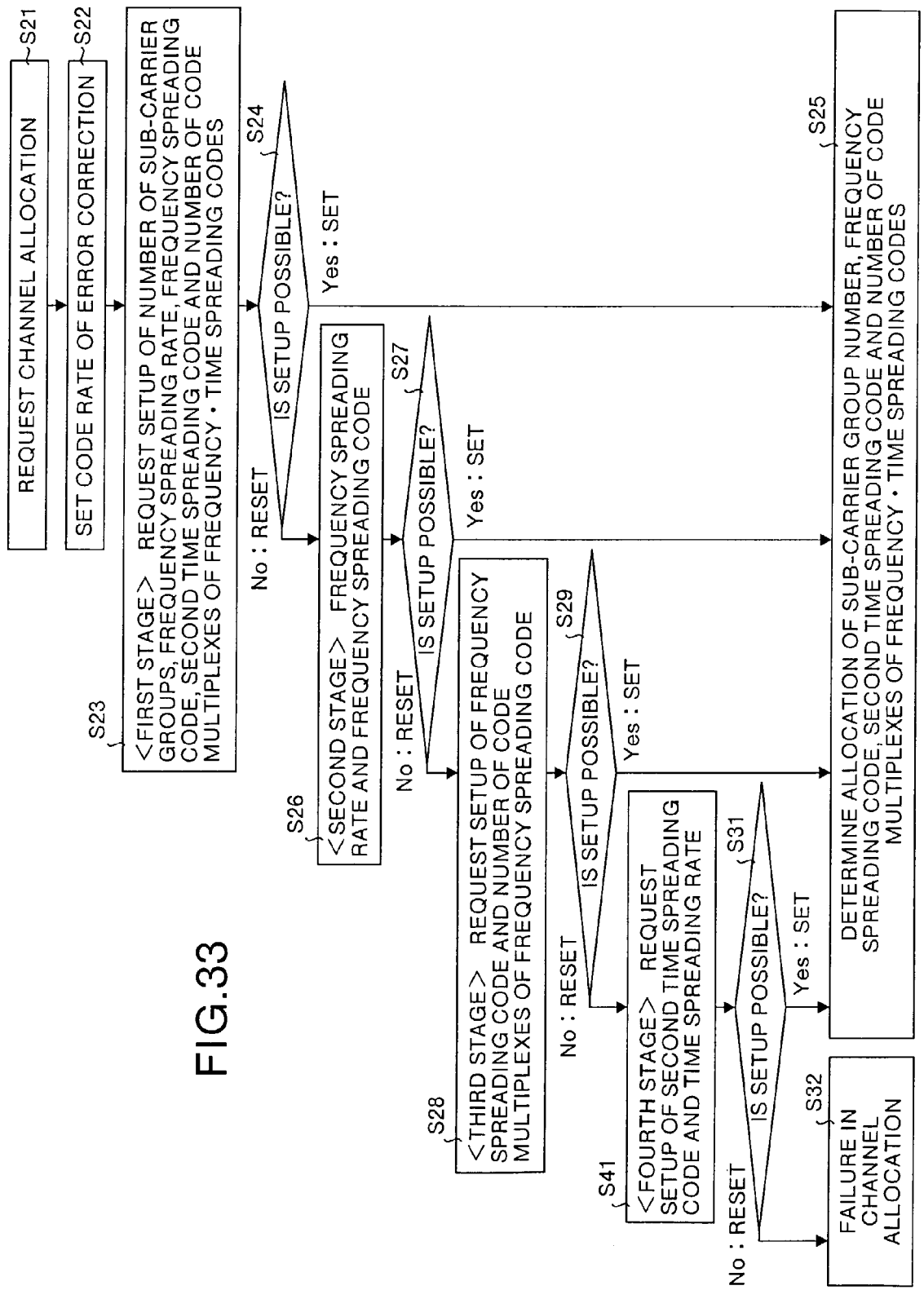
FIG. 33 is a flowchart which shows a method of allocating a frequency spreading code and a second time spreading code.
Figure 34:
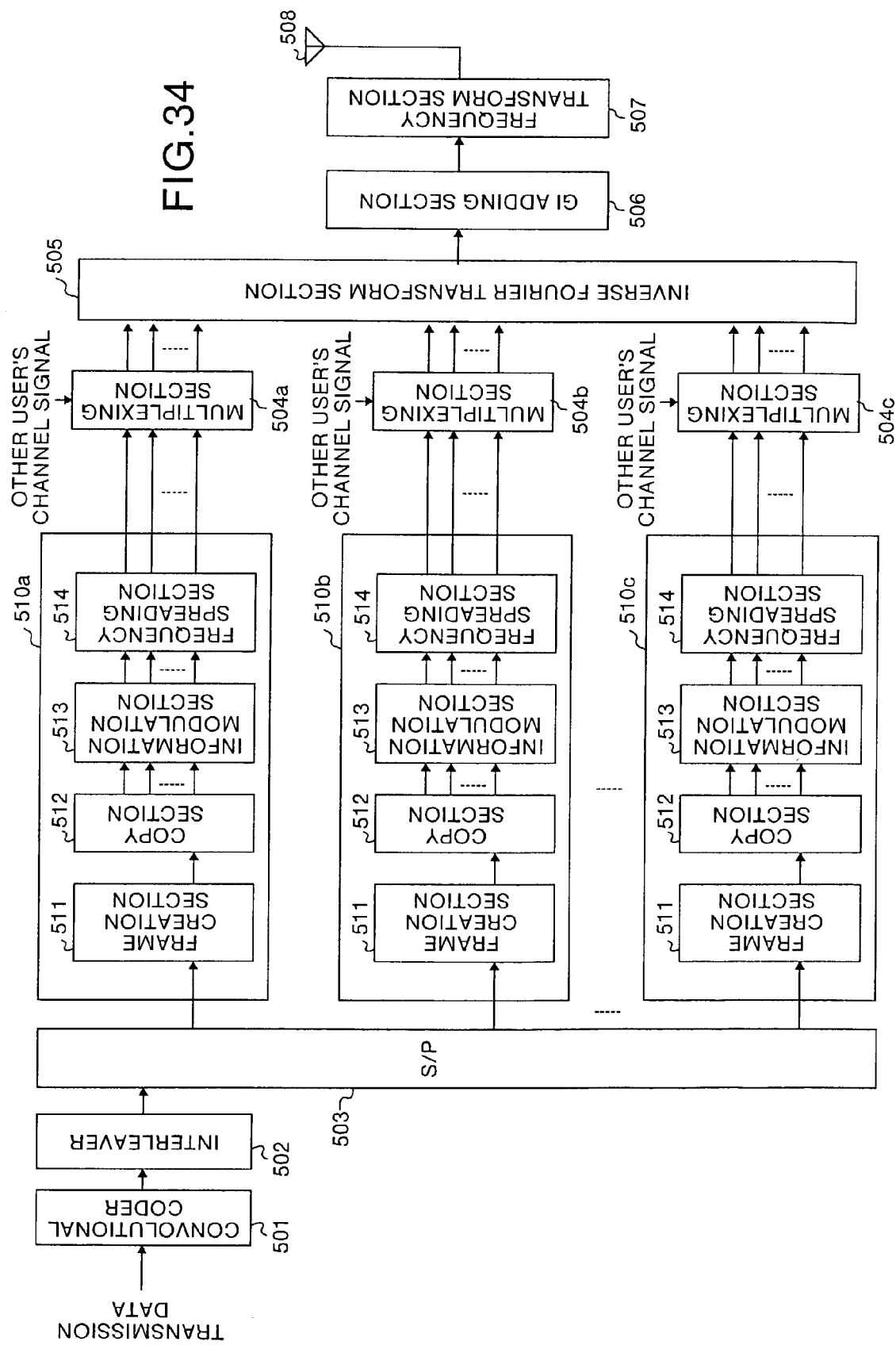
FIG. 34 is a diagram which shows the construction of a conventional multi-carrier CDMA transmitter.
Figure 35:
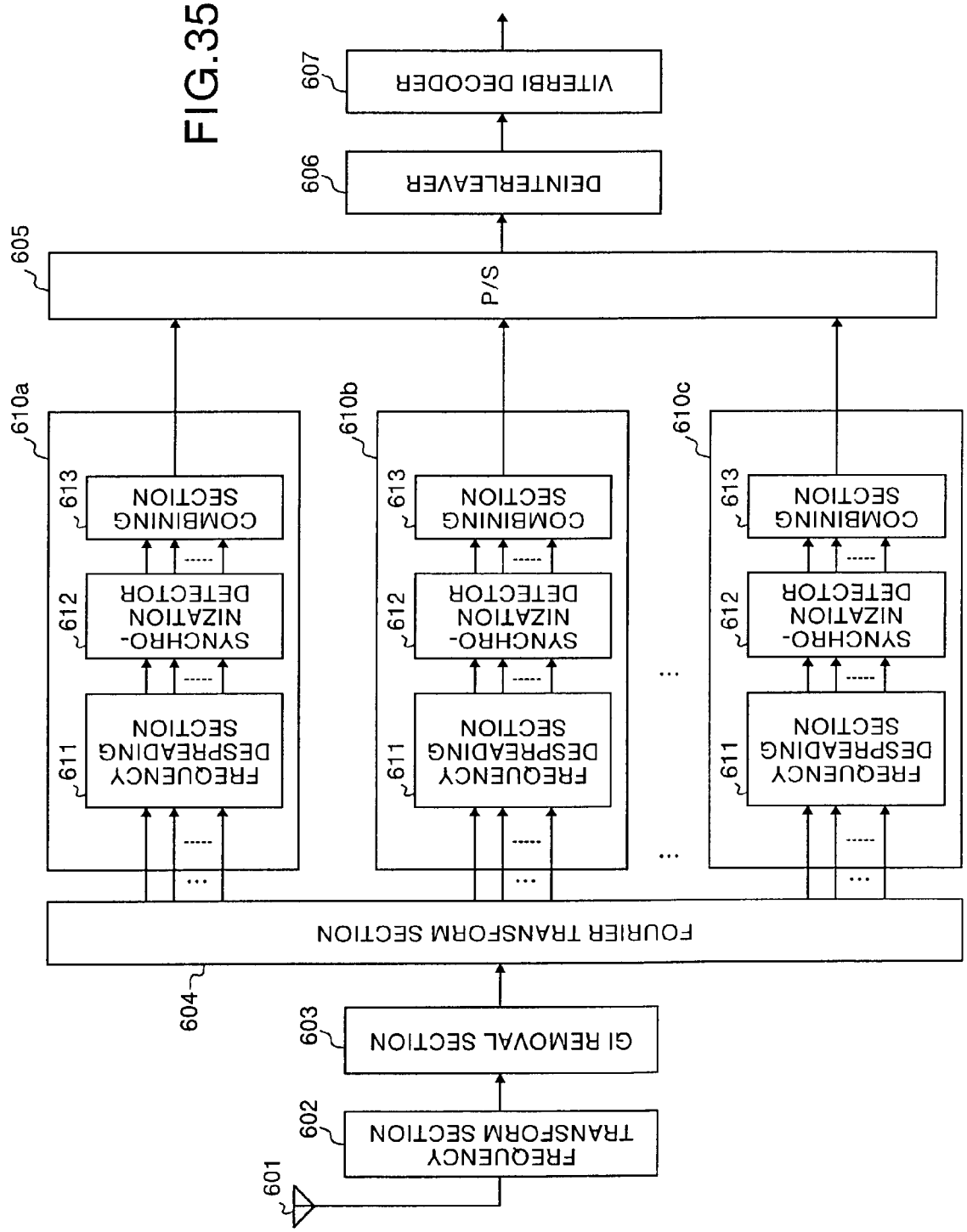
FIG. 35 is a diagram which shows the construction of a conventional multi-carrier CDMA receiver.
Figure 36:
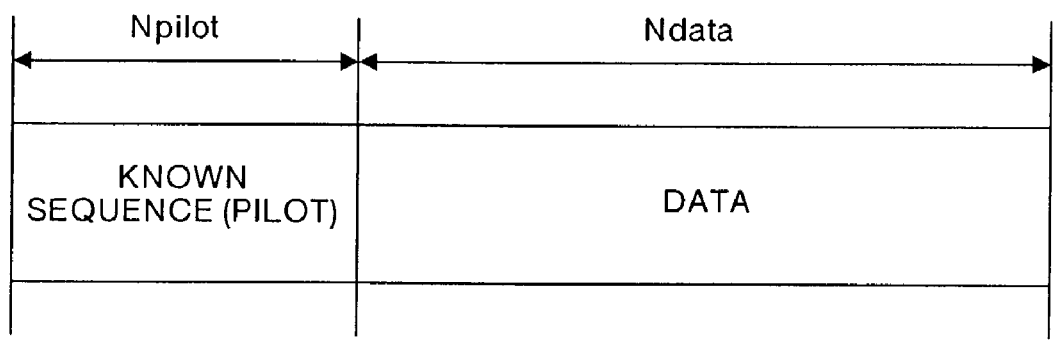
FIG. 36 is a diagram which shows the format of a transmission slot for each sub-carrier.
Figure 37:
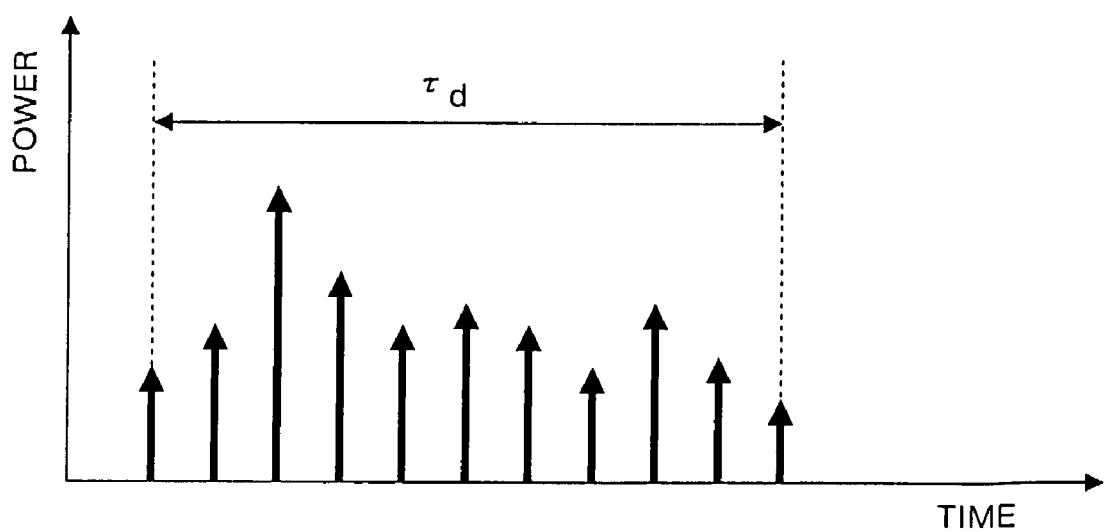
FIG. 37 is a diagram which shows one example of an impulse response of a frequency selective fading transmission line.
Figure 38:
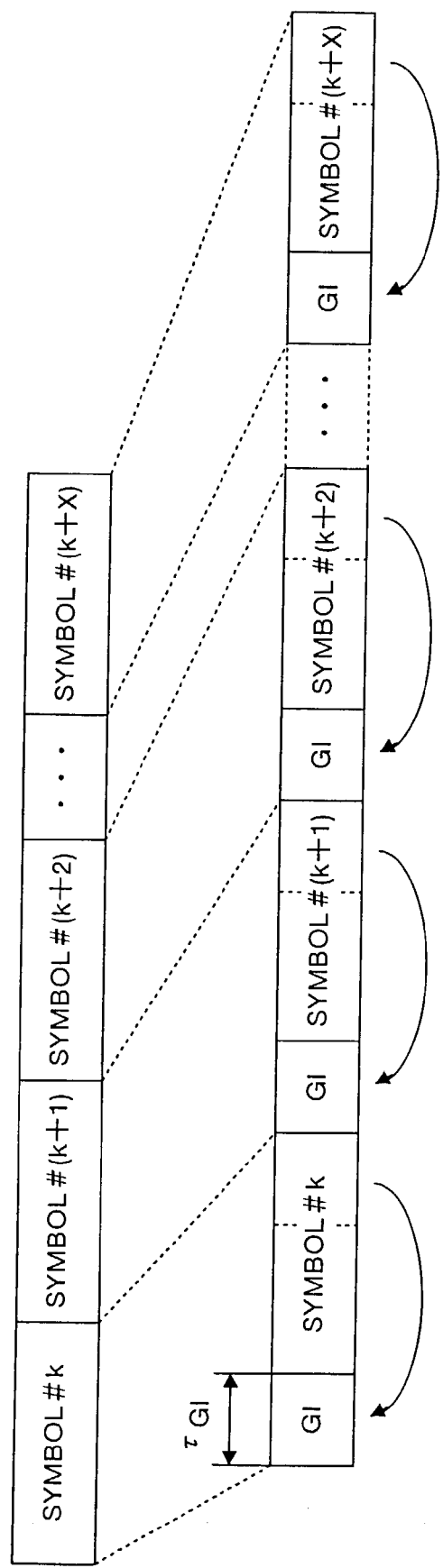
FIG. 38 is a diagram which shows the processing of a guard interval adding section.
Figure 39:
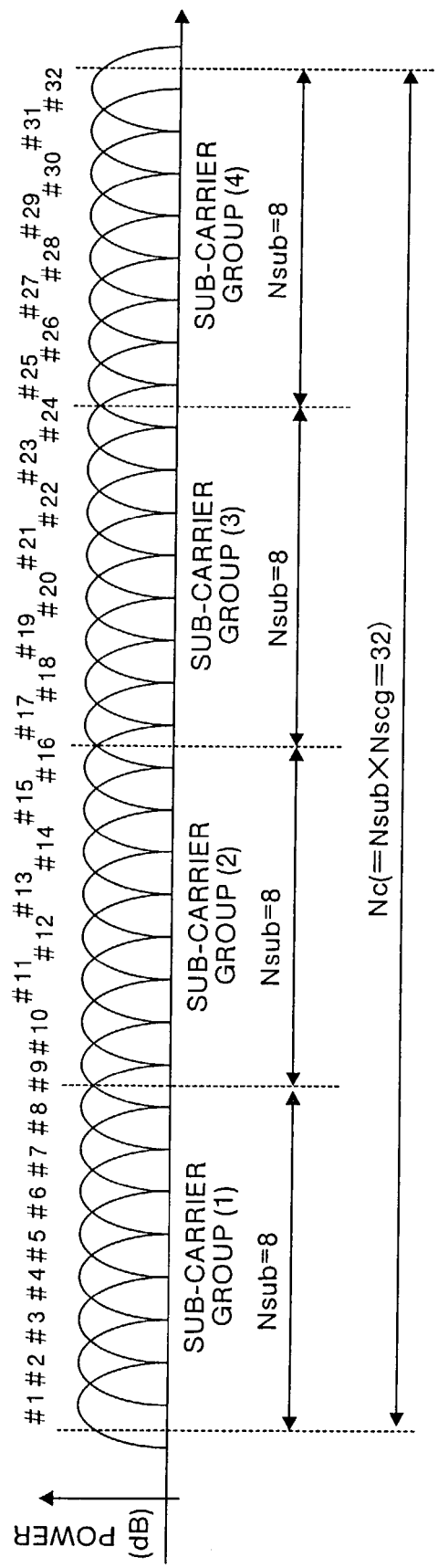
FIG. 39 is a diagram which shows a transmission signal expressed on a frequency axis.

FIG. 33 is a flowchart which shows the method of allocating the frequency spreading code and the second time spreading code. For example, in the fourth stage in the sixth embodiment, the number of code multiplexes of the second time spreading code is increased. In the fourth stage in this embodiment, however, the number of code multiplexes of the second time spreading code is not increased. Instead, at the time of forming a frame in the frame creation section 21, for example, the symbol speed of the data symbol is doubled, to thereby reduce the time spreading rate of the second time spreading code to ½, so that the signal band of the sub-carrier signal is not changed, and the orthogonality of the different time spreading codes in the same sub-carrier group does not collapse (step S41).

In the seventh embodiment, explanation has been given for the case in which the time spreading rate of the second time spreading code is reduced to ½, but the present invention is not limited to this case, and for example, the degree of reduction of time spreading rate may have a different value.

Thus, in the seventh embodiment, the same effects as those of the first to the fifth embodiments can be obtained, and further, since the frequency spreading code and the time spreading code can be allocated for each user or each channel to be used, without increasing the number of code multiplexes of the time spreading code, the channel capacity can be increased, and as a result, the frequency efficiency can be increased.

As described above, according to the present invention, even if the transmission signal from the base station is affected by frequency selective fading on the transmission line, and the expanse of the delayed wave is large, spreading in the time direction is effected by allocating a spreading code, together with spreading in the frequency direction. Further, paths are separated by using the path cracking ability of the delayed wave, and path diversity which effectively utilizes the delayed wave is used. Therefore, the input signal quality can be increased. As a result, there is the effect that a multi-carrier CDMA communication apparatus, which can suppress the influence of interference in the symbol, and realize excellent bit error rate characteristic, can be obtained. Further, according to the present invention, spreading is performed both in the frequency direction and the time direction, at the time of reception, and time spreading codes different in sectors or cells can be used. As a result, there is the effect that a multi-carrier CDMA communication apparatus, which can execute soft hand-over, without interrupting the communication and without changing the frequency used on the transmission line, can be obtained.

According to the next invention, even if the degree of influence of frequency selective fading differs largely for each sub-carrier, the transmission power control information inserted in the frame is used to control the transmission signal power on the base station side, so that the input signal quality becomes the same in each sub-carrier group. As a result, there is the effect that the input signal quality can be kept constant in each sub-carrier group, while reducing the interference quantity.

According to the next invention, channels are allocated according to the information transmission speed and code rate, and the frequency spreading code is hierarchically allocated for each sub-carrier group. Therefore, the frequency spreading rate can be made variable, while maintaining the state that the frequency spreading code allocated for each user or for each channel to be used is orthogonal to each other. Thereby, there is the effect that the frequency efficiency can be increased.

According to the next invention, since the frequency spreading code is allocated, with a predetermined frequency interval, even if the sub-carrier signal power drops due to frequency selective fading, a decrease in the signal power for each sub-carrier group can be suppressed. As a result, there is the effect that the frequency diversity effect can be increased.

According to the next invention, after synchronization detection in which phase compensation is performed for each sub-carrier signal has been performed using a known pilot sequence, the path combining is performed according to the signal level of the sub-carrier signal in the sub-carrier group. As a result, there is the effect that path diversity combining according to the input signal quality of each sub-carrier signal can be performed.

According to the next invention, since the synthesizing processing of the sub-carrier signals in the sub-carrier group and the path combining are performed, after performing the synchronization detection based on the transmission line estimate value estimated by the known pilot sequence for each sub-carrier signal, there is the effect that path diversity combining according to the input signal quality of each sub-carrier signal can be performed.

According to the next invention, since the synthesizing processing and the path combining are performed, based on the signal level and the interference quantity of the sub-carrier signal in the sub-carrier group, after performing the synchronization detection based on the transmission line estimate value estimated by the known pilot sequence for each sub-carrier signal, there is the effect that path diversity combining according to the input signal quality of each sub-carrier signal can be performed.

According to the next invention, since the synthesizing processing and the path combining are performed, based on the signal level and the interference quantity of the sub-carrier signal in the sub-carrier group, after performing the synchronization detection based on the transmission line estimate value estimated by the known pilot sequence for each sub-carrier signal, there is the effect that path diversity combining according to the input signal quality of each sub-carrier signal can be performed.

According to the next invention, even if the transmission signal from the base station is affected by frequency selective fading on the transmission line, and the expanse of the delayed wave is large, spreading in the time direction is effected by allocating a spreading code, together with spreading in the frequency direction. Further, paths are separated by using the path cracking ability of the delayed wave, and path diversity which effectively utilizes the delayed wave is used. Therefore, the input signal quality can be increased. As a result, there is the effect that a multi-carrier CDMA communication apparatus, which can suppress the influence of interference in the symbol, and realize excellent bit error rate characteristic, can be obtained. Further, according to the present invention, spreading is performed both in the frequency direction and the time direction, at the time of reception, and time spreading codes different in sectors or cells can be used. As a result, there is the effect that a multi-carrier CDMA communication apparatus, which can execute soft hand-over, without interrupting the communication and without changing the frequency used on the transmission line, can be obtained.

According to the next invention, even if the degree of influence of frequency selective fading differs largely for each sub-carrier, the transmission power control information inserted in the frame is used to control the transmission signal power on the base station side, so that the input signal quality becomes the same in each sub-carrier group. As a result, there is the effect that the input signal quality can be kept constant in each sub-carrier group, while reducing the interference quantity.

According to the next invention, since the frequency spreading code and the time spreading code are allocated for each user or each channel to be used, the channel capacity can be increased, and as a result, there is the effect that the frequency efficiency can be increased.

According to the next invention, since the frequency spreading code and the time spreading code are allocated for each user or each channel to be used, without increasing the number of code multiplexes of the time spreading code, the channel capacity can be increased, and as a result, there is the effect that the frequency efficiency can be increased.

According to the next invention, after synchronization detection in which phase compensation is performed for each sub-carrier signal has been performed using a known pilot sequence, the path combining is performed according to the signal level of the sub-carrier signal in the sub-carrier group. As a result, there is the effect that path diversity combining according to the input signal quality of each sub-carrier signal can be performed.

According to the next invention, since the synthesizing processing of the sub-carrier signals in the sub-carrier group and the path combining are performed, after performing the synchronization detection based on the transmission line estimate value estimated by the known pilot sequence for each sub-carrier signal, there is the effect that path diversity combining according to the input signal quality of each sub-carrier signal can be performed.

According to the next invention, since the synthesizing processing and the path combining are performed, based on the signal level and the interference quantity of the sub-carrier signal in the sub-carrier group, after performing the synchronization detection based on the transmission line estimate value estimated by the known pilot sequence for each sub-carrier signal, there is the effect that path diversity combining according to the input signal quality of each sub-carrier signal can be performed.

According to the next invention, since the synthesizing processing and the path combining are performed, based on the signal level and the interference quantity of the sub-carrier signal in the sub-carrier group, after performing the synchronization detection based on the transmission line estimate value estimated by the known pilot sequence for each sub-carrier signal, there is the effect that path diversity combining according to the input signal quality of each sub-carrier signal can be performed.

According to the next invention, even if the transmission signal from the base station is affected by frequency selective fading on the transmission line, and the expanse of the delayed wave is large, the signal modulation unit allocates a spreading code in the frequency direction to effect spreading, and the time spread unit allocates a spreading code in the time direction to effect spreading. As a result, there is the effect that a multi-carrier CDMA transmitter which can considerably increase the input signal quality can be obtained.

According to the next invention, even if the transmission signal from the base station is affected by frequency selective fading on the transmission line, and the expanse of the delayed wave is large, the signal modulation unit allocates a spreading code in the frequency direction to effect spreading, together with spreading in the frequency direction. As a result, there is the effect that a multi-carrier CDMA transmitter which can considerably increase the input signal quality can be obtained.

According to the next invention, even if the transmission signal from the base station is affected by frequency selective fading on the transmission line, and the expanse of the delayed wave is large, the time despreading unit performs inverse spreading in the time direction, the signal demodulation unit performs inverse spreading in the frequency direction, and path diversity in which paths are separated by using the path cracking ability of the delayed wave to effectively utilize the delayed wave is used. As a result, there is the effect that a multi-carrier CDMA receiver which can considerably increase the input signal quality can be obtained.

According to the next invention, even if the transmission signal from the base station is affected by frequency selective fading on the transmission line, and the expanse of the delayed wave is large, the signal demodulation unit performs inverse spreading in the time direction and inverse spreading in the frequency direction, and path diversity in which paths are separated by using the path cracking ability of the delayed wave to effectively utilize the delayed wave is used. As a result, there is the effect that a multi-carrier CDMA receiver which can considerably increase the input signal quality can be obtained.

INDUSTRIAL APPLICABILITY

As described above, the multi-carrier CDMA communication apparatus, the multi-carrier CDMA transmitter and the multi-carrier CDMA receiver according to the present invention are suitable for mobile communication system which adopts a multiple access scheme using the multi-carrier CDMA method, and are useful for obtaining excellent bit error rate characteristic, even in a communication environment affected by frequency selective fading.

The invention claimed is:

1. A multi-carrier CDMA communication apparatus comprising a transmitter and a receiver configured to perform transfer of data, using a multi-carrier CDMA method, said transmitter including:
signal modulation units for a number of sub-carrier groups, configured to perform frequency spreading for each sub-carrier signal of each channel constituting a sub-carrier group, based on a predetermined condition; and
time spreading units for the number of sub-carrier groups, configured to multiplex all signals after modulation processing and the frequency spreading for each sub-carrier signal, and perform time spreading with respect to the multiplexed signals for each sub-carrier signal, and said receiver including:
time despreading units for the number of sub-carrier groups, configured to perform time despreading for each sub-carrier signal; and signal demodulation units for the number of sub-carrier groups, configured to perform frequency despreading for each sub-carrier signal after the time despreading.

2. The multi-carrier CDMA communication apparatus according to claim 1, said signal modulation unit comprising:
a frame creation unit configured to create data frames comprising a known sequence, frame information, and data, for each sub-carrier group based on said predetermined condition;
a copy unit configured to generate data frames by the number of sub-carriers, by copying the data frame;
an information modulation unit configured to perform modulation processing with respect to each data frame;
a frequency spreading unit configured to perform frequency spreading with respect to each sub-carrier signal after modulation, based on said predetermined condition; and
a power control unit configured to perform transmission power control with respect to each sub-carrier signal after the frequency spreading.

3. The multi-carrier CDMA communication apparatus according to claim 1, each signal demodulation unit comprising:
a frequency despreading unit configured to perform frequency despreading for each sub-carrier signal;
a synchronization detector configured to perform transmission line estimation for each sub-carrier signal after frequency inverse conversion, based on a known sequence added to a data frame, to calculate an absolute value and a complex conjugate of transmission line estimation results, to normalize the complex conjugate by the absolute value, to weight the sub-carrier signal by the normalization result, and to output the absolute value and the sub-carrier signal after weighting as an output;
a combining unit configured to generate a signal for the sub-carrier group by adding all the sub-carrier signals after weighting, and to combine an absolute value for the sub-carrier group by adding all the absolute values; and
a path combining unit configured to multiply the sub-carrier group signal corresponding to each path by the absolute value of the respectively corresponding sub-carrier group, to thereby generate a sub-carrier group signal after path combining, by adding all the multiplication results.

4. The multi-carrier CDMA communication apparatus according to claim 1, said signal demodulation unit comprising:
a frequency despreading unit configured to perform frequency despreading in a unit of the sub-carrier signal;
a synchronization detector configured to perform transmission line estimation for each sub-carrier signal after frequency inverse conversion, based on a known sequence added to a data frame, to calculate a complex conjugate of transmission line estimation results, to weight the sub-carrier signal by said complex conjugate, and to output the sub-carrier signal after weighting as an output;
a combining unit configured to generate a signal for the sub-carrier group by adding all the sub-carrier signals after weighting; and
a path combining unit configured to add all the sub-carrier group signals corresponding to each path, to thereby generate a sub-carrier group signal after path combining.

5. The multi-carrier CDMA communication apparatus according to claim 1, said signal demodulation unit comprising:
a frequency despreading unit configured to perform frequency despreading in a unit of the sub-carrier signal;
a synchronization detector configured to perform transmission line estimation for each sub-carrier signal after frequency inverse conversion, based on a known sequence added to a data frame, to calculate an absolute value and a complex conjugate of transmission line estimation results, to normalize the complex conjugate by absolute value, to weight the sub-carrier signal by the normalization result, to estimate an interference power for each sub-carrier signal after the frequency inverse conversion based on the known sequence, and to divide the sub-carrier signal after weighting by the interference power;
a combining unit configured to generate a signal for the sub-carrier group by adding all the sub-carrier signals after the synchronization detection, and to generate an absolute value for the sub-carrier group by adding all the absolute values; and
a path combining unit configured to multiply the sub-carrier group signal corresponding to each path by the absolute value of the respectively corresponding sub-carrier group, to thereby generate a sub-carrier group signal after path combining, by adding all the multiplication results.

6. The multi-carrier CDMA communication apparatus according to claim 1, said signal demodulation unit comprising:
a frequency despreading unit configured to perform frequency despreading in a unit of the sub-carrier signal;
a synchronization detector configured to perform transmission line estimation for each sub-carrier signal after frequency inverse conversion, based on a known sequence added to a data frame, to calculate a complex conjugate of transmission line estimation results, to weight the sub-carrier signal by the complex conjugate, to estimate an interference power for each sub-carrier signal after the frequency inverse conversion based on the known sequence, and to divide the sub-carrier signal after weighting by the interference power;
a combining unit configured to generate a signal for the sub-carrier group by adding all the sub-carrier signals after the synchronization detection; and
a path combining unit configured to add all the sub-carrier group signals corresponding to each path, to thereby generate a sub-carrier group signal after path combining.

7. A multi-carrier CDMA communication apparatus comprising a transmitter and a receiver configured to perform transfer of data, using a multi-carrier CDMA method,
said transmitter including:
a setting unit configured to set a code rate of error correction, a number of sub-carrier groups, a frequency spreading rate, a number of code multiplexes of frequency spreading code, a frequency spreading code, a time spreading rate, a number of code multiplexes of time spreading code, and a time spreading code;
signal modulation units for the number of sub-carrier groups configured to perform frequency spreading for each sub-carrier signal of each channel constituting a sub-carrier group, based on the set conditions; and
time spreading units for the number of sub-carrier groups, configured to multiplex all the signals after the modulation processing and the frequency spreading for each sub-carrier signal, and perform time spreading with respect to the multiplexed signals for each sub-carrier signal; and
said receiver including:
time despreading units for the number of sub-carrier groups, configured to perform time despreading for each sub-carrier signal; and
signal demodulation units for the number of sub-carrier groups, configured to perform frequency despreading for each sub-carrier signal after the time despreading.

8. The multi-carrier CDMA communication apparatus according to claim 7, said signal modulation unit comprising:
a frame creation unit configured to create data frames including a known sequence, frame information, and data, for each sub-carrier group based on said set conditions;
a copy unit configured to generate data frames by the number of sub-carriers, by copying the data frame;
an information modulation unit configured to perform modulation processing with respect to each data frame;
a frequency spreading unit configured to perform frequency spreading with respect to each sub-carrier signal after modulation, based on said set conditions; and
a power control unit configured to perform transmission power control with respect to each sub-carrier signal after the frequency spreading.

9. The multi-carrier CDMA communication apparatus according to claim 7, wherein said setting unit sets the code rate of error correction, based on an input signal power to interference power ratio transmitted from said receiver; and
when there is no frequency spreading code to be allocated, at a time of setting the frequency spreading code and the time spreading code, said setting unit ensures an allocatable frequency spreading code by reducing the frequency spreading rate.

10. The multi-carrier CDMA communication apparatus according to claim 7, wherein said setting unit sets the code rate of error correction, based on an input signal power to interference power ratio transmitted from said receiver; and
when there is no frequency spreading code to be allocated, at a time of setting the frequency spreading code, said setting unit ensures an allocatable frequency spreading code by reducing the frequency spreading rate, and
when the code rate cannot be set even when there is no frequency spreading code to be allocated, said setting unit ensures an allocatable frequency spreading code, by ensuring a plurality of frequency spreading codes in the same sub-carrier group.

11. The multi-carrier CDMA communication apparatus according to claim 10, wherein said setting unit allocates the frequency spreading code, by leaving a predetermined frequency interval, while keeping orthogonality and hierarchical relationship between frequency spreading codes.

12. The multi-carrier CDMA communication apparatus according to claim 7, said signal demodulation unit comprising:
a frequency despreading unit configured to perform frequency despreading for each sub-carrier signal;
a synchronization detector configured to perform transmission line estimation for each sub-carrier signal after frequency inverse conversion, based on a known sequence added to a data frame, to calculate an absolute value and a complex conjugate of transmission line estimation results, to normalize the complex conjugate by absolute value, to weight the sub-carrier signal by the normalization result, and to output the absolute value and the sub-carrier signal after weighting as an output;

a combining unit configured to generate a signal for the sub-carrier group by adding all the sub-carrier signals after weighting, and to combine an absolute value for the sub-carrier group by adding all the absolute values; and a path combining unit configured to multiply the sub-carrier group signal corresponding to each path by the absolute value of the respectively corresponding sub-carrier group, to thereby generate a sub-carrier group signal after path combining, by adding all the multiplication results.

13. The multi-carrier CDMA communication apparatus according to claim 7, said signal demodulation unit comprising:

a frequency despreading unit configured to perform frequency despreading in a unit of the sub-carrier signal;

a synchronization detector configured to perform transmission line estimation for each sub-carrier signal after frequency inverse conversion, based on a known sequence added to a data frame, to calculate a complex conjugate of transmission line estimation results, to weight the sub-carrier signal by said complex conjugate, and to output the sub-carrier signal after weighting as an output;

a combining unit configured to generate a signal for the sub-carrier group by adding all the sub-carrier signals after weighting; and a path combining unit configured to add all the sub-carrier group signals corresponding to each path, to thereby generate a sub-carrier group signal after path combining.

14. The multi-carrier CDMA communication apparatus according to claim 7, said signal demodulation unit comprising:

a frequency despreading unit configured to perform frequency despreading in a unit of the sub-carrier signal;

a synchronization detector configured to perform transmission line estimation for each sub-carrier signal after frequency inverse conversion, based on a known sequence added to a data frame, to calculate an absolute value and a complex conjugate of transmission line estimation results, to normalize the complex conjugate by the absolute value, to weight the sub-carrier signal by the normalization result, to estimate an interference power for each sub-carrier signal after the frequency inverse conversion based on the known sequence, and to divide the sub-carrier signal after weighting by the interference power;

a combining unit configured to generate a signal for the sub-carrier group by adding all the sub-carrier signals after the synchronization detection, and to generate an absolute value for the sub-carrier group by adding all the absolute values; and a path combining unit configured to multiply the sub-carrier group signal corresponding to each path by the absolute value of the respectively corresponding sub-carrier group, to thereby generate a sub-carrier group signal after path combining, by adding all the multiplication results.

15. The multi-carrier CDMA communication apparatus according to claim 7, said signal demodulation unit comprising:

a frequency despreading unit configured to perform frequency despreading in a unit of the sub-carrier signal;

a synchronization detector configured to perform transmission line estimation for each sub-carrier signal after frequency inverse conversion, based on a known sequence added to a data frame, to calculate a complex conjugate of the transmission line estimation results, to weight the sub-carrier signal by the complex conjugate, to estimate an interference power for each sub-carrier signal after the frequency inverse conversion based on the known sequence, and to divide the sub-carrier signal after weighting by the interference power;

a combining unit configured to generate a signal for the sub-carrier group by adding all the sub-carrier signals after the synchronization detection; and a path combining unit configured to add all the sub-carrier group signals corresponding to each path, to thereby generate a sub-carrier group signal after path combining.

16. A multi-carrier CDMA communication apparatus comprising a transmitter and a receiver configured to perform transfer of data, using a multi-carrier CDMA method, said transmitter having signal modulation units for a number of sub-carrier groups, configured to perform frequency spreading and time spreading, after the frequency spreading, for each sub-carrier signal of each channel constituting a sub-carrier group, based on a predetermined condition; and said receiver having signal demodulation units for the number of sub-carrier groups, configured to perform time despreading and frequency despreading for each sub-carrier signal.

17. The multi-carrier CDMA communication apparatus according to claim 16, said signal modulation unit comprising:

a frame creation unit configured to create data frames comprising a known sequence, frame information, and data, for each sub-carrier group based on said predetermined condition;

a copy unit configured to generate data frames by the number of sub-carriers, by copying a data frame;

an information modulation unit configured to perform modulation processing with respect to each data frame;

a frequency spreading unit configured to perform frequency spreading with respect to each sub-carrier signal after modulation, based on said predetermined condition;

a power control unit configured to perform transmission power control with respect to each sub-carrier signal after the frequency spreading; and a time spreading unit configured to perform time spreading with respect to each sub-carrier signal after the frequency spreading.

18. The multi-carrier CDMA communication apparatus according to claim 16, said signal demodulation unit comprising:

a time despreading unit configured to perform time despreading in a unit of the sub-carrier signal;

a frequency despreading unit configured to perform frequency despreading in the unit of the sub-carrier signal;

a synchronization detector configured to perform transmission line estimation for each sub-carrier signal after frequency inverse conversion, based on a known sequence added to a data frame, to calculate an absolute value and a complex conjugate of transmission line estimation results, to normalize the complex conjugate by the absolute value, to weight the sub-carrier signal by the normalization result, and to output the absolute value and the sub-carrier signal after weighting as an output;

a combining unit configured to generate a signal for the sub-carrier group by adding all the sub-carrier signals after weighting, and to combine an absolute value for the sub-carrier group by adding all the absolute values; and a path combining unit configured to multiply the sub-carrier group signal corresponding to each path by the absolute value of the respectively corresponding sub-carrier group, to thereby generate a sub-carrier group signal after path combining, by adding all the multiplication results.

19. The multi-carrier CDMA communication apparatus according to claim 16, said signal demodulation unit comprising:

a time despreading unit configured to perform time despreading in a unit of the sub-carrier signal;

a frequency despreading unit configured to perform frequency despreading in the unit of the sub-carrier signal;

a synchronization detector configured to perform transmission line estimation for each sub-carrier signal after frequency inverse conversion, based on a known sequence added to a data frame, to calculate a complex conjugate of transmission line estimation results, to weight the sub-carrier signal by the complex conjugate, and to output the sub-carrier signal after weighting as an output;

a combining unit configured to generate a signal for the sub-carrier group by adding all the sub-carrier signals after weighting; and a path combining unit configured to add all the sub-carrier group signals corresponding to each path, to thereby generate a sub-carrier group signal after path combining.

20. The multi-carrier CDMA communication apparatus according to claim 16, said signal demodulation unit comprising:

a time despreading unit configured to perform time despreading in a unit of the sub-carrier signal;

a frequency despreading unit configured to perform frequency despreading in a unit of the sub-carrier signal;

a synchronization detector configured to perform line estimation for each sub-carrier signal after frequency inverse conversion, based on a known sequence added to a data frame, to calculate an absolute value and a complex conjugate of transmission line estimation results, to normalize the complex conjugate by the absolute value, to weight the sub-carrier signal by the normalization result, to estimate an interference power for each sub-carrier signal after the frequency inverse conversion based on the known sequence, and to divide the sub-carrier signal after weighting by the interference power;

a combining unit configured to generate a signal for the sub-carrier group by adding all the sub-carrier signals after the synchronization detection, and to generate an absolute value for the sub-carrier group by adding all the absolute values; and a path combining unit configured to multiply the sub-carrier group signal corresponding to each path by the absolute value of the respectively corresponding sub-carrier group, to thereby generate a sub-carrier group signal after path combining, by adding all the multiplication results.

21. The multi-carrier CDMA communication apparatus according to claim 16, said signal demodulation unit comprising:

a time despreading unit configured to perform time despreading in a unit of the sub-carrier signal;

a frequency despreading unit configured to perform frequency despreading in the unit of the sub-carrier signal;

a synchronization detector configured to perform transmission line estimation for each sub-carrier signal after the frequency inverse conversion, based on a known sequence added to a data frame, to calculate a complex conjugate of the transmission line estimation results, to weight the sub-carrier signal by the complex conjugate, to estimate an interference power for each sub-carrier signal after the frequency inverse conversion based on the known sequence, and to divide the sub-carrier signal after weighting by the interference power;

a combining unit configured to generate a signal for the sub-carrier group by adding all the sub-carrier signals after the synchronization detection; and a path combining unit configured to add all the sub-carrier group signals corresponding to each path, to thereby generate a sub-carrier group signal after path combining.

22. A multi-carrier CDMA communication apparatus comprising a transmitter and a receiver configured to perform transfer of data, using a multi-carrier CDMA method, said transmitter including:

a setting unit configured to set conditions of a code rate of error correction, a number of sub-carrier groups, a frequency spreading rate, a number of code multiplexes of frequency spreading code, a frequency spreading code, a time spreading rate, a number of code multiplexes of time spreading code, and a time spreading code;

signal modulation units for the number of sub-carrier groups configured to perform frequency spreading and time spreading for each sub-carrier signal of each channel constituting a sub-carrier group, based on the set conditions; and said receiver having signal demodulation units for the number of sub-carrier groups, configured to perform time despreading and frequency despreading for each sub-carrier signal.

23. The multi-carrier CDMA communication apparatus according to claim 22, said signal modulation unit comprising:

a frame creation unit configured to create data frames including a known sequence, frame information, and data, for each sub-carrier group based on said set conditions;

a copy unit configured to generate data frames by the number of sub-carriers, by copying a data frame;

an information modulation unit configured to perform modulation processing with respect to each data frame;

a frequency spreading unit configured to perform frequency spreading with respect to each sub-carrier signal after modulation, based on said set conditions;

a power control unit configured to perform transmission power control with respect to each sub-carrier signal after the frequency spreading; and a time spreading unit configured to perform time spreading with respect to each sub-carrier signal after the frequency spreading.

24. The multi-carrier CDMA communication apparatus according to claim 22, wherein said setting unit sets the code rate of error correction, based on an input signal power to interference power ratio transmitted from said receiver, and when there is no frequency spreading code nor time spreading code to be allocated, at a time of setting the frequency spreading code and the time spreading code, said setting unit ensures an allocatable frequency spreading code by reducing the frequency spreading rate.

25. The multi-carrier CDMA communication apparatus according to claim 22, wherein said setting unit sets the code rate of error correction, based on an input signal power to interference power ratio transmitted from said receiver, and when there is no frequency spreading code nor time spreading code to be allocated, at the time of setting the frequency spreading code and the time spreading code, said setting unit ensures an allocatable frequency spreading code by reducing the frequency spreading rate, and even when there is still no frequency spreading code nor time spreading code to be allocated, said setting unit ensures an allocatable frequency spreading code, by ensuring a plurality of frequency spreading codes in the same sub-carrier group.

26. The multi-carrier CDMA communication apparatus according to claim 22, wherein said setting unit sets the code rate of error correction, based on an input signal power to interference power ratio transmitted from said receiver, and when there is no frequency spreading code nor time spreading code to be allocated, at the time of setting the frequency spreading code and the time spreading code, said setting unit ensures an allocatable frequency spreading code by reducing the frequency spreading rate;

even when there is no frequency spreading code nor time spreading code to be allocated, said setting unit ensures allocatable frequency spreading code, by ensuring a plurality of frequency spreading codes in the same sub-carrier group; and even when there is no frequency spreading code nor time spreading code to be allocated, said setting unit ensures allocatable frequency spreading code and time spreading code, by ensuring a plurality of frequency spreading codes in the same sub-carrier group, and increasing the number of multiplexes of the time spreading code.

27. The multi-carrier CDMA communication apparatus according to claim 22, wherein said setting unit sets the code rate of error correction, based on an input signal power to interference power ratio transmitted from said receiver, and when there is no frequency spreading code nor time spreading code to be allocated, at the time of setting the frequency spreading code and the time spreading code, said setting unit ensures an allocatable frequency spreading code by reducing the frequency spreading rate;

even when there is still no frequency spreading code nor time spreading code to be allocated, said setting unit ensures allocatable frequency spreading code, by ensuring a plurality of frequency spreading codes in the same sub-carrier group; and even when there is still no frequency spreading code nor time spreading code to be allocated, said setting unit ensures allocatable frequency spreading code and time spreading code, by ensuring a plurality of frequency spreading codes in the same sub-carrier group, and decreasing the time spreading rate.

28. The multi-carrier CDMA communication apparatus according to claim 22, said signal demodulation unit comprising:
a time despreading unit configured to perform time despreading in a unit of the sub-carrier signal;
a frequency despreading unit configured to perform frequency despreading in the unit of the sub-carrier signal;
a synchronization detector configured to perform transmission line estimation for each sub-carrier signal after frequency inverse conversion, based on a known sequence added to a data frame, to calculate an absolute value and a complex conjugate of transmission line estimation results, to normalize the complex conjugate by the absolute value, to weight the sub-carrier signal by the normalization result, and to output the absolute value and the sub-carrier signal after weighting as an output;
a combining unit configured to generate a signal for the sub-carrier group by adding all the sub-carrier signals after weighting, and to combine an absolute value for the sub-carrier group by adding all the absolute values; and
a path combining unit configured to multiply the sub-carrier group signal corresponding to each path by the absolute value of the respectively corresponding sub-carrier group, to thereby generate a sub-carrier group signal after path combining, by adding all the multiplication results.

29. The multi-carrier CDMA communication apparatus according to claim 22, said signal demodulation unit comprising:
a time despreading unit configured to perform time despreading in a unit of the sub-carrier signal;
a frequency despreading unit configured to perform frequency despreading in the unit of the sub-carrier signal;
a synchronization detector configured to perform transmission line estimation for each sub-carrier signal after frequency inverse conversion, based on a known sequence added to a data frame, to calculate a complex conjugate of transmission line estimation results, to weight the sub-carrier signal by the complex conjugate, and to output the sub-carrier signal after weighting as an output;
a combining unit configured to generate a signal for the sub-carrier group by adding all the sub-carrier signals after weighting; and
a path combining unit configured to add all the sub-carrier group signals corresponding to each path, to thereby generate a sub-carrier group signal after path combining.

30. The multi-carrier CDMA communication apparatus according to claim 22, said signal demodulation unit comprising:
a time despreading unit configured to perform time despreading in a unit of the sub-carrier signal;
a frequency despreading unit configured to perform frequency despreading in the unit of the sub-carrier signal;
a synchronization detector configured to perform transmission line estimation for each sub-carrier signal after frequency inverse conversion, based on a known sequence added to a data frame, to calculate an absolute value and a complex conjugate of transmission line estimation results, to normalize the complex conjugate by the absolute value, to weight the sub-carrier signal by the normalization result, to estimate an interference power for each sub-carrier signal after the frequency inverse conversion based on the known sequence, and to divide the sub-carrier signal after weighting by the interference power;

a combining unit configured to generate a signal for the sub-carrier group by adding all the sub-carrier signals after the synchronization detection, and to generate an absolute value for the sub-carrier group by adding all the absolute values; and a path combining unit configured to multiply the sub-carrier group signal corresponding to each path by the absolute value of the respectively corresponding sub-carrier group, to thereby generate a sub-carrier group signal after path combining, by adding all the multiplication results.

31. The multi-carrier CDMA communication apparatus according to claim 22, said signal demodulation unit comprising:

a time despreading unit configured to perform time despreading in a unit of the sub-carrier signal;

a frequency despreading unit configured to perform frequency despreading in the unit of the sub-carrier signal;

a synchronization detector configured to perform transmission line estimation for each sub-carrier signal after frequency inverse conversion, based on a known sequence added to a data frame, to calculate a complex conjugate of transmission line estimation results, to weight the sub-carrier signal by the complex conjugate, to estimate an interference power for each sub-carrier signal after the frequency inverse conversion based on the known sequence, and to divide the sub-carrier signal after weighting by the interference power;

a combining unit configured to generate a signal for the sub-carrier group by adding all the sub-carrier signals after the synchronization detection; and a path combining unit configured to add all the sub-carrier group signals corresponding to each path, to thereby generate a sub-carrier group signal after path combining.

32. A multi-carrier CDMA transmitter which transmits data, using the multi-carrier CDMA method, said transmitter comprising:

signal modulation units for the number of sub-carrier groups, configured to perform frequency spreading for each sub-carrier signal of each channel constituting a sub-carrier group, based on a predetermined condition; and time spreading units for the number of sub-carrier groups, configured to multiplex all the signals after the modulation processing and the frequency spreading for each sub-carrier signal, and perform time spreading with respect to the multiplexed signals for each sub-carrier signal.

33. A multi-carrier CDMA transmitter which transmits data, using the multi-carrier CDMA method, said transmitter comprising:

a setting unit configured to set conditions of a code rate of error correction, a number of sub-carrier groups, a frequency spreading rate, a number of code multiplexes of frequency spreading code, a frequency spreading code, a time spreading rate, a number of code multiplexes of time spreading code, and a time spreading code;

signal modulation units for the number of sub-carrier groups configured to perform frequency spreading for each sub-carrier signal of each channel constituting a sub-carrier group, based on the set conditions; and time spreading units for the number of sub-carrier groups, configured to multiplex all the signals after the modulation processing and the frequency spreading for each sub-carrier signal, and perform time spreading with respect to the multiplexed signals for each sub-carrier signal.

34. A multi-carrier CDMA transmitter which transmits data, using the multi-carrier CDMA method, said transmitter comprising:

signal modulation units for the number of sub-carrier groups, configured to perform frequency spreading and time spreading, after the frequency spreading, for each sub-carrier signal of each channel constituting a sub-carrier group, based on a predetermined condition.

35. A multi-carrier CDMA transmitter which transmits data, using the multi-carrier CDMA method, said transmitter comprising:

a setting unit configured to set conditions of a code rate of error correction, a number of sub-carrier groups, a frequency spreading rate, a number of code multiplexes of frequency spreading code, a frequency spreading code, a time spreading rate, a number of code multiplexes of time spreading code, and a time spreading code;

signal modulation units for the number of sub-carrier groups configured to perform frequency spreading and time spreading for each sub-carrier signal of each channel constituting a sub-carrier group, based on the set conditions.

36. A multi-carrier CDMA receiver which receives data, using multi-carrier CDMA method, said receiver comprising:

time despreading units for the number of sub-carrier groups, configured to perform time despreading for each sub-carrier signal; and signal demodulation units for the number of sub-carrier groups, configured to perform frequency despreading, after the time despreading, for each sub-carrier signal after the time despreading.

37. A multi-carrier CDMA receiver which receives data, using the multi-carrier CDMA method, said receiver comprising:

signal demodulation units for the number of sub-carrier groups, configured to perform time despreading and frequency despreading, after the time despreading, for each sub-carrier signal.

* * * * *